US 11,709,946 B2
Jul. 25, 2023

United States Patent
Murphy et al.

(54) THREAT MITIGATION SYSTEM AND METHOD

(71) Applicant: ReliaQuest Holdings, LLC, Tampa, FL (US)

(72) Inventors: Brian P. Murphy, Tampa, FL (US); Joe Partlow, Tampa, FL (US); Colin O'Connor, Tampa, FL (US); Jason Pfeiffer, Tampa, FL (US)

(73) Assignee: ReliaQuest Holdings, LLC, Tampa, FL (US)

( * ) Notice: Subject to any disclaimer, the term of this patent is extended or adjusted under 35 U.S.C. 154(b) by 0 days.

(21) Appl. No.: 17/680,985

(22) Filed: Feb. 25, 2022

(65) Prior Publication Data

US 2022/0179969 A1 Jun. 9, 2022

Related U.S. Application Data

(63) Continuation-in-part of application No. 16/432,801, filed on Jun. 5, 2019, now Pat. No. 11,265,338.

(60) Provisional application No. 62/817,943, filed on Mar. 13, 2019, provisional application No. 62/737,558, filed on Sep. 27, 2018, provisional application No. 62/681,279, filed on Jun. 6, 2018.

(51) Int. Cl.
*H04L 9/40* (2022.01)
*G06F 21/57* (2013.01)
*G06N 20/00* (2019.01)

(52) U.S. Cl.
CPC ........... *G06F 21/577* (2013.01); *G06N 20/00* (2019.01); *G06F 2221/034* (2013.01)

(58) Field of Classification Search
CPC .................. G06F 21/577; G06F 2221/034

USPC ........................................................ 726/16
See application file for complete search history.

(56) References Cited

U.S. PATENT DOCUMENTS

| 3,107,901 | A  | 10/1963 | Zimmerman      |
| 6,243,713 | B1 | 6/2001  | Nelson et al.  |
| 6,530,024 | B1 | 3/2003  | Proctor        |
| 6,742,128 | B1 | 5/2004  | Joiner         |
| 7,152,240 | B1 | 12/2006 | Green et al.   |
| 7,165,041 | B1 | 1/2007  | Guheen et al.  |
| 7,487,544 | B2 | 2/2009  | Schultz et al. |
| 7,818,797 | B1 | 10/2010 | Fan et al.     |
| 8,146,146 | B1 | 3/2012  | Coviello et al.|
| 8,191,147 | B1 | 5/2012  | Gardner et al. |
| 8,291,500 | B1 | 10/2012 | Bojaxhi et al. |
| 8,429,307 | B1 | 4/2013  | Faibish et al. |
| 8,490,149 | B1 | 7/2013  | Ravi et al.    |

(Continued)

FOREIGN PATENT DOCUMENTS

WO      2017127850 A1    7/2017

OTHER PUBLICATIONS

Non-Final Office Action issued in U.S. Appl. No. 16/432,772 dated Jul. 23, 2019.

(Continued)

*Primary Examiner* — Anthony D Brown
(74) *Attorney, Agent, or Firm* — Brian J. Colandreo; Jeffery T. Placker; Holland & Knight LLP

(57) ABSTRACT

A computer-implemented method, computer program product and computing system for: defining a training routine for a specific attack of a computing platform; and generating a simulation of the specific attack by executing the training routine within a controlled test environment.

21 Claims, 30 Drawing Sheets

(56) References Cited

U.S. PATENT DOCUMENTS

| | | |
|---|---|---|
| 8,549,626 B1 | 10/2013 | Glick et al. |
| 8,793,348 B2 | 7/2014 | Ott |
| 8,832,148 B2 | 9/2014 | Kisin et al. |
| 8,850,585 B2 | 9/2014 | Bojaxhi et al. |
| 8,909,926 B2 | 12/2014 | Brandt |
| 9,009,823 B1 | 4/2015 | Ismael et al. |
| 9,064,210 B1 | 6/2015 | Chauhan et al. |
| 9,069,930 B1 | 6/2015 | Hart |
| 9,282,114 B1 | 3/2016 | Dotan et al. |
| 9,355,246 B1 | 5/2016 | Wan et al. |
| 9,378,361 B1 | 6/2016 | Yen et al. |
| 9,384,677 B2 | 7/2016 | Brueckner et al. |
| 9,398,035 B2 | 7/2016 | Vasseur et al. |
| 9,401,926 B1 | 7/2016 | Dubow et al. |
| 9,438,618 B1 | 9/2016 | Sultan |
| 9,479,357 B1 | 10/2016 | Fu et al. |
| 9,516,052 B1 | 12/2016 | Chauhan et al. |
| 9,516,053 B1 | 12/2016 | Muddu et al. |
| 9,596,252 B2 | 3/2017 | Coates et al. |
| 9,639,697 B2 | 5/2017 | Friedrichs et al. |
| 9,811,562 B2 | 11/2017 | Tidwell et al. |
| 9,813,449 B1 | 11/2017 | Buenechea et al. |
| 9,852,599 B1 | 12/2017 | Slavin et al. |
| 9,866,650 B2 | 1/2018 | Sathyanarayana et al. |
| 9,948,678 B2 | 4/2018 | Tcherchian et al. |
| 9,979,739 B2 | 5/2018 | Mumcuoglu et al. |
| 10,095,864 B2 | 10/2018 | Hunt |
| 10,122,737 B1 | 11/2018 | McCorkendale et al. |
| 10,140,267 B1 | 11/2018 | Gupta |
| 10,218,697 B2 | 2/2019 | Cockerill et al. |
| 10,230,742 B2 | 3/2019 | Huang et al. |
| 10,242,187 B1 | 3/2019 | Roundy et al. |
| 10,257,227 B1 | 4/2019 | Stickle et al. |
| 10,284,587 B1 | 5/2019 | Schlatter et al. |
| 10,291,644 B1 | 5/2019 | Hotta et al. |
| 10,320,813 B1 | 6/2019 | Ahmed |
| 10,320,841 B1 | 6/2019 | Allen |
| 10,326,785 B2 | 6/2019 | Boss et al. |
| 10,372,904 B2 | 8/2019 | Hunt |
| 10,397,246 B2 | 8/2019 | Raff |
| 10,511,632 B2 | 12/2019 | Ward et al. |
| 10,600,335 B1 * | 3/2020 | Donovan ............ H04L 67/1057 |
| 10,616,260 B2 | 4/2020 | Steele |
| 10,649,758 B2 | 5/2020 | Bulut et al. |
| 10,686,805 B2 | 6/2020 | Reybok, Jr |
| 10,686,809 B2 | 6/2020 | Boss et al. |
| 10,735,443 B2 | 8/2020 | Murphy |
| 10,764,310 B2 | 9/2020 | Vasseur |
| 10,776,355 B1 | 9/2020 | Batsakis et al. |
| 10,812,516 B2 | 10/2020 | Chenette et al. |
| 10,972,493 B2 | 4/2021 | Rostami-Hesarsorkh |
| 11,170,334 B1 | 11/2021 | Orzechowski et al. |
| 2002/0087882 A1 | 7/2002 | Schneier et al. |
| 2003/0014396 A1 | 1/2003 | Kabra et al. |
| 2003/0163510 A1 | 8/2003 | Janssen |
| 2004/0003132 A1 | 1/2004 | Stanley |
| 2004/0010697 A1 | 1/2004 | White |
| 2004/0024720 A1 | 2/2004 | Fairweather |
| 2004/0193912 A1 | 9/2004 | Li et al. |
| 2005/0055330 A1 | 3/2005 | Britton et al. |
| 2005/0125694 A1 | 6/2005 | Fakes et al. |
| 2005/0234889 A1 | 10/2005 | Fox et al. |
| 2005/0257268 A1 | 11/2005 | Guo |
| 2006/0095967 A1 | 5/2006 | Durham et al. |
| 2006/0123022 A1 | 6/2006 | Bird |
| 2007/0143827 A1 | 6/2007 | Nicodemus |
| 2007/0180490 A1 | 8/2007 | Renzi |
| 2007/0180509 A1 | 8/2007 | Swartz et al. |
| 2007/0199070 A1 | 8/2007 | Hughes |
| 2007/0265898 A1 | 11/2007 | Naono et al. |
| 2008/0162592 A1 | 7/2008 | Huang et al. |
| 2008/0235801 A1 | 9/2008 | Soderberg |
| 2008/0286727 A1 | 11/2008 | Nemeth |
| 2009/0076969 A1 | 3/2009 | Sparks |
| 2009/0077666 A1 | 3/2009 | Chen et al. |
| 2009/0178139 A1 | 7/2009 | Stute et al. |
| 2009/0192847 A1 | 7/2009 | Lipkin |
| 2009/0208910 A1 | 8/2009 | Brueckner et al. |
| 2009/0220929 A1 * | 9/2009 | Daniel ..................... G09B 9/02 434/362 |
| 2009/0241194 A1 | 9/2009 | Thomas |
| 2009/0248619 A1 | 10/2009 | Das et al. |
| 2009/0254572 A1 | 10/2009 | Redlich |
| 2009/0271448 A1 | 10/2009 | Chen et al. |
| 2009/0320137 A1 | 12/2009 | White et al. |
| 2009/0328219 A1 | 12/2009 | Narayanaswamy |
| 2010/0077078 A1 | 3/2010 | Suit et al. |
| 2010/0125574 A1 | 5/2010 | Navas |
| 2010/0131626 A1 | 5/2010 | Oda et al. |
| 2010/0156630 A1 | 6/2010 | Ainsbury |
| 2010/0162346 A1 | 6/2010 | Holostov et al. |
| 2010/0169948 A1 | 7/2010 | Budko et al. |
| 2010/0205136 A1 | 8/2010 | Glass, III |
| 2010/0250337 A1 | 9/2010 | Kassaei |
| 2010/0250497 A1 | 9/2010 | Redlich |
| 2011/0132230 A1 | 6/2011 | Han et al. |
| 2011/0231361 A1 | 9/2011 | Patchava et al. |
| 2011/0288692 A1 | 11/2011 | Scott |
| 2011/0289308 A1 | 11/2011 | Sobko et al. |
| 2011/0320307 A1 | 12/2011 | Mehta et al. |
| 2012/0054172 A1 | 3/2012 | Agrawal et al. |
| 2012/0054857 A1 | 3/2012 | Bisso et al. |
| 2012/0072968 A1 | 3/2012 | Wysopal et al. |
| 2012/0079596 A1 | 3/2012 | Thomas et al. |
| 2012/0156381 A1 | 6/2012 | Allouche |
| 2012/0233127 A1 | 9/2012 | Solmer |
| 2012/0240233 A1 | 9/2012 | Loman et al. |
| 2012/0247369 A1 | 10/2012 | Ellenrieder et al. |
| 2012/0311562 A1 | 12/2012 | Wang et al. |
| 2012/0331545 A1 | 12/2012 | Baliga et al. |
| 2013/0014264 A1 | 1/2013 | Kennedy et al. |
| 2013/0031037 A1 | 1/2013 | Brandt et al. |
| 2013/0031555 A1 | 1/2013 | Tobin et al. |
| 2013/0042115 A1 | 2/2013 | Sweet et al. |
| 2013/0081141 A1 | 3/2013 | Anurag |
| 2013/0117847 A1 | 5/2013 | Friedman et al. |
| 2013/0133025 A1 | 5/2013 | Wallace |
| 2013/0139245 A1 | 5/2013 | Thomas |
| 2013/0144812 A1 | 6/2013 | Chaganty et al. |
| 2013/0179938 A1 | 7/2013 | Choi et al. |
| 2013/0183639 A1 * | 7/2013 | Quail ..................... F41G 3/2655 434/11 |
| 2013/0263266 A1 | 10/2013 | Bojaxhi et al. |
| 2013/0275452 A1 | 10/2013 | Krisnamurthy et al. |
| 2013/0275770 A1 | 10/2013 | Berger |
| 2013/0291087 A1 | 10/2013 | Kailash et al. |
| 2013/0305340 A1 | 11/2013 | Wotring |
| 2014/0007264 A1 | 1/2014 | Berger |
| 2014/0009289 A1 | 1/2014 | Berger |
| 2014/0013454 A1 | 1/2014 | Berger et al. |
| 2014/0013455 A1 | 1/2014 | Berger et al. |
| 2014/0020121 A1 | 1/2014 | Berger et al. |
| 2014/0020122 A1 | 1/2014 | Berger |
| 2014/0020123 A1 | 1/2014 | Berger et al. |
| 2014/0046709 A1 | 2/2014 | Kwapiszeski et al. |
| 2014/0053273 A1 | 2/2014 | Stella et al. |
| 2014/0096181 A1 | 4/2014 | Rivers |
| 2014/0156711 A1 | 6/2014 | Sharan et al. |
| 2014/0172706 A1 | 6/2014 | Condry et al. |
| 2014/0189870 A1 | 7/2014 | Singla et al. |
| 2014/0195502 A1 | 7/2014 | Huang et al. |
| 2014/0201836 A1 | 7/2014 | Amsler |
| 2014/0208447 A1 | 7/2014 | Berger |
| 2014/0223555 A1 | 8/2014 | Hernando et al. |
| 2014/0264140 A1 | 9/2014 | Gong |
| 2014/0280075 A1 | 9/2014 | Huang et al. |
| 2014/0297495 A1 | 10/2014 | Dalal et al. |
| 2014/0330816 A1 | 11/2014 | Dash et al. |
| 2014/0336795 A1 | 11/2014 | Asenjo et al. |
| 2015/0033340 A1 | 1/2015 | Giokas |
| 2015/0040233 A1 | 2/2015 | Oliphant et al. |
| 2015/0067844 A1 | 3/2015 | Brandt et al. |
| 2015/0106867 A1 | 4/2015 | Liang |
| 2015/0120373 A1 | 4/2015 | Bajaj et al. |

(56) References Cited

U.S. PATENT DOCUMENTS

| | | |
|---|---|---|
| 2015/0128267 A1 | 5/2015 | Gupta |
| 2015/0135262 A1 | 5/2015 | Porat et al. |
| 2015/0135316 A1 | 5/2015 | Tock et al. |
| 2015/0163199 A1 | 6/2015 | Kailash et al. |
| 2015/0172300 A1 | 6/2015 | Cochenour |
| 2015/0180891 A1 | 6/2015 | Seward et al. |
| 2015/0207813 A1 | 7/2015 | Reybok et al. |
| 2015/0215334 A1 | 7/2015 | Bingham et al. |
| 2015/0222667 A1 | 8/2015 | Nayshtut et al. |
| 2015/0242515 A1 | 8/2015 | Trabelsi et al. |
| 2015/0242619 A1 | 8/2015 | Bender et al. |
| 2015/0242628 A1 | 8/2015 | Burt et al. |
| 2015/0264011 A1 | 9/2015 | Liang |
| 2015/0281287 A1 | 10/2015 | Gill et al. |
| 2015/0332398 A1 | 11/2015 | Brkic et al. |
| 2015/0350161 A1 | 12/2015 | Hsu et al. |
| 2015/0371064 A1 | 12/2015 | Dayan et al. |
| 2016/0019388 A1 | 1/2016 | Singla et al. |
| 2016/0034361 A1 | 2/2016 | Block et al. |
| 2016/0044054 A1 | 2/2016 | Stiansen et al. |
| 2016/0044057 A1 | 2/2016 | Chenette et al. |
| 2016/0044058 A1 | 2/2016 | Schlauder |
| 2016/0065595 A1 | 3/2016 | Kim et al. |
| 2016/0065599 A1 | 3/2016 | Hovor et al. |
| 2016/0094565 A1 | 3/2016 | Adams et al. |
| 2016/0103992 A1 | 4/2016 | Roundy |
| 2016/0117466 A1 | 4/2016 | Singh |
| 2016/0119365 A1 | 4/2016 | Barel |
| 2016/0125535 A1 | 5/2016 | Singer |
| 2016/0147758 A1 | 5/2016 | Chhaya |
| 2016/0156664 A1 | 6/2016 | Nagaratnam et al. |
| 2016/0164891 A1 | 6/2016 | Satish |
| 2016/0164893 A1 | 6/2016 | Levi |
| 2016/0164907 A1 | 6/2016 | Satish et al. |
| 2016/0164919 A1 | 6/2016 | Satish et al. |
| 2016/0191466 A1 | 6/2016 | Pernicha |
| 2016/0203319 A1 | 7/2016 | Coen et al. |
| 2016/0203883 A1 | 7/2016 | Richardson |
| 2016/0224619 A1 | 8/2016 | Robichaud et al. |
| 2016/0232024 A1 | 8/2016 | Hamilton, II et al. |
| 2016/0232353 A1 | 8/2016 | Gupta et al. |
| 2016/0232358 A1 | 8/2016 | Grieco et al. |
| 2016/0241579 A1 | 8/2016 | Roosenraad |
| 2016/0241581 A1 | 8/2016 | Watters et al. |
| 2016/0246590 A1 | 8/2016 | Yu |
| 2016/0246849 A1 | 8/2016 | Frampton et al. |
| 2016/0253503 A1 | 9/2016 | Berry |
| 2016/0259939 A1 | 9/2016 | Bobritsky et al. |
| 2016/0286084 A1 | 9/2016 | Kawaguchi et al. |
| 2016/0294646 A1 | 10/2016 | Kirner et al. |
| 2016/0294800 A1 | 10/2016 | Oppenheim, Jr. et al. |
| 2016/0306862 A1 | 10/2016 | Sitsky et al. |
| 2016/0321664 A1 | 11/2016 | Erickson et al. |
| 2016/0366174 A1 | 12/2016 | Chernin et al. |
| 2016/0371489 A1 | 12/2016 | Puri |
| 2017/0006058 A1 | 1/2017 | Murphy et al. |
| 2017/0032279 A1 | 2/2017 | Miserendino et al. |
| 2017/0041036 A1 | 2/2017 | Phung et al. |
| 2017/0041337 A1 | 2/2017 | Hoog |
| 2017/0048264 A1 | 2/2017 | Chauhan et al. |
| 2017/0048267 A1 | 2/2017 | Yampolskiy et al. |
| 2017/0060537 A1 | 3/2017 | Mack et al. |
| 2017/0060792 A1 | 3/2017 | Kesler et al. |
| 2017/0061338 A1 | 3/2017 | Mack et al. |
| 2017/0061348 A1 | 3/2017 | Mack et al. |
| 2017/0083682 A1 | 3/2017 | McNutt et al. |
| 2017/0093910 A1 | 3/2017 | Gukal et al. |
| 2017/0118239 A1 | 4/2017 | Most et al. |
| 2017/0118245 A1 | 4/2017 | Tcherchian et al. |
| 2017/0126727 A1 | 5/2017 | Beam et al. |
| 2017/0140293 A1 | 5/2017 | Vij et al. |
| 2017/0140660 A1 | 5/2017 | Morton |
| 2017/0142134 A1 | 5/2017 | Gilbert |
| 2017/0154382 A1 | 6/2017 | McLaughlin et al. |
| 2017/0171231 A1 | 6/2017 | Reybok, Jr. et al. |
| 2017/0177641 A1 | 6/2017 | Von Drakk |
| 2017/0178007 A1 | 6/2017 | Yu |
| 2017/0187742 A1 | 6/2017 | Rogers et al. |
| 2017/0192952 A1 | 7/2017 | Lehmann et al. |
| 2017/0206361 A1 | 7/2017 | Zhu et al. |
| 2017/0212157 A1 | 7/2017 | Razon et al. |
| 2017/0214701 A1 | 7/2017 | Hasan |
| 2017/0223030 A1 | 8/2017 | Merza |
| 2017/0223046 A1 | 8/2017 | Singh |
| 2017/0244736 A1 | 8/2017 | Benishti |
| 2017/0249461 A1 | 8/2017 | Permeh et al. |
| 2017/0251002 A1 | 8/2017 | Rostamabadi et al. |
| 2017/0251003 A1 | 8/2017 | Rostami Hesarsorkh et al. |
| 2017/0251013 A1 | 8/2017 | Kirti et al. |
| 2017/0263092 A1 | 9/2017 | Rankin et al. |
| 2017/0264588 A1 | 9/2017 | Hunt et al. |
| 2017/0264589 A1 | 9/2017 | Hunt et al. |
| 2017/0264627 A1 | 9/2017 | Hunt |
| 2017/0279835 A1 | 9/2017 | Di Pietro et al. |
| 2017/0301024 A1 | 10/2017 | Dalal et al. |
| 2017/0308800 A1 | 10/2017 | Cichon et al. |
| 2017/0322959 A1 | 11/2017 | Tidwell et al. |
| 2017/0331816 A1 | 11/2017 | Votaw et al. |
| 2017/0331817 A1 | 11/2017 | Votaw et al. |
| 2017/0346824 A1 | 11/2017 | Mahabir et al. |
| 2017/0359366 A1 | 12/2017 | Bushey et al. |
| 2017/0366582 A1 | 12/2017 | Kothekar et al. |
| 2018/0004942 A1 | 1/2018 | Martin et al. |
| 2018/0007060 A1 | 1/2018 | Leblang et al. |
| 2018/0013768 A1 | 1/2018 | Hunt |
| 2018/0027006 A1 | 1/2018 | Zimmerman et al. |
| 2018/0032914 A1 | 2/2018 | Vigoda et al. |
| 2018/0033279 A1 | 2/2018 | Chong et al. |
| 2018/0041537 A1 | 2/2018 | Bloxham et al. |
| 2018/0046926 A1 | 2/2018 | Achin et al. |
| 2018/0048664 A1 | 2/2018 | Bray et al. |
| 2018/0053002 A1 | 2/2018 | El-Moussa et al. |
| 2018/0054451 A1 | 2/2018 | El-Moussa et al. |
| 2018/0060253 A1 | 3/2018 | Gao et al. |
| 2018/0060591 A1 | 3/2018 | Dobrila |
| 2018/0063186 A1 | 3/2018 | Hadden et al. |
| 2018/0069885 A1 | 3/2018 | Patterson et al. |
| 2018/0077188 A1 | 3/2018 | Mandyam et al. |
| 2018/0077195 A1 | 3/2018 | Gathala et al. |
| 2018/0091531 A1 | 3/2018 | El-Moussa et al. |
| 2018/0091536 A1 | 3/2018 | Chrosziel |
| 2018/0091559 A1 | 3/2018 | Luger |
| 2018/0115523 A1 | 4/2018 | Subbarayan et al. |
| 2018/0115578 A1 | 4/2018 | Subbarayan et al. |
| 2018/0121982 A1 | 5/2018 | Li |
| 2018/0124096 A1 | 5/2018 | Schwartz et al. |
| 2018/0129803 A1 | 5/2018 | Levin et al. |
| 2018/0129978 A1 | 5/2018 | Vigoda et al. |
| 2018/0137277 A1 | 5/2018 | Mestha et al. |
| 2018/0144110 A1 | 5/2018 | Creamer et al. |
| 2018/0144123 A1 | 5/2018 | Levin et al. |
| 2018/0145954 A1 | 5/2018 | Koster et al. |
| 2018/0146004 A1 | 5/2018 | Brandt |
| 2018/0159884 A1 | 6/2018 | Meier |
| 2018/0157831 A1 | 7/2018 | Abbaszadeh et al. |
| 2018/0159877 A1 | 7/2018 | Holzhauer et al. |
| 2018/0189697 A1 | 7/2018 | Thomson et al. |
| 2018/0191758 A1 | 7/2018 | Abbaszadeh et al. |
| 2018/0211549 A1 | 7/2018 | Cohen |
| 2018/0212985 A1 | 7/2018 | Zadeh et al. |
| 2018/0219875 A1 | 8/2018 | Bania et al. |
| 2018/0219876 A1 | 8/2018 | Marwah et al. |
| 2018/0219879 A1 | 8/2018 | Pierce |
| 2018/0219891 A1 | 8/2018 | Jain |
| 2018/0219911 A1 | 8/2018 | Manadhata et al. |
| 2018/0232528 A1 | 8/2018 | Williamson et al. |
| 2018/0234445 A1 | 8/2018 | Bhatt et al. |
| 2018/0248863 A1 | 8/2018 | Kao et al. |
| 2018/0248902 A1 | 8/2018 | D Nil-Dumitrescu |
| 2018/0248904 A1 | 8/2018 | Villella et al. |
| 2018/0253676 A1 | 9/2018 | Sheth et al. |
| 2018/0255074 A1 | 9/2018 | Li et al. |
| 2018/0255084 A1 | 9/2018 | Kotinas |
| 2018/0260572 A1 | 9/2018 | Bhattacharya |

(56) References Cited

U.S. PATENT DOCUMENTS

| | | |
|---|---|---|
| 2018/0268506 A1 | 9/2018 | Wodetzki et al. |
| 2018/0275986 A1 | 9/2018 | Ghosh et al. |
| 2018/0278740 A1 | 9/2018 | Choi et al. |
| 2018/0288078 A1 | 10/2018 | Balasundaram et al. |
| 2018/0308026 A1 | 10/2018 | Sinha et al. |
| 2018/0309752 A1 | 10/2018 | Villavicencio et al. |
| 2018/0316701 A1 | 11/2018 | Holzhauer et al. |
| 2018/0316727 A1 | 11/2018 | Tsironis |
| 2018/0324197 A1 | 11/2018 | Zettel, II et al. |
| 2018/0324207 A1 | 11/2018 | Reybok, Jr. et al. |
| 2018/0337891 A1 | 11/2018 | Subbarayan et al. |
| 2018/0337941 A1 | 11/2018 | Kraning et al. |
| 2018/0357422 A1 | 12/2018 | Telang et al. |
| 2018/0359272 A1 | 12/2018 | Frampton et al. |
| 2018/0367561 A1 | 12/2018 | Giventai et al. |
| 2018/0375886 A1 | 12/2018 | Kirti |
| 2019/0007447 A1 | 1/2019 | Barnes |
| 2019/0019432 A1 | 1/2019 | Kim et al. |
| 2019/0020667 A1 | 1/2019 | Parker |
| 2019/0021004 A1 | 1/2019 | Shanmugavadivel et al. |
| 2019/0028498 A1 | 1/2019 | Fach et al. |
| 2019/0034767 A1 | 1/2019 | Sainani |
| 2019/0037081 A1 | 1/2019 | Rao et al. |
| 2019/0052665 A1 | 2/2019 | Mahieu et al. |
| 2019/0068616 A1 | 2/2019 | Woods et al. |
| 2019/0068620 A1 | 2/2019 | Avrahami et al. |
| 2019/0075124 A1 | 3/2019 | Kimhi et al. |
| 2019/0081980 A1 | 3/2019 | Luo et al. |
| 2019/0089740 A1 | 3/2019 | Hastings |
| 2019/0095488 A1 | 3/2019 | Bhattacharjee |
| 2019/0095618 A1 | 3/2019 | Lim |
| 2019/0104140 A1 | 4/2019 | Gordeychik et al. |
| 2019/0121977 A1 | 4/2019 | Gordeychik et al. |
| 2019/0124104 A1 | 4/2019 | Apostolopoulos |
| 2019/0130009 A1 | 5/2019 | McLean |
| 2019/0132351 A1 | 5/2019 | Linde et al. |
| 2019/0147086 A1 | 5/2019 | Pal et al. |
| 2019/0158525 A1 | 5/2019 | Rostami Hesarsorkh et al. |
| 2019/0163914 A1 | 5/2019 | Steele et al. |
| 2019/0173761 A1 | 6/2019 | Byers et al. |
| 2019/0182287 A1 | 6/2019 | Hanley et al. |
| 2019/0182289 A1 | 6/2019 | White |
| 2019/0188389 A1 | 6/2019 | Peled et al. |
| 2019/0188392 A1 | 6/2019 | El-Moussa et al. |
| 2019/0199739 A1* | 6/2019 | Anderson ............... G06N 20/00 |
| 2019/0199744 A1 | 6/2019 | Nides et al. |
| 2019/0205511 A1 | 7/2019 | Zhan et al. |
| 2019/0207953 A1 | 7/2019 | Klawe et al. |
| 2019/0207966 A1 | 7/2019 | Vashisht et al. |
| 2019/0207967 A1 | 7/2019 | Vashisht et al. |
| 2019/0220767 A1 | 7/2019 | Vigoda et al. |
| 2019/0222596 A1 | 7/2019 | Abbaszadeh et al. |
| 2019/0230098 A1 | 7/2019 | Navarro |
| 2019/0230099 A1 | 7/2019 | Mestha et al. |
| 2019/0236194 A1 | 8/2019 | Subbarayan et al. |
| 2019/0258631 A1 | 8/2019 | Pal et al. |
| 2019/0266297 A1 | 8/2019 | Krause |
| 2019/0279108 A1 | 9/2019 | Yale et al. |
| 2019/0303118 A1 | 10/2019 | Avinash Dorle et al. |
| 2019/0306180 A1 | 10/2019 | Dyakin et al. |
| 2019/0310977 A1 | 10/2019 | Pal et al. |
| 2019/0332667 A1 | 10/2019 | Williams |
| 2019/0342316 A1 | 11/2019 | Zettel, II et al. |
| 2019/0354881 A1 | 11/2019 | Rosler et al. |
| 2019/0394227 A1 | 12/2019 | Reybok, Jr. et al. |
| 2020/0050586 A1 | 2/2020 | Pal et al. |
| 2020/0106792 A1* | 4/2020 | Louie ................. H04L 63/1483 |
| 2020/0162494 A1 | 5/2020 | Rostami-Hesarsorkh |
| 2020/0177556 A1 | 6/2020 | Subbarayan et al. |
| 2020/0186569 A1 | 6/2020 | Milazzo et al. |
| 2020/0304470 A1 | 9/2020 | Subbarayan et al. |
| 2020/0327223 A1 | 10/2020 | Sanchez et al. |
| 2020/0404502 A1 | 12/2020 | Trivellato |
| 2021/0294903 A1 | 9/2021 | Hicks |
| 2022/0035929 A1 | 2/2022 | Hicks |

OTHER PUBLICATIONS

Non-Final Office Action issued in U.S. Appl. No. 16/432,733 dated Aug. 8, 2019.
Non-Final Office Action issued in U.S. Appl. No. 16/432,762 dated Aug. 8, 2019.
Non-Final Office Action issued in U.S. Appl. No. 16/432,626 dated Aug. 8, 2019.
Non-Final Office Action issued in U.S. Appl. No. 16/432,689 dated Aug. 6, 2019.
Non-Final Office Action issued in U.S. Appl. No. 16/432,791 dated Jul. 31, 2019.
Non-Final Office Action issued in U.S. Appl. No. 16/432,801 dated Aug. 1, 2019.
Non-Final Office Action issued in U.S. Appl. No. 16/432,649 dated Aug. 21, 2019.
Non-Final Office Action issued in U.S. Appl. No. 16/432,671 dated Aug. 21, 2019.
Non-Final Office Action issued in U.S. Appl. No. 16/432,818 dated Aug. 21, 2019.
Non-Final Office Action issued in U.S. Appl. No. 16/432,751 dated Aug. 12, 2019.
Non-Final Office Action issued in U.S. Appl. No. 16/433,053 dated Aug. 22, 2019.
Non-Final Office Action issued in U.S. Appl. No. 16/432,488 dated Aug. 22, 2019.
International Search Report issued in International Application No. PCT/US2019/035720 dated Aug. 27, 2019.
Non-Final Office Action issued in U.S. Appl. No. 16/432,711 dated Aug. 29, 2019.
Non-Final Office Action issued in U.S. Appl. No. 16/433,006 dated Sep. 5, 2019.
Goldstein et al. "Enhancing Security Event Management Systems with Unsupervised Anomaly Detection." in ICPRAM, pp. 530-538, 2013.
Non-Final Office Action issued in U.S. Appl. No. 16/432,614 dated Sep. 3, 2019.
International Search Report issued in International Application No. PCT/US2019/035738 dated Aug. 16, 2019.
International Search Report issued in International Application No. PCT/US2019/035715 dated Sep. 4, 2019.
International Search Report issued in International Application No. PCT/US2019/035748 dated Aug. 26, 2019.
International Search Report issued in International Application No. PCT/US2019/035745 dated Aug. 16, 2019.
International Search Report issued in International Application No. PCT/US2019/035734 dated Aug. 16, 2019.
Non-Final Office Action issued in U.S. Appl. No. 16/432,556 dated Sep. 30, 2019.
Non-Final Office Action issued in U.S. Appl. No. 16/432,780 dated Oct. 18, 2019.
International Search Report issued in International Application No. PCT/US2019/035704 dated Oct. 8, 2019.
Non-Final Office Action issued in U.S. Appl. No. 16/433,022 dated Aug. 22, 2019.
Final Office Action issued in counterpart U.S. Appl. No. 16/432,801 dated Nov. 21, 2019.
Shabtai et al., Detection of Malicious Code by Applying Machine Learning Classifers on Static Features: A State-of-the-art survey, Information Security Technical Report 1 4 (2009) 1 6-29) (Year: 2009).
Final Office Action issued in counterpart U.S. Appl. No. 16/432,772 dated Nov. 26, 2019.
Final Office Action issued in counterpart U.S. Appl. No. 16/432,626 dated Nov. 26, 2019.
Final Office Action issued in counterpart U.S. Appl. No. 16/432,671 dated Dec. 11, 2019.
Final Office Action issued in counterpart U.S. Appl. No. 16/432,733 dated Dec. 11, 2019.
Final Office Action issued in counterpart U.S. Appl. No. 16/432,762 dated Dec. 11, 2019.
Matthew Warnecke, Examining the Return on Investment of a Security Information and Event, Jun. 2013 u Management Solution

(56) References Cited

OTHER PUBLICATIONS in a Notional Department of Defense Network Environment.
Pavlik et al., Security information and event management in the cloud computing infrastructure, Nov. 2014, IEEE.
Detken et al., SIEM Approach for a Higher Level of IT Security in Enterprise Networks, Sep. 2015, IEEE.
Notice of Allowance issued in counterpart U.S. Appl. No. 16/432,614 dated Jan. 10, 2020.
Final Office Action issued in counterpart U.S. Appl. No. 16/433,006 dated Jan. 10, 2020.
Final Office Action issued in counterpart U.S. Appl. No. 16/432,751 dated Jan. 10, 2020.
Final Office Action issued in counterpart U.S. Appl. No. 16/432,818 dated Jan. 13, 2020.
Kotento et al. "The Ontology of Metrics for Security Evaluation and Decision Support in SIEM Systems" Sep. 2013 International Conference on Availability, Reliability and Security, pp. 638-645.
Final Office Action issued in counterpart U.S. Appl. No. 16/432,711 dated Jan. 31, 2020.
Final Office Action issued in counterpart U.S. Appl. No. 16/432,791 dated Jan. 27, 2020.
Final Office Action issued in counterpart U.S. Appl. No. 16/432,488 dated Jan. 24, 2020.
Non-Final Office Action issued in counterpart U.S. Appl. No. 16/433,032 dated Nov. 18, 2019.
Final Office Action issued in counterpart U.S. Appl. No. 16/432,689 dated Dec. 10, 2019.
Final Office Action issued in counterpart U.S. Appl. No. 16/432,556 dated Feb. 28, 2020.
Final Office Action issued in U.S. Appl. No. 16/433,022 dated Feb. 28, 2020.
IP.com Search Query Report (performed Feb. 21, 2020).
Notice of Allowance issued in U.S. Appl. No. 16/432,649 dated Mar. 2, 2020.
Notice of Allowance issued in U.S. Appl. No. 16/432,649 dated Mar. 24, 2020.
Final Office Action issued in counterpart U.S. Appl. No. 16/433,053 dated Mar. 5, 2020.
Non-Final Office Action issued in counterpart U.S. Appl. No. 16/432,772 dated Apr. 15, 2020.
Final Office Action issued in counterpart U.S. Appl. No. 16/432,780 dated Apr. 17, 2020.
Non-Final Office Action issued in U.S. Appl. No. 16/432,626 dated Apr. 27, 2020.
Notice of Allowance issued in related U.S. Appl. No. 16/432,711 dated Apr. 29, 2020.
Non-Final Office Action issued in counterpart U.S. Appl. No. 16/432,801 dated May 4, 2020.
Final Office Action issued in counterpart U.S. Appl. No. 16/433,032 dated May 21, 2020.
Non-Final Office Action issued in counterpart U.S. Appl. No. 16/432,818 dated May 22, 2020.
Non-Final Office Action issued in related U.S. Appl. No. 16/432,671 dated May 11, 2020.
Non-Final Office Action issued in related U.S. Appl. No. 16/432,022 dated May 29, 2020.
Search Query Report from IP.com (performed May 26, 2020).
Notice of Allowance issued in related U.S. Appl. No. 16/432,614 dated Jun. 10, 2020.
Corrected Notice of Allowance issued in U.S. Appl. No. 16/432,649 dated Jun. 24, 2020.
Non-Final Office Action issued in related U.S. Appl. No. 16/433,006 dated Jul. 10, 2020.
Non-Final Office Action issued in related U.S. Appl. No. 16/432,733 dated Jul. 17, 2020.
Non-Final Office Action issued in related U.S. Appl. No. 16/432,762 dated Jul. 16, 2020.
Notice of Allowance issued in related U.S. Appl. No. 16/432,780 dated Jul. 23, 2020.
Notice of Allowance issued in related U.S. Appl. No. 16/432,791 dated Jul. 2, 2020.
Non-Final Office Action issued in related U.S. Appl. No. 16/432,488 dated Aug. 7, 2020.
Non-Final Office Action issued in related U.S. Appl. No. 16/432,556 dated Aug. 12, 2020.
Non-Final Office Action issued in related U.S. Appl. No. 16/432,751 dated Aug. 12, 2020.
Notice of Allowance issued in related U.S. Appl. No. 16/432,032 dated Aug. 21, 2020.
Notice of Allowance issued in related U.S. Appl. No. 16/432,772 dated Aug. 26, 2020.
Non-Final Office Action issued in related U.S. Appl. No. 16/433,053 dated Sep. 4, 2020.
Non-Final Office Action issued in related U.S. Appl. No. 16/432,689 dated Sep. 8, 2020.
Corrected Notice of Allowance issued in related U.S. Appl. No. 16/433,032 dated Sep. 28, 2020.
Final Office Action issued in related U.S. Appl. No. 16/432,626 dated Sep. 30, 2020.
Corrected Notice of Allowance issued in related U.S. Appl. No. 16/432,772 dated Sep. 30, 2020.
Notice of Allowance issued in related U.S. Appl. No. 16/432,671 dated Oct. 1, 2020.
Final Office Action issued in related U.S. Appl. No. 16/432,801 dated Oct. 19, 2020.
Corrected Notice of Allowance issued in related U.S. Appl. No. 16/432,772 dated Oct. 23, 2020.
Corrected Notice of Allowance issued in related U.S. Appl. No. 16/433,032 dated Oct. 23, 2020.
Notice of Allowance issued in related U.S. Appl. No. 16/432,818 dated Oct. 26, 2020.
Supplemental Notice of Allowance issued in related U.S. Appl. No. 16/432,780 dated Oct. 26, 2020.
Final Office Action issued in related U.S. Appl. No. 16/433,006 dated Oct. 29, 2020.
Final Office Action issued in related U.S. Appl. No. 16/432,733 dated Nov. 4, 2020.
Final Office Action issued in related U.S. Appl. No. 16/432,762 dated Nov. 13, 2020.
Final Office Action issued in related U.S. Appl. No. 16/433,022 dated Nov. 23, 2020.
IP.com Search Query Report (performed Nov. 19, 2020), (Year:2020).
Final Office Action issued in related U.S. Appl. No. 16/432,751 dated Dec. 21, 2020.
Final Office Action issued in related U.S. Appl. No. 16/432,488 dated Dec. 30, 2020.
Notice of Allowance issued in related U.S. Appl. No. 16/432,689 dated Jan. 14, 2021.
Alharbi, T. et al., "Holistic DDoS Mitigation Using NFV", 2017 IEEE 7th Annual Computing and Communication Workshop and Conference (CCWC), Year: 2017 | Conference Paper, Publisher: IEEE, 4 pages.
Sharma, V., Multi-Agent Based Intrusion Prevention and Mitigation Architecture for Software Defined Networks, 2017 International Conference on Information and Communication Technology Convergence (ICTC) Year: 2017 | Conference Paper | Publisher: IEEE, 7 pages.
Notice of Allowance issued in related U.S. Appl. No. 16/432,626 dated Dec. 24, 2020.
Non-Final Office Action issued in related U.S. Appl. No. 16/433,006 dated Feb. 19, 2021.
Notice of Allowance issued in related U.S. Appl. No. 16/432,556 dated Feb. 19, 2021.
S. Bhatt, P. K. Manadhata and L. Zomlot, "The Operational Role of Security Information and Event Management Systems," in IEEE Security & Privacy, vol. 12, No. 5, pp. 35-41, Sep.-Oct. 2014, doi: 10.1109/MSP.2014.103. (Year: 2014).
Florian Skopik, Giuseppe Settanni, Roman Fiedler, A survey on the dimensions of collective cyber defense through security information sharing, Computers & Security, vol. 60, 2016, https://doi.org/10.1016/j.cose.2016.04.003. (Year: 2016).

(56) References Cited

OTHER PUBLICATIONS

Supplemental Notice of Allowance issued in related U.S. Appl. No. 16/432,689 dated Feb. 19, 2021.
Non-Final Office Action issued in related U.S. Appl. No. 16/433,006 dated Feb. 25, 2021.
Notice of Allowance issued in related U.S. Appl. No. 16/432,762 dated Feb. 26, 2021.
Corrected Notice of Allowance issued in related U.S. Appl. No. 16/432,818 dated Feb. 26, 2021.
Supplemental Notice of Allowance issued in related U.S. Appl. No. 16/432,689 dated Feb. 26, 2021.
Non-Final Office Action issued in related U.S. Appl. No. 16/432,733 dated Mar. 12, 2021.
Notice of Allowance issued in related U.S. Appl. No. 16/433,022 dated Mar. 12, 2021.
Final Office Action issued in related U.S. Appl. No. 16/433,053 dated Mar. 30, 2021.
Notice of Allowance issued in related U.S. Appl. No. 16/432,801 dated Apr. 8, 2021.
Final Office Action issued in U.S. Appl. No. 16/433,006 dated Jun. 24, 2021.
Notice of Allowance issued in U.S. Appl. No. 16/432,556 dated Jun. 1, 2021.
Notice of Allowance issued in U.S. Appl. No. 16/432,762 dated Jun. 10, 2021.
Final Office Action issued in related U.S. Appl. No. 16/432,733 dated Jun. 28, 2021.
Notice of Allowance issued in related U.S. Appl. No. 16/432,801 dated Jun. 29, 2021.
Non-Final Office Action issued in related U.S. Appl. No. 16/883,562 dated Jun. 30, 2021.
Non-Final Office Action issued in related U.S. Appl. No. 16/432,751 dated Aug. 9, 2021.
Notice of Allowance issued in related U.S. Appl. No. 16/432,689 dated Jul. 12, 2021.
Notice of Allowance issued in related U.S. Appl. No. 16/433,053 dated Aug. 5, 2021.
Non-Final Office Action issued in related U.S. Appl. No. 16/432,488 dated Sep. 1, 2021.
Notice of Allowance issued in related U.S. Appl. No. 16/433,022 dated Sep. 10, 2021.
Non-Final Office Action issued in related U.S. Appl. No. 17/337,132 dated Sep. 29, 2021.
Notice of Allowance issued in related U.S. Appl. No. 16/432,801 dated Oct. 21, 2021.
IP.com Search Query Report (performed Aug. 31, 2021) (Year: 2021).
Notice of Allowance issued in related U.S. Appl. No. 16/433,053 dated Nov. 16, 2021.
Notice of Allowance issued in related U.S. Appl. No. 16/433,006 dated Nov. 16, 2021.
Notice of Allowance issued in U.S. Appl. No. 16/432,733 dated Dec. 3, 2021.
Notice of Allowance issued in U.S. Appl. No. 16/433,022 dated Jan. 10, 2022.
Notice of Allowance issued in U.S. Appl. No. 16/432,689 dated Jan. 18, 2022.
Search Query Report from IP.com (performed Dec. 12, 2021).
Final Office Action issued in U.S. Appl. No. 17/337,132 dated Jan. 24, 2022.
Notice of Allowance issued in U.S. Appl. No. 16/432,488 dated Jan. 25, 2022.
Final Office Action issued in U.S. Appl. No. 16/432,751 dated Feb. 2, 2022.
Notice of Allowance issued in U.S. Appl. No. 16/433,006 dated Feb. 16, 2022.
Notice of Allowance issued in U.S. Appl. No. 16/433,053 dated Feb. 16, 2022.
Final Office Action issued in U.S. Appl. No. 16/883,562 dated Apr. 1, 2022.
Notice of Allowance issued in U.S. Appl. No. 16/432,689 dated Apr. 1, 2022.
Notice of Allowance issued in U.S. Appl. No. 17/337,132 dated Apr. 12, 2022.
Communication pursuant to Rules 70(2) and 70a(2) EPC enclosing Extended European Search Report issued in European Patent Application No. 19814914.8 dated Mar. 15, 2022.
Communication pursuant to Rules 70(2) and 70a(2) EPC enclosing Extended European Search Report issued in European Patent Application No. 19814205.1; dated Mar. 15, 2022.
Communication pursuant to Rules 70(2) and 70a(2) EPC enclosing Extended European Search Report issued in European Patent Application No. 19815056.8; dated Mar. 15, 2022.
Communication pursuant to Rules 70(2) and 70a(2) EPC enclosing Extended European Search Report issued in European Patent Application No. 19814594.8; dated Mar. 15, 2022.
Communication pursuant to Rules 70(2) and 70a(2) EPC enclosing Extended European Search Report issued in European Patent Application No. 19815718.2; dated Mar. 15, 2022.
Communication pursuant to Rules 70(2) and 70a(2) EPC enclosing Extended European Search Report issued in European Patent Application No. 198142044; dated Mar. 15, 2022.
Communication pursuant to Rules 70(2) and 70a(2) EPC enclosing Extended European Search Report issued in European Patent Application No. 19816167.1; dated Mar. 15, 2022.
Non-Final Office Action issued in U.S. Appl. No. 16/432,751 dated Jun. 6, 2022.
Non-Final Office Action issued in U.S. Appl. No. 17/337,132 dated Jun. 9, 2022.
Non-Final Office Action issued in U.S. Appl. No. 17/680,985 dated Jul. 14, 2022.
Non-Final Office Action issued in U.S. Appl. No. 16/883,562 dated Jul. 14, 2022.
Non-Final Office Action issued in U.S. Appl. No. 17/680,985 dated Aug. 2, 2022.
Notice of Allowance issued in U.S. Appl. No. 16/432,488 dated Aug. 3, 2022.
Notice of Allowance dated Aug. 18, 2022 in U.S. Appl. No. 17/848,986.
Notice of Allowance dated Sep. 8, 2022 in U.S. Appl. No. 17/337,132.
Notice of Allowance issued in related U.S. Appl. No. 16/432,689 dated Oct. 5, 2022.
Final Office Action issued in related U.S. Appl. No. 16/432,751 dated Oct. 13, 2022.
Non-Final Office Action issued in U.S. Appl. No. 17/688,073 dated Oct. 26, 2022.
Notice of Allowance dated Oct. 27, 2022 in U.S. Appl. No. 16/883,562.
Peng et al. "T-dominance: Prioritized Defense Deployment for BOYD Security", Oct. 2013, IEEE Conference on Communications and Network Security, pp. 37-45 (Year:2013).
Notice of Allowance issued in related U.S. Appl. No. 17/337,132 dated Dec. 23, 2022.
Final Office Action issued in related U.S. Appl. No. 17/688,073 dated Feb. 16, 2023.
Notice of Allowance issued in related U.S. Appl. No. 17/848,986 dated Mar. 6, 2023.
Non-Final Office Action issued in related U.S. Appl. No. 17/747,086 dated Mar. 20, 2023.
Non-Final Office Action issued in related U.S. Appl. No. 17/951,690 dated Mar. 2, 2023.
Non-Final Office Action issued in related U.S. Appl. No. 16/432,751 dated Mar. 27, 2023.
Non-Final Office Action issued in related U.S. Appl. No. 17/735,448 dated May 23, 2023.

\* cited by examiner

350

Summary Overview

605

Visibility

237

Log Source Coverage
Log Source Diversity
Kill Chain Coverage
Threat Context

Tool Efficacy

149

SIEM Health
SIEM Maturity

Team Performance

219

False Positive Rate
Anomalous Safe Rate
No Response Rate
Mean Time to Resolve (MTTR)

Industry Classification
54- Professional, Scientific, and Technical

352

352

THREAT MITIGATION SYSTEM AND METHOD

RELATED APPLICATIONS

This application is a continuation of U.S. Non-Provisional application Ser. No. 16/432,801, filed Jun. 5, 2019 which claims the benefit of the following U.S. Provisional Application Nos.: 62/681,279, filed on Jun. 6, 2018; 62/737,558, filed on Sep. 27, 2018; and 62/817,943, filed on Mar. 13, 2019, the entire contents of which are herein incorporated by reference.

TECHNICAL FIELD

This disclosure relates to threat mitigation systems and, more particularly, to threat mitigation systems that utilize Artificial Intelligence (AI) and Machine Learning (ML).

BACKGROUND

In the computer world, there is a constant battle occurring between bad actors that want to attack computing platforms and good actors who try to prevent the same. Unfortunately, the complexity of such computer attacks in constantly increasing, so technology needs to be employed that understands the complexity of these attacks and is capable of addressing the same. Additionally, the use of Artificial Intelligence (AI) and Machine Learning (ML) has revolutionized the manner in which large quantities of content may be processed so that information may be extracted that is not readily discernible to a human user. Accordingly and though the use of AI/ML, the good actors may gain the upper hand in this never ending battle.

SUMMARY OF DISCLOSURE

---
Concept 15)
---

In one implementation, a computer-implemented method is executed on a computing device and includes: defining a training routine for a specific attack of a computing platform; and generating a simulation of the specific attack by executing the training routine within a controlled test environment.

One or more of the following features may be included. Generating a simulation of the specific attack by executing the training routine within a controlled test environment may include: rendering the simulation of the specific attack on the controlled test environment. A trainee may be allowed to view the simulation of the specific attack. A trainee may be allowed to provide a trainee response to the simulation of the specific attack. The effectiveness of the trainee response may be determined. Determining the effectiveness of the trainee response may include: assigning a grade to the trainee response. The controlled test environment may be a virtual machine executed on a computing device.

In another implementation, a computer program product resides on a computer readable medium and has a plurality of instructions stored on it. When executed by a processor, the instructions cause the processor to perform operations including: defining a training routine for a specific attack of a computing platform; and generating a simulation of the specific attack by executing the training routine within a controlled test environment.

One or more of the following features may be included. Generating a simulation of the specific attack by executing the training routine within a controlled test environment may include: rendering the simulation of the specific attack on the controlled test environment. A trainee may be allowed to view the simulation of the specific attack. A trainee may be allowed to provide a trainee response to the simulation of the specific attack. The effectiveness of the trainee response may be determined. Determining the effectiveness of the trainee response may include: assigning a grade to the trainee response. The controlled test environment may be a virtual machine executed on a computing device.

In another implementation, a computing system includes a processor and memory is configured to perform operations including: defining a training routine for a specific attack of a computing platform; and generating a simulation of the specific attack by executing the training routine within a controlled test environment.

One or more of the following features may be included. Generating a simulation of the specific attack by executing the training routine within a controlled test environment may include: rendering the simulation of the specific attack on the controlled test environment. A trainee may be allowed to view the simulation of the specific attack. A trainee may be allowed to provide a trainee response to the simulation of the specific attack. The effectiveness of the trainee response may be determined. Determining the effectiveness of the trainee response may include: assigning a grade to the trainee response. The controlled test environment may be a virtual machine executed on a computing device.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
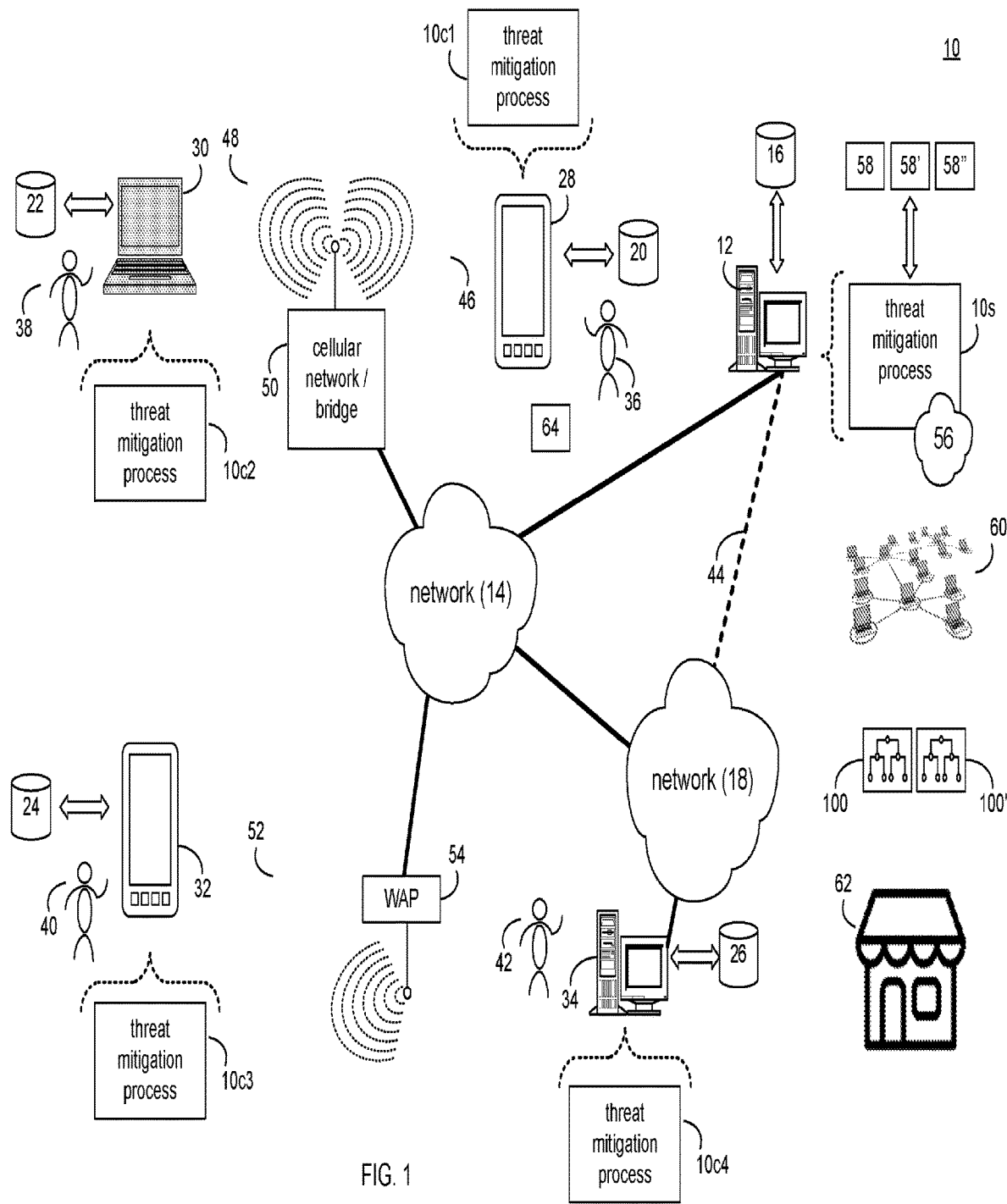
FIG. 1 is a diagrammatic view of a distributed computing network including a computing device that executes a threat mitigation process according to an embodiment of the present disclosure.

Referring to FIG. 1, there is shown threat mitigation process 10. Threat mitigation process 10 may be implemented as a server-side process, a client-side process, or a hybrid server-side/client-side process. For example, threat mitigation process 10 may be implemented as a purely server-side process via threat mitigation process 10s. Alternatively, threat mitigation process 10 may be implemented as a purely client-side process via one or more of threat mitigation process 10c1, threat mitigation process 10c2, threat mitigation process 10c3, and threat mitigation process 10c4. Alternatively still, threat mitigation process 10 may be implemented as a hybrid server-side/client-side process via threat mitigation process 10s in combination with one or more of threat mitigation process 10c1, threat mitigation process 10c2, threat mitigation process 10c3, and threat mitigation process 10c4. Accordingly, threat mitigation process 10 as used in this disclosure may include any combination of threat mitigation process 10s, threat mitigation process 10c1, threat mitigation process 10c2, threat mitigation process, and threat mitigation process 10c4.

Threat mitigation process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a cable/satellite receiver with one or more processors embedded therein or coupled thereto, a server computer, a series of server computers, a mini computer, a mainframe computer, or a cloud-based computing network.

The instruction sets and subroutines of threat mitigation process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of threat mitigation processes 10c1, 10c2, 10c3, 10c4 may include but are not limited to a client application, a web browser, a game console user interface, or a specialized application (e.g., an application running on e.g., the Android" platform or the iOS™ platform). The instruction sets and subroutines of threat mitigation processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage device 16 may include but are not limited to: a hard disk drive; a RAID device; a random access memory (RAM); a read-only memory (ROM); and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access threat mitigation process 10 directly through network 14 or through secondary network 18. Further, threat mitigation process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. Additionally, personal computer 34 is shown directly coupled to network 18 via a hardwired network connection.

WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Artificial Intelligence/Machines Learning Overview:

Assume for illustrative purposes that threat mitigation process 10 includes probabilistic process 56 (e.g., an artificial intelligence/machine learning process) that is configured to process information (e.g., information 58). As will be discussed below in greater detail, examples of information 58 may include but are not limited to platform information (e.g., structured or unstructured content) being scanned to detect security events (e.g., access auditing; anomalies; authentication; denial of services; exploitation; malware; phishing; spamming; reconnaissance; and/or web attack) within a monitored computing platform (e.g., computing platform 60).

As is known in the art, structured content may be content that is separated into independent portions (e.g., fields, columns, features) and, therefore, may have a pre-defined data model and/or is organized in a pre-defined manner. For example, if the structured content concerns an employee list: a first field, column or feature may define the first name of the employee; a second field, column or feature may define the last name of the employee; a third field, column or feature may define the home address of the employee; and a fourth field, column or feature may define the hire date of the employee.

Further and as is known in the art, unstructured content may be content that is not separated into independent portions (e.g., fields, columns, features) and, therefore, may not have a pre-defined data model and/or is not organized in a pre-defined manner. For example, if the unstructured content concerns the same employee list: the first name of the employee, the last name of the employee, the home address of the employee, and the hire date of the employee may all be combined into one field, column or feature.

For the following illustrative example, assume that information 58 is unstructured content, an example of which may include but is not limited to unstructured user feedback received by a company (e.g., text-based feedback such as text-messages, social media posts, and email messages; and transcribed voice-based feedback such as transcribed voice mail, and transcribed voice messages).

When processing information 58, probabilistic process 56 may use probabilistic modeling to accomplish such processing, wherein examples of such probabilistic modeling may include but are not limited to discriminative modeling, generative modeling, or combinations thereof.

As is known in the art, probabilistic modeling may be used within modern artificial intelligence systems (e.g., probabilistic process 56), in that these probabilistic models may provide artificial intelligence systems with the tools required to autonomously analyze vast quantities of data (e.g., information 58).

Examples of the tasks for which probabilistic modeling may be utilized may include but are not limited to:
 predicting media (music, movies, books) that a user may like or enjoy based upon media that the user has liked or enjoyed in the past;
 transcribing words spoken by a user into editable text;
 grouping genes into gene clusters;
 identifying recurring patterns within vast data sets;
 filtering email that is believed to be spam from a user's inbox;
 generating clean (i.e., non-noisy) data from a noisy data set;
 analyzing (voice-based or text-based) customer feedback; and
 diagnosing various medical conditions and diseases.

For each of the above-described applications of probabilistic modeling, an initial probabilistic model may be defined, wherein this initial probabilistic model may be subsequently (e.g., iteratively or continuously) modified and revised, thus allowing the probabilistic models and the artificial intelligence systems (e.g., probabilistic process 56) to "learn" so that future probabilistic models may be more precise and may explain more complex data sets.

Accordingly, probabilistic process 56 may define an initial probabilistic model for accomplishing a defined task (e.g., the analyzing of information 58). For the illustrative example, assume that this defined task is analyzing customer feedback (e.g., information 58) that is received from customers of e.g., store 62 via an automated feedback phone line. For this example, assume that information 58 is initially voice-based content that is processed via e.g., a speech-to-text process that results in unstructured text-based customer feedback (e.g., information 58).

With respect to probabilistic process 56, a probabilistic model may be utilized to go from initial observations about information 58 (e.g., as represented by the initial branches of a probabilistic model) to conclusions about information 58 (e.g., as represented by the leaves of a probabilistic model).

As used in this disclosure, the term "branch" may refer to the existence (or non-existence) of a component (e.g., a sub-model) of (or included within) a model. Examples of such a branch may include but are not limited to: an execution branch of a probabilistic program or other generative model, a part (or parts) of a probabilistic graphical model, and/or a component neural network that may (or may not) have been previously trained.

While the following discussion provides a detailed example of a probabilistic model, this is for illustrative purposes only and is not intended to be a limitation of this disclosure, as other configurations are possible and are considered to be within the scope of this disclosure. For example, the following discussion may concern any type of model (e.g., be it probabilistic or other) and, therefore, the below-described probabilistic model is merely intended to be one illustrative example of a type of model and is not intended to limit this disclosure to probabilistic models.

Additionally, while the following discussion concerns word-based routing of messages through a probabilistic model, this is for illustrative purposes only and is not intended to be a limitation of this disclosure, as other configurations are possible and are considered to be within the scope of this disclosure. Examples of other types of information that may be used to route messages through a probabilistic model may include: the order of the words within a message; and the punctuation interspersed throughout the message.

Figure 2:
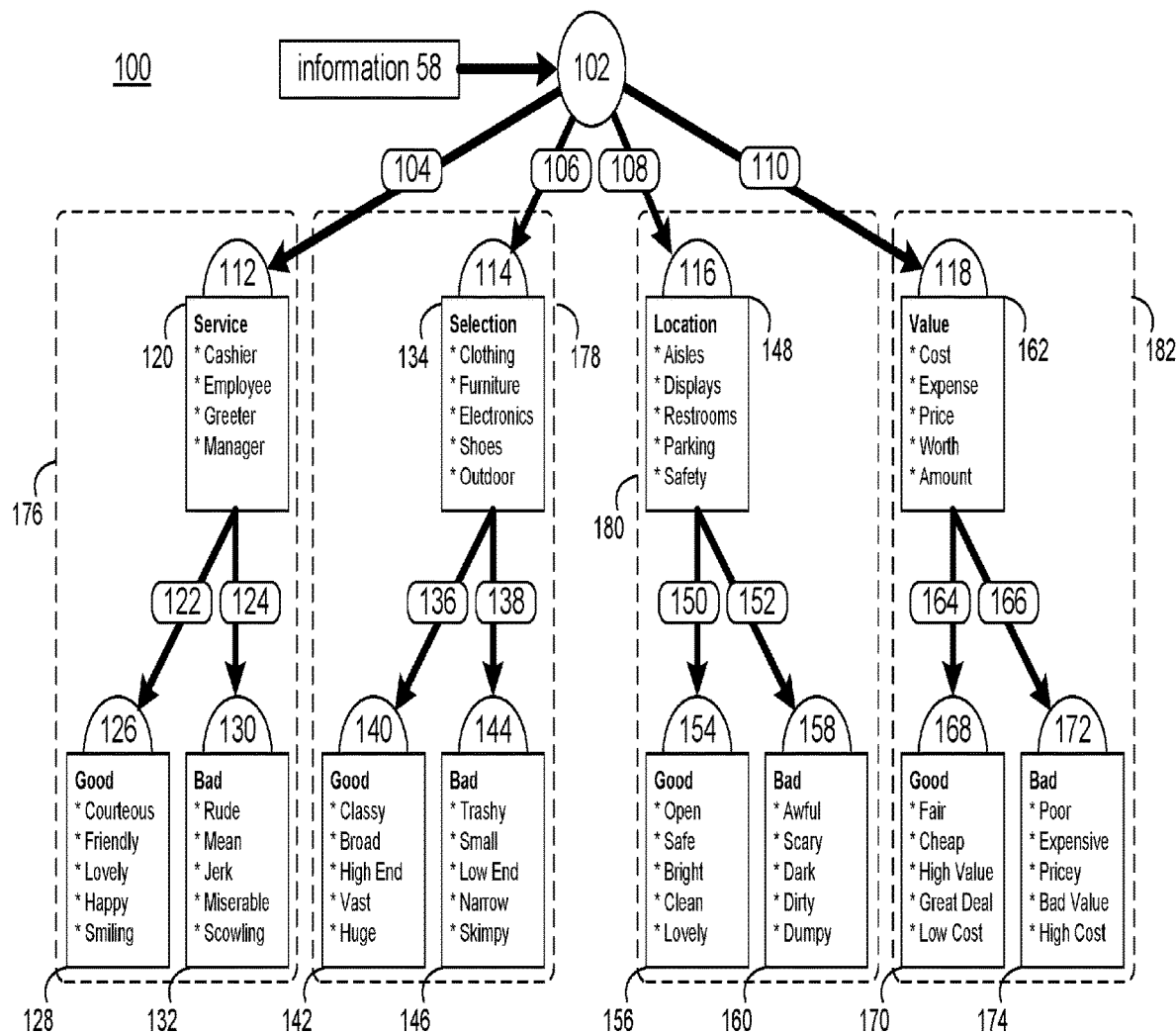
FIG. 2 is a diagrammatic view of an exemplary probabilistic model rendered by a probabilistic process of the threat mitigation process of FIG. 1 according to an embodiment of the present disclosure.

For example and referring also to FIG. 2, there is shown one simplified example of a probabilistic model (e.g., probabilistic model 100) that may be utilized to analyze information 58 (e.g. unstructured text-based customer feedback) concerning store 62. The manner in which probabilistic model 100 may be automatically-generated by probabilistic process 56 will be discussed below in detail. In this particular example, probabilistic model 100 may receive information 58 (e.g. unstructured text-based customer feedback) at branching node 102 for processing. Assume that probabilistic model 100 includes four branches off of branching node 102, namely: service branch 104; selection branch 106;

location branch 108; and value branch 110 that respectively lead to service node 112, selection node 114, location node 116, and value node 118.

As stated above, service branch 104 may lead to service node 112, which may be configured to process the portion of information 58 (e.g. unstructured text-based customer feedback) that concerns (in whole or in part) feedback concerning the customer service of store 62. For example, service node 112 may define service word list 120 that may include e.g., the word service, as well as synonyms of (and words related to) the word service (e.g., cashier, employee, greeter and manager). Accordingly and in the event that a portion of information 58 (e.g., a text-based customer feedback message) includes the word cashier, employee, greeter and/or manager, that portion of information 58 may be considered to be text-based customer feedback concerning the service received at store 62 and (therefore) may be routed to service node 112 of probabilistic model 100 for further processing. Assume for this illustrative example that probabilistic model 100 includes two branches off of service node 112, namely: good service branch 122 and bad service branch 124.

Good service branch 122 may lead to good service node 126, which may be configured to process the portion of information 58 (e.g. unstructured text-based customer feedback) that concerns (in whole or in part) good feedback concerning the customer service of store 62. For example, good service node 126 may define good service word list 128 that may include e.g., the word good, as well as synonyms of (and words related to) the word good (e.g., courteous, friendly, lovely, happy, and smiling). Accordingly and in the event that a portion of information 58 (e.g., a text-based customer feedback message) that was routed to service node 112 includes the word good, courteous, friendly, lovely, happy, and/or smiling, that portion of information 58 may be considered to be text-based customer feedback indicative of good service received at store 62 (and, therefore, may be routed to good service node 126).

Bad service branch 124 may lead to bad service node 130, which may be configured to process the portion of information 58 (e.g. unstructured text-based customer feedback) that concerns (in whole or in part) bad feedback concerning the customer service of store 62. For example, bad service node 130 may define bad service word list 132 that may include e.g., the word bad, as well as synonyms of (and words related to) the word bad (e.g., rude, mean, jerk, miserable, and scowling). Accordingly and in the event that a portion of information 58 (e.g., a text-based customer feedback message) that was routed to service node 112 includes the word bad, rude, mean, jerk, miserable, and/or scowling, that portion of information 58 may be considered to be text-based customer feedback indicative of bad service received at store 62 (and, therefore, may be routed to bad service node 130).

As stated above, selection branch 106 may lead to selection node 114, which may be configured to process the portion of information 58 (e.g. unstructured text-based customer feedback) that concerns (in whole or in part) feedback concerning the selection available at store 62. For example, selection node 114 may define selection word list 134 that may include e.g., words indicative of the selection available at store 62. Accordingly and in the event that a portion of information 58 (e.g., a text-based customer feedback message) includes any of the words defined within selection word list 134, that portion of information 58 may be considered to be text-based customer feedback concerning the selection available at store 62 and (therefore) may be routed to selection node 114 of probabilistic model 100 for further processing. Assume for this illustrative example that probabilistic model 100 includes two branches off of selection node 114, namely: good selection branch 136 and bad selection branch 138.

Good selection branch 136 may lead to good selection node 140, which may be configured to process the portion of information 58 (e.g. unstructured text-based customer feedback) that concerns (in whole or in part) good feedback concerning the selection available at store 62. For example, good selection node 140 may define good selection word list 142 that may include words indicative of a good selection at store 62. Accordingly and in the event that a portion of information 58 (e.g., a text-based customer feedback message) that was routed to selection node 114 includes any of the words defined within good selection word list 142, that portion of information 58 may be considered to be text-based customer feedback indicative of a good selection available at store 62 (and, therefore, may be routed to good selection node 140).

Bad selection branch 138 may lead to bad selection node 144, which may be configured to process the portion of information 58 (e.g. unstructured text-based customer feedback) that concerns (in whole or in part) bad feedback concerning the selection available at store 62. For example, bad selection node 144 may define bad selection word list 146 that may include words indicative of a bad selection at store 62. Accordingly and in the event that a portion of information 58 (e.g., a text-based customer feedback message) that was routed to selection node 114 includes any of the words defined within bad selection word list 146, that portion of information 58 may be considered to be text-based customer feedback indicative of a bad selection being available at store 62 (and, therefore, may be routed to bad selection node 144).

As stated above, location branch 108 may lead to location node 116, which may be configured to process the portion of information 58 (e.g. unstructured text-based customer feedback) that concerns (in whole or in part) feedback concerning the location of store 62. For example, location node 116 may define location word list 148 that may include e.g., words indicative of the location of store 62. Accordingly and in the event that a portion of information 58 (e.g., a text-based customer feedback message) includes any of the words defined within location word list 148, that portion of information 58 may be considered to be text-based customer feedback concerning the location of store 62 and (therefore) may be routed to location node 116 of probabilistic model 100 for further processing. Assume for this illustrative example that probabilistic model 100 includes two branches off of location node 116, namely: good location branch 150 and bad location branch 152.

Good location branch 150 may lead to good location node 154, which may be configured to process the portion of information 58 (e.g. unstructured text-based customer feedback) that concerns (in whole or in part) good feedback concerning the location of store 62. For example, good location node 154 may define good location word list 156 that may include words indicative of store 62 being in a good location. Accordingly and in the event that a portion of information 58 (e.g., a text-based customer feedback message) that was routed to location node 116 includes any of the words defined within good location word list 156, that portion of information 58 may be considered to be text-based customer feedback indicative of store 62 being in a good location (and, therefore, may be routed to good location node 154).

Bad location branch 152 may lead to bad location node 158, which may be configured to process the portion of information 58 (e.g. unstructured text-based customer feedback) that concerns (in whole or in part) bad feedback concerning the location of store 62. For example, bad location node 158 may define bad location word list 160 that may include words indicative of store 62 being in a bad location. Accordingly and in the event that a portion of information 58 (e.g., a text-based customer feedback message) that was routed to location node 116 includes any of the words defined within bad location word list 160, that portion of information 58 may be considered to be text-based customer feedback indicative of store 62 being in a bad location (and, therefore, may be routed to bad location node 158).

As stated above, value branch 110 may lead to value node 118, which may be configured to process the portion of information 58 (e.g. unstructured text-based customer feedback) that concerns (in whole or in part) feedback concerning the value received at store 62. For example, value node 118 may define value word list 162 that may include e.g., words indicative of the value received at store 62. Accordingly and in the event that a portion of information 58 (e.g., a text-based customer feedback message) includes any of the words defined within value word list 162, that portion of information 58 may be considered to be text-based customer feedback concerning the value received at store 62 and (therefore) may be routed to value node 118 of probabilistic model 100 for further processing. Assume for this illustrative example that probabilistic model 100 includes two branches off of value node 118, namely: good value branch 164 and bad value branch 166.

Good value branch 164 may lead to good value node 168, which may be configured to process the portion of information 58 (e.g. unstructured text-based customer feedback) that concerns (in whole or in part) good value being received at store 62. For example, good value node 168 may define good value word list 170 that may include words indicative of receiving good value at store 62. Accordingly and in the event that a portion of information 58 (e.g., a text-based customer feedback message) that was routed to value node 118 includes any of the words defined within good value word list 170, that portion of information 58 may be considered to be text-based customer feedback indicative of good value being received at store 62 (and, therefore, may be routed to good value node 168).

Bad value branch 166 may lead to bad value node 172, which may be configured to process the portion of information 58 (e.g. unstructured text-based customer feedback) that concerns (in whole or in part) bad value being received at store 62. For example, bad value node 172 may define bad value word list 174 that may include words indicative of receiving bad value at store 62. Accordingly and in the event that a portion of information 58 (e.g., a text-based customer feedback message) that was routed to value node 118 includes any of the words defined within bad value word list 174, that portion of information 58 may be considered to be text-based customer feedback indicative of bad value being received at store 62 (and, therefore, may be routed to bad value node 172).

Once it is established that good or bad customer feedback was received concerning store 62 (i.e., with respect to the service, the selection, the location or the value), representatives and/or agents of store 62 may address the provider of such good or bad feedback via e.g., social media postings, text-messages and/or personal contact.

Assume for illustrative purposes that user 36 uses data-enabled, cellular telephone 28 to provide feedback 64 (e.g., a portion of information 58) to an automated feedback phone line concerning store 62. Upon receiving feedback 64 for analysis, probabilistic process 56 may identify any pertinent content that is included within feedback 64.

For illustrative purposes, assume that user 36 was not happy with their experience at store 62 and that feedback 64 provided by user 36 was "my cashier was rude and the weather was rainy". Accordingly and for this example, probabilistic process 56 may identify the pertinent content (included within feedback 64) as the phrase "my cashier was rude" and may ignore/remove the irrelevant content "the weather was rainy". As (in this example) feedback 64 includes the word "cashier", probabilistic process 56 may route feedback 64 to service node 112 via service branch 104. Further, as feedback 64 also includes the word "rude", probabilistic process 56 may route feedback 64 to bad service node 130 via bad service branch 124 and may consider feedback 64 to be text-based customer feedback indicative of bad service being received at store 62.

For further illustrative purposes, assume that user 36 was happy with their experience at store 62 and that feedback 64 provided by user 36 was "the clothing I purchased was classy but my cab got stuck in traffic". Accordingly and for this example, probabilistic process 56 may identify the pertinent content (included within feedback 64) as the phrase "the clothing I purchased was classy" and may ignore/remove the irrelevant content "my cab got stuck in traffic". As (in this example) feedback 64 includes the word "clothing", probabilistic process 56 may route feedback 64 to selection node 114 via selection branch 106. Further, as feedback 64 also includes the word "classy", probabilistic process 56 may route feedback 64 to good selection node 140 via good selection branch 136 and may consider feedback 64 to be text-based customer feedback indicative of a good selection being available at store 62.

Model Generation Overview:

While the following discussion concerns the automated generation of a probabilistic model, this is for illustrative purposes only and is not intended to be a limitation of this disclosure, as other configurations are possible and are considered to be within the scope of this disclosure. For example, the following discussion of automated generation may be utilized on any type of model. For example, the following discussion may be applicable to any other form of probabilistic model or any form of generic model (such as Dempster Shaffer theory or fuzzy logic).

As discussed above, probabilistic model 100 may be utilized to categorize information 58, thus allowing the various messages included within information 58 to be routed to (in this simplified example) one of eight nodes (e.g., good service node 126, bad service node 130, good selection node 140, bad selection node 144, good location node 154, bad location node 158, good value node 168, and bad value node 172). For the following example, assume that store 62 is a long-standing and well established shopping establishment. Further, assume that information 58 is a very large quantity of voice mail messages (>10,000 messages) that were left by customers of store 62 on a voice-based customer feedback line. Additionally, assume that this very large quantity of voice mail messages (>10,000) have been transcribed into a very large quantity of text-based messages (>10,000).

Probabilistic process 56 may be configured to automatically define probabilistic model 100 based upon information 58. Accordingly, probabilistic process 56 may receive content (e.g., a very large quantity of text-based messages) and may be configured to define one or more probabilistic model variables for probabilistic model 100. For example, probabilistic process 56 may be configured to allow a user to specify such probabilistic model variables. Another example of such variables may include but is not limited to values and/or ranges of values for a data flow variable. For the following discussion and for this disclosure, examples of a "variable" may include but are not limited to variables, parameters, ranges, branches and nodes.

Specifically and for this example, assume that probabilistic process 56 defines the initial number of branches (i.e., the number of branches off of branching node 102) within probabilistic model 100 as four (i.e., service branch 104, selection branch 106, location branch 108 and value branch 110). The defining of the initial number of branches (i.e., the number of branches off of branching node 102) within probabilistic model 100 as four may be effectuated in various ways (e.g., manually or algorithmically). Further and when defining probabilistic model 100 based, at least in part, upon information 58 and the one or more model variables (i.e., defining the number of branches off of branching node 102 as four), probabilistic process 56 may process information 58 to identify the pertinent content included within information 58. As discussed above, probabilistic process 56 may identify the pertinent content (included within information 58) and may ignore/remove the irrelevant content.

This type of processing of information 58 may continue for all of the very large quantity of text-based messages (>10,000) included within information 58. And using the probabilistic modeling technique described above, probabilistic process 56 may define a first version of the probabilistic model (e.g., probabilistic model 100) based, at least in part, upon pertinent content found within information 58. Accordingly, a first text-based message included within information 58 may be processed to extract pertinent information from that first message, wherein this pertinent information may be grouped in a manner to correspond (at least temporarily) with the requirement that four branches originate from branching node 102 (as defined above).

As probabilistic process 56 continues to process information 58 to identify pertinent content included within information 58, probabilistic process 56 may identify patterns within these text-based message included within information 58. For example, the messages may all concern one or more of the service, the selection, the location and/or the value of store 62. Further and e.g., using the probabilistic modeling technique described above, probabilistic process 56 may process information 58 to e.g.: a) sort text-based messages concerning the service into positive or negative service messages; b) sort text-based messages concerning the selection into positive or negative selection messages; c) sort text-based messages concerning the location into positive or negative location messages; and/or d) sort text-based messages concerning the value into positive or negative service messages. For example, probabilistic process 56 may define various lists (e.g., lists 128, 132, 142, 146, 156, 160, 170, 174) by starting with a root word (e.g., good or bad) and may then determine synonyms for these words and use those words and synonyms to populate lists 128, 132, 142, 146, 156, 160, 170, 174.

Continuing with the above-stated example, once information 58 (or a portion thereof) is processed by probabilistic process 56, probabilistic process 56 may define a first version of the probabilistic model (e.g., probabilistic model 100) based, at least in part, upon pertinent content found within information 58. Probabilistic process 56 may compare the first version of the probabilistic model (e.g., probabilistic model 100) to information 58 to determine if the first version of the probabilistic model (e.g., probabilistic model 100) is a good explanation of the content.

When determining if the first version of the probabilistic model (e.g., probabilistic model 100) is a good explanation of the content, probabilistic process 56 may use an ML algorithm to fit the first version of the probabilistic model (e.g., probabilistic model 100) to the content, wherein examples of such an ML algorithm may include but are not limited to one or more of: an inferencing algorithm, a learning algorithm, an optimization algorithm, and a statistical algorithm.

For example and as is known in the art, probabilistic model 100 may be used to generate messages (in addition to analyzing them). For example and when defining a first version of the probabilistic model (e.g., probabilistic model 100) based, at least in part, upon pertinent content found within information 58, probabilistic process 56 may define a weight for each branch within probabilistic model 100 based upon information 58. For example, threat mitigation process 10 may equally weight each of branches 104, 106, 108, 110 at 25%. Alternatively, if e.g., a larger percentage of information 58 concerned the service received at store 62, threat mitigation process 10 may equally weight each of branches 106, 108, 110 at 20%, while more heavily weighting branch 104 at 40%.

Accordingly and when probabilistic process 56 compares the first version of the probabilistic model (e.g., probabilistic model 100) to information 58 to determine if the first version of the probabilistic model (e.g., probabilistic model 100) is a good explanation of the content, probabilistic process 56 may generate a very large quantity of messages e.g., by auto-generating messages using the above-described probabilities, the above-described nodes & node types, and the words defined in the above-described lists (e.g., lists 128, 132, 142, 146, 156, 160, 170, 174), thus resulting in generated information 58'. Generated information 58' may then be compared to information 58 to determine if the first version of the probabilistic model (e.g., probabilistic model 100) is a good explanation of the content. For example, if generated information 58' exceeds a threshold level of similarity to information 58, the first version of the probabilistic model (e.g., probabilistic model 100) may be deemed a good explanation of the content. Conversely, if generated information 58' does not exceed a threshold level of similarity to information 58, the first version of the probabilistic model (e.g., probabilistic model 100) may be deemed not a good explanation of the content.

If the first version of the probabilistic model (e.g., probabilistic model 100) is not a good explanation of the content, probabilistic process 56 may define a revised version of the probabilistic model (e.g., revised probabilistic model 100'). When defining revised probabilistic model 100', probabilistic process 56 may e.g., adjust weighting, adjust probabilities, adjust node counts, adjust node types, and/or adjust branch counts to define the revised version of the probabilistic model (e.g., revised probabilistic model 100'). Once defined, the above-described process of auto-generating messages (this time using revised probabilistic model 100') may be repeated and this newly-generated content (e.g., generated information 58") may be compared to information 58 to determine if e.g., revised probabilistic model 100' is a good explanation of the content. If revised probabilistic model 100' is not a good explanation of the content, the above-described process may be repeated until a proper probabilistic model is defined.

The Threat Mitigation Process

As discussed above, threat mitigation process 10 may include probabilistic process 56 (e.g., an artificial intelligence/machine learning process) that may be configured to process information (e.g., information 58), wherein examples of information 58 may include but are not limited to platform information (e.g., structured or unstructured content) that may be scanned to detect security events (e.g., access auditing; anomalies; authentication; denial of services; exploitation; malware; phishing; spamming; reconnaissance; and/or web attack) within a monitored computing platform (e.g., computing platform 60).

Figure 3:
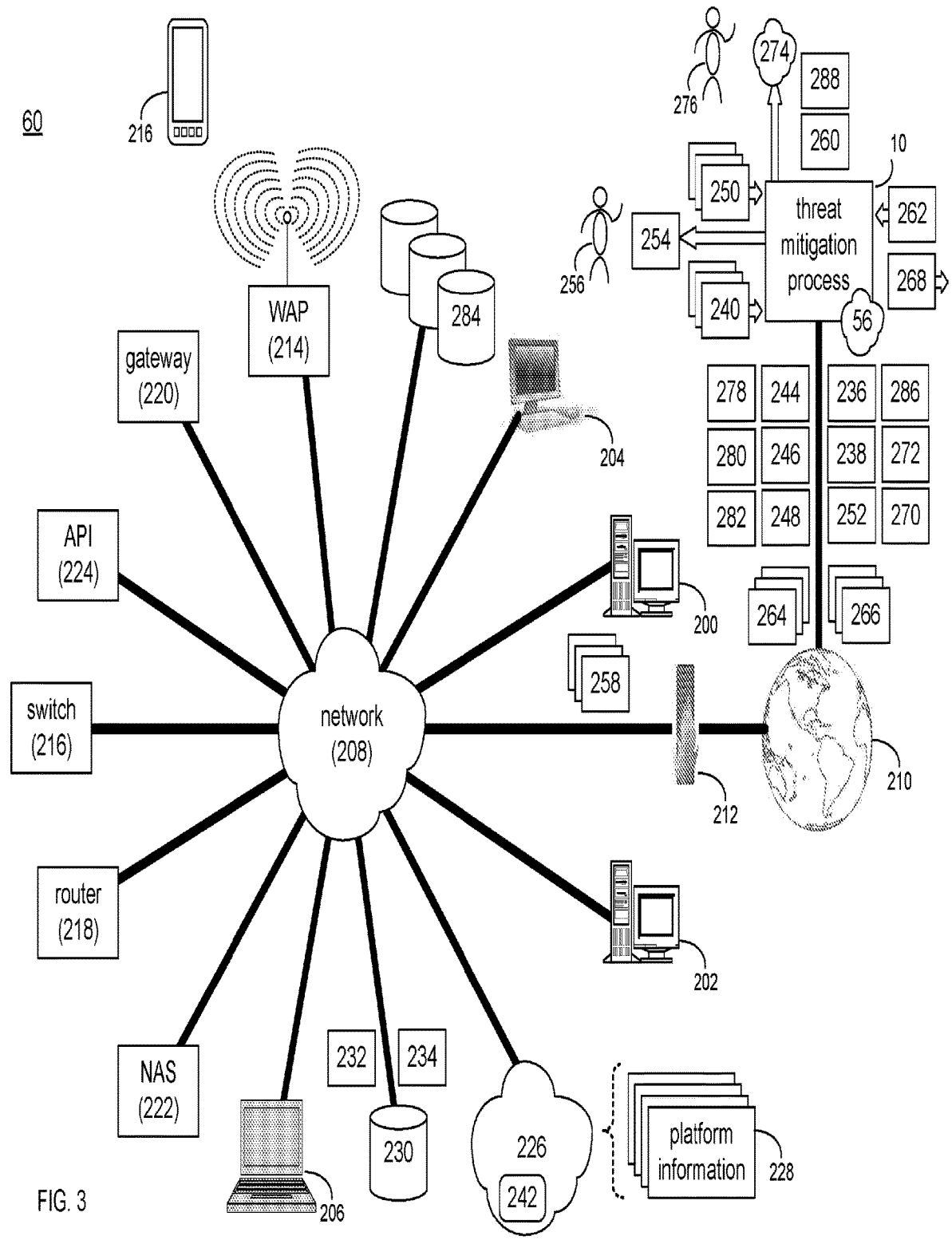
FIG. 3 is a diagrammatic view of the computing platform of FIG. 1 according to an embodiment of the present disclosure.

Referring also to FIG. 3, the monitored computing platform (e.g., computing platform 60) utilized by business today may be a highly complex, multi-location computing system/network that may span multiple buildings/locations/countries. For this illustrative example, the monitored computing platform (e.g., computing platform 60) is shown to include many discrete computing devices, examples of which may include but are not limited to: server computers (e.g., server computers 200, 202), desktop computers (e.g., desktop computer 204), and laptop computers (e.g., laptop computer 206), all of which may be coupled together via a network (e.g., network 208), such as an Ethernet network. Computing platform 60 may be coupled to an external network (e.g., Internet 210) through WAF (i.e., Web Application Firewall) 212. A wireless access point (e.g., WAP 214) may be configured to allow wireless devices (e.g., smartphone 216) to access computing platform 60. Computing platform 60 may include various connectivity devices that enable the coupling of devices within computing platform 60, examples of which may include but are not limited to: switch 216, router 218 and gateway 220. Computing platform 60 may also include various storage devices (e.g., NAS 222), as well as functionality (e.g., API Gateway 224) that allows software applications to gain access to one or more resources within computing platform 60.

In addition to the devices and functionality discussed above, other technology (e.g., security-relevant subsystems 226) may be deployed within computing platform 60 to monitor the operation of (and the activity within) computing platform 60. Examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Each of security-relevant subsystems 226 may monitor and log their activity with respect to computing platform 60, resulting in the generation of platform information 228. For example, platform information 228 associated with a client-defined MDM (i.e., Mobile Device Management) system may monitor and log the mobile devices that were allowed access to computing platform 60.

Further, SEIM (i.e., Security Information and Event Management) system 230 may be deployed within computing platform 60. As is known in the art, STEM system 230 is an approach to security management that combines SIM (security information management) functionality and SEM (security event management) functionality into one security management system. The underlying principles of a STEM system is to aggregate relevant data from multiple sources, identify deviations from the norm and take appropriate action. For example, when a security event is detected, STEM system 230 might log additional information, generate an alert and instruct other security controls to mitigate the security event. Accordingly, STEM system 230 may be configured to monitor and log the activity of security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform).

Computing Platform Analysis & Reporting

As will be discussed below in greater detail, threat mitigation process 10 may be configured to e.g., analyze computing platform 60 and provide reports to third-parties concerning the same.

Concept 1)

Figure 4:
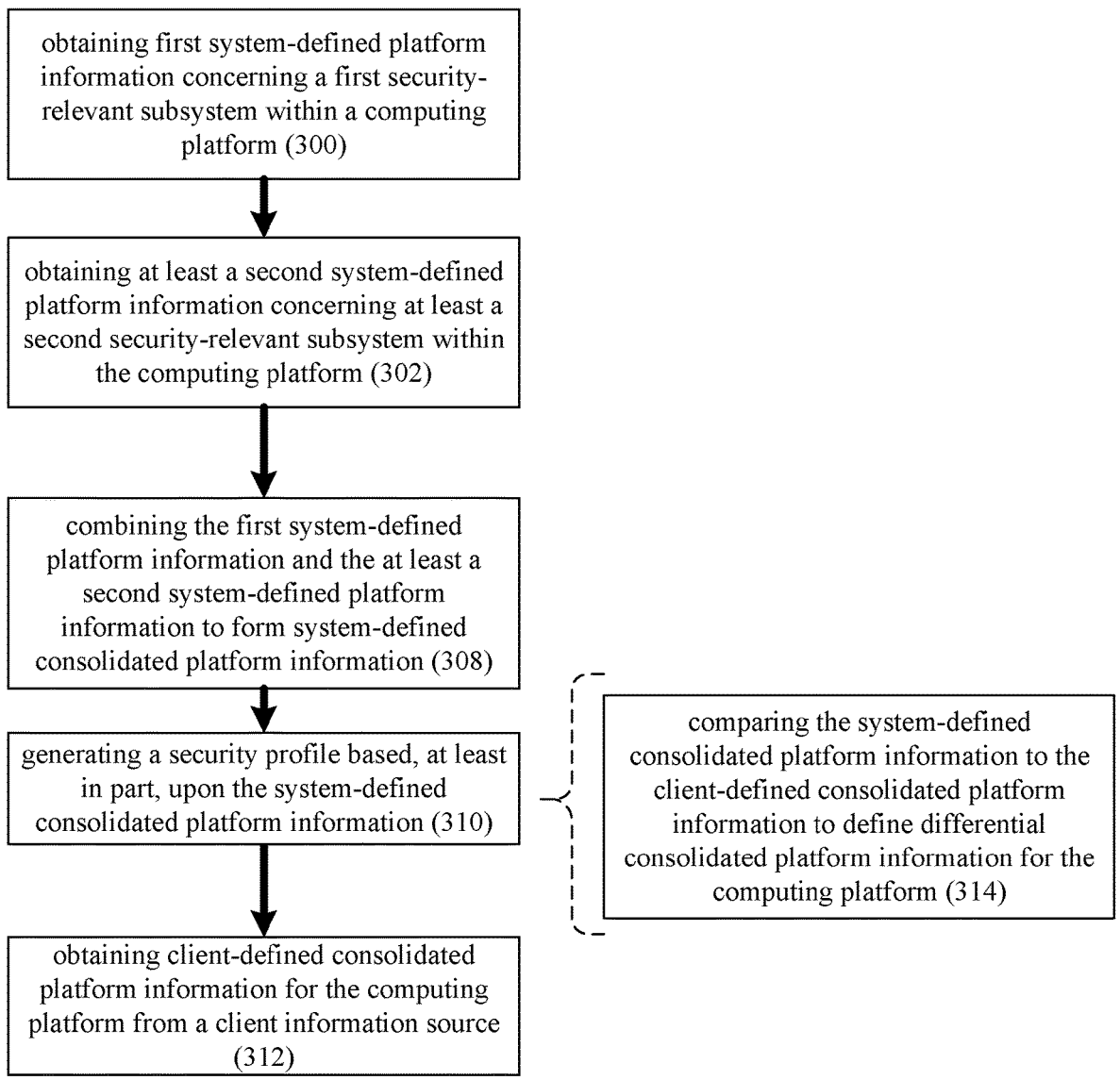
FIG. 4 is a flowchart of an implementation of the threat mitigation process of FIG. 1 according to an embodiment of the present disclosure.
Figure 5:
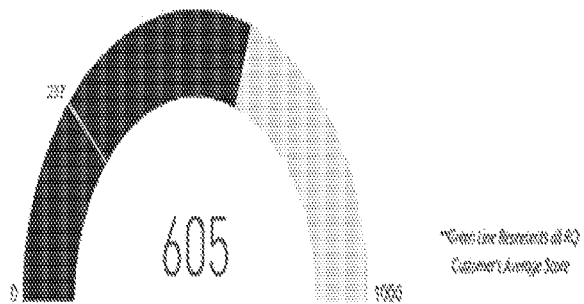
FIGS. 5-6 are diagrammatic views of screens rendered by the threat mitigation process of FIG. 1 according to an embodiment of the present disclosure.
Figure 5:
Figure 5:
Figure 5:
Figure 6:
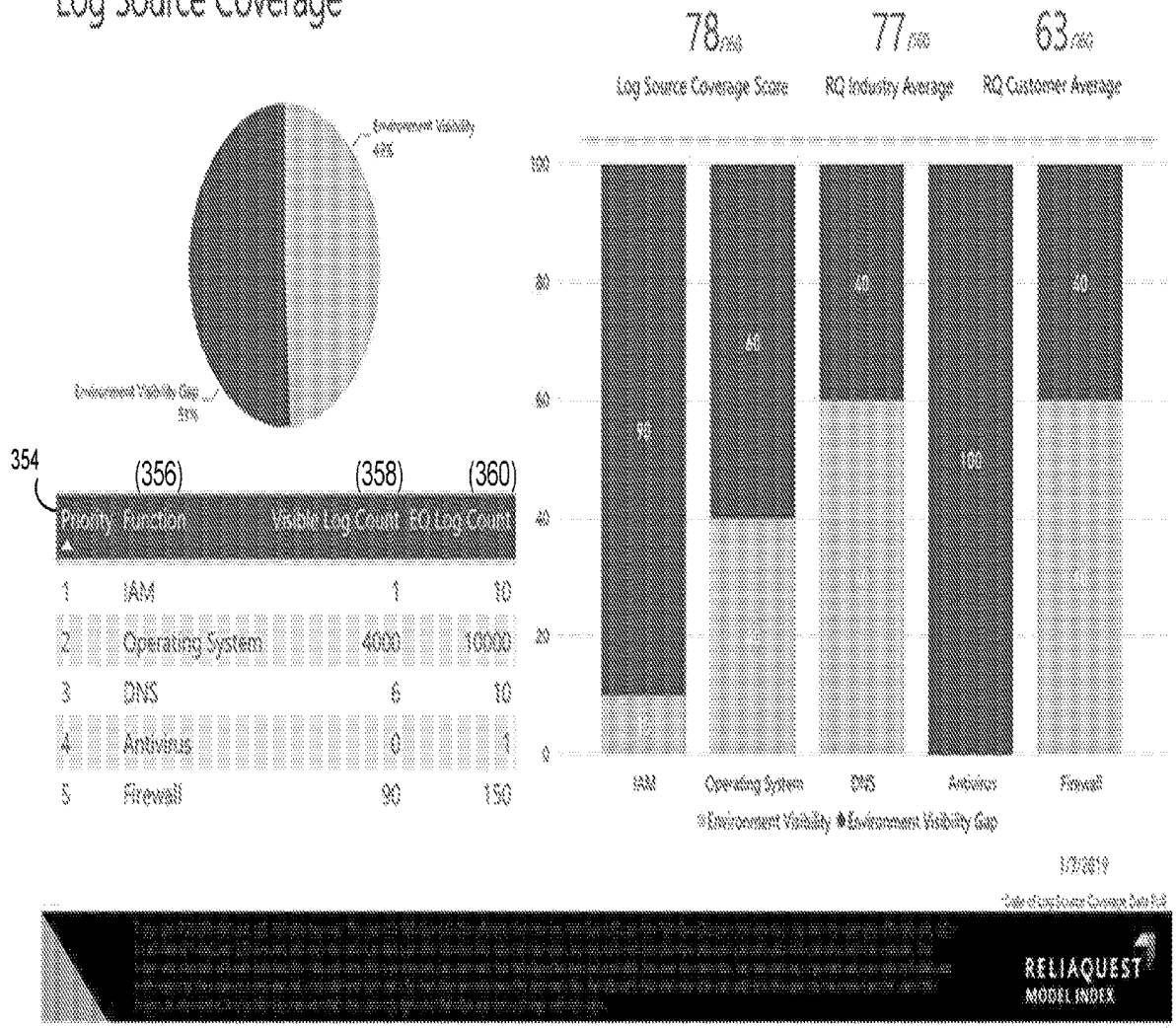

Referring also to FIGS. 4-6, threat mitigation process 10 may be configured to obtain and combine information from multiple security-relevant subsystem to generate a security profile for computing platform 60. For example, threat mitigation process 10 may obtain 300 first system-defined platform information (e.g., system-defined platform information 232) concerning a first security-relevant subsystem (e.g., the number of operating systems deployed) within computing platform 60 and may obtain 302 at least a second system-defined platform information (e.g., system-defined platform information 234) concerning at least a second security-relevant subsystem (e.g., the number of antivirus systems deployed) within computing platform 60.

The first system-defined platform information (e.g., system-defined platform information 232) and the at least a second system-defined platform information (e.g., system-defined platform information 234) may be obtained from one or more log files defined for computing platform 60.

Specifically, system-defined platform information 232 and/or system-defined platform information 234 may be obtained from STEM system 230, wherein (and as discussed above) STEM system 230 may be configured to monitor and log the activity of security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform).

Alternatively, the first system-defined platform information (e.g., system-defined platform information 232) and the at least a second system-defined platform information (e.g., system-defined platform information 234) may be obtained from the first security-relevant subsystem (e.g., the operating systems themselves) and the at least a second security-relevant subsystem (e.g., the antivirus systems themselves). Specifically, system-defined platform information 232 and/or system-defined platform information 234 may be obtained directly from the security-relevant subsystems (e.g., the operating systems and/or the antivirus systems), which (as discussed above) may be configured to self-document their activity.

Threat mitigation process 10 may combine 308 the first system-defined platform information (e.g., system-defined platform information 232) and the at least a second system-defined platform information (e.g., system-defined platform information 234) to form system-defined consolidated platform information 236. Accordingly and in this example, system-defined consolidated platform information 236 may independently define the security-relevant subsystems (e.g., security-relevant subsystems 226) present on computing platform 60.

Threat mitigation process 10 may generate 310 a security profile (e.g., security profile 350) based, at least in part, upon system-defined consolidated platform information 236. Through the use of security profile (e.g., security profile 350), the user/owner/operator of computing platform 60 may be able to see that e.g., they have a security score of 605 out of a possible score of 1,000, wherein the average customer has a security score of 237. While security profile 350 in shown in the example to include several indicators that may enable a user to compare (in this example) computing platform 60 to other computing platforms, this is for illustrative purposes only and is not intended to be a limitation of this disclosure, as it is understood that other configurations are possible and are considered to be within the scope of this disclosure.

Naturally, the format, appearance and content of security profile 350 may be varied greatly depending upon the design criteria and anticipated performance/use of threat mitigation process 10. Accordingly, the appearance, format, completeness and content of security profile 350 is for illustrative purposes only and is not intended to be a limitation of this disclosure, as other configurations are possible and are considered to be within the scope of this disclosure. For example, content may be added to security profile 350, removed from security profile 350, and/or reformatted within security profile 350.

Additionally, threat mitigation process 10 may obtain 312 client-defined consolidated platform information 238 for computing platform 60 from a client information source, examples of which may include but are not limited to one or more client-completed questionnaires (e.g., questionnaires 240) and/or one or more client-deployed platform monitors (e.g., client-deployed platform monitor 242, which may be configured to effectuate SIEM functionality). Accordingly and in this example, client-defined consolidated platform information 238 may define the security-relevant subsystems (e.g., security-relevant subsystems 226) that the client believes are present on computing platform 60.

When generating 310 a security profile (e.g., security profile 350) based, at least in part, upon system-defined consolidated platform information 236, threat mitigation process 10 may compare 314 the system-defined consolidated platform information (e.g., system-defined consolidated platform information 236) to the client-defined consolidated platform information (e.g., client-defined consolidated platform information 238) to define differential consolidated platform information 352 for computing platform 60.

Differential consolidated platform information 352 may include comparison table 354 that e.g., compares computing platform 60 to other computing platforms. For example and in this particular implementation of differential consolidated platform information 352, comparison table 354 is shown to include three columns, namely: security-relevant subsystem column 356 (that identifies the security-relevant subsystems in question); system-defined consolidated platform information column 358 (that is based upon system-defined consolidated platform information 236 and independently defines what security-relevant subsystems are present on computing platform 60); and client-defined consolidated platform column 360 (that is based upon client-defined platform information 238 and defines what security-relevant subsystems the client believes are present on computing platform 60). As shown within comparison table 354, there are considerable differences between that is actually present on computing platform 60 and what is believed to be present on computing platform 60 (e.g., 1 IAM system vs. 10 IAM systems; 4,000 operating systems vs. 10,000 operating systems, 6 DNS systems vs. 10 DNS systems; 0 antivirus systems vs. 1 antivirus system, and 90 firewalls vs. 150 firewalls).

Naturally, the format, appearance and content of differential consolidated platform information 352 may be varied greatly depending upon the design criteria and anticipated performance/use of threat mitigation process 10. Accordingly, the appearance, format, completeness and content of differential consolidated platform information 352 is for illustrative purposes only and is not intended to be a limitation of this disclosure, as other configurations are possible and are considered to be within the scope of this disclosure. For example, content may be added to differential consolidated platform information 352, removed from differential consolidated platform information 352, and/or reformatted within differential consolidated platform information 352.

Concept 2)

Figure 7:
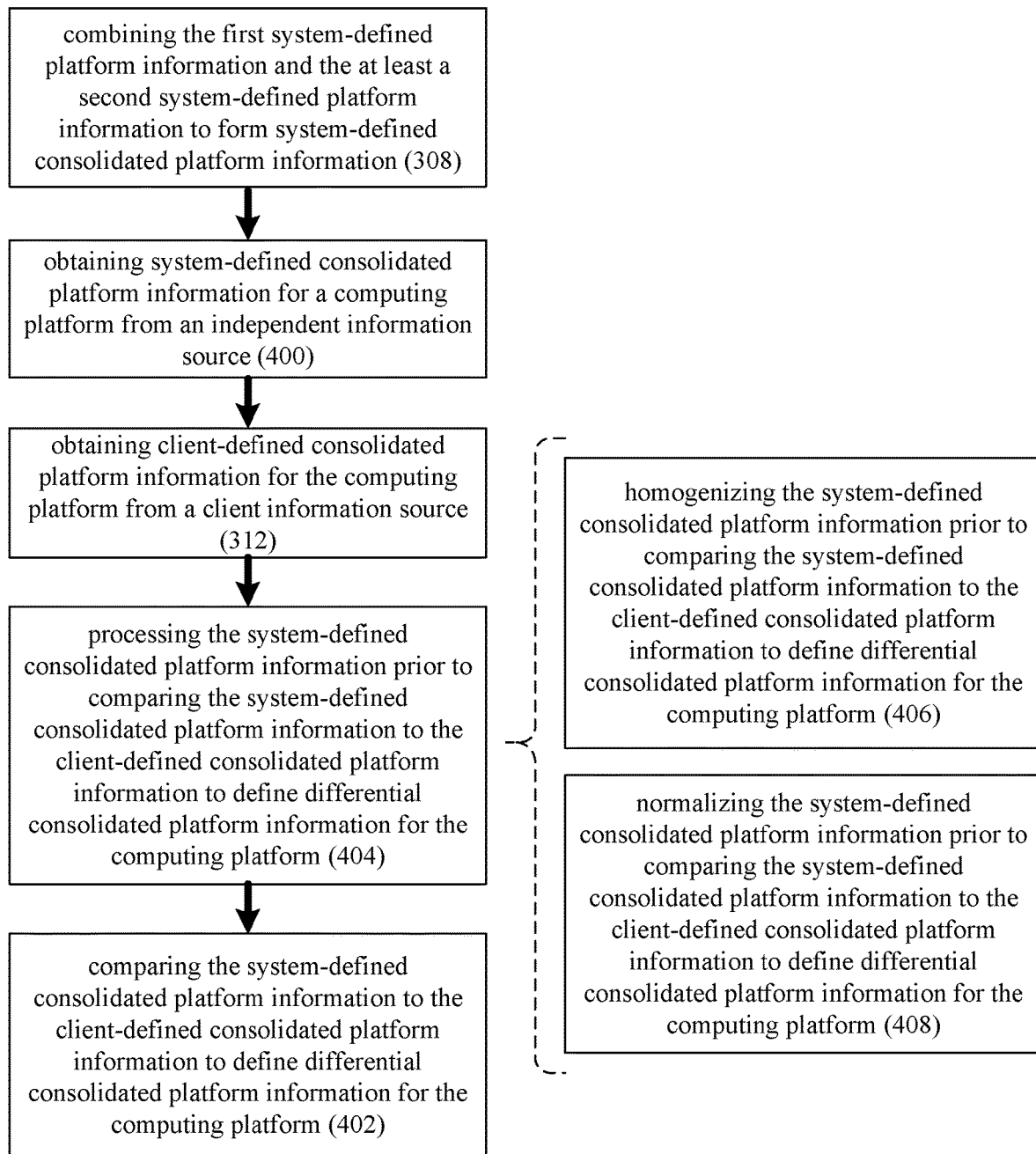
FIGS. 7-9 are flowcharts of other implementations of the threat mitigation process of FIG. 1 according to an embodiment of the present disclosure.

Referring also to FIG. 7, threat mitigation process 10 may be configured to compare what security relevant subsystems are actually included within computing platform 60 versus what security relevant subsystems were believed to be included within computing platform 60. As discussed above, threat mitigation process 10 may combine 308 the first system-defined platform information (e.g., system-defined platform information 232) and the at least a second system-defined platform information (e.g., system-defined platform information 234) to form system-defined consolidated platform information 236.

Threat mitigation process 10 may obtain 400 system-defined consolidated platform information 236 for computing platform 60 from an independent information source, examples of which may include but are not limited to: one or more log files defined for computing platform 60 (e.g., such as those maintained by SIEM system 230); and two or more security-relevant subsystems (e.g., directly from the operating system security-relevant subsystem and the antivirus security-relevant subsystem) deployed within computing platform 60.

Further and as discussed above, threat mitigation process 10 may obtain 312 client-defined consolidated platform information 238 for computing platform 60 from a client information source, examples of which may include but are not limited to one or more client-completed questionnaires (e.g., questionnaires 240) and/or one or more client-deployed platform monitors (e.g., client-deployed platform monitor 242, which may be configured to effectuate SIEM functionality).

Additionally and as discussed above, threat mitigation process 10 may compare 402 system-defined consolidated platform information 236 to client-defined consolidated platform information 238 to define differential consolidated platform information 352 for computing platform 60, wherein differential consolidated platform information 352 may include comparison table 354 that e.g., compares computing platform 60 to other computing platforms.

Threat mitigation process 10 may process 404 system-defined consolidated platform information 236 prior to comparing 402 system-defined consolidated platform information 236 to client-defined consolidated platform information 238 to define differential consolidated platform information 352 for computing platform 60. Specifically, threat mitigation process 10 may process 404 system-defined consolidated platform information 236 so that it is comparable to client-defined consolidated platform information 238.

For example and when processing 404 system-defined consolidated platform information 236, threat mitigation process 10 may homogenize 406 system-defined consolidated platform information 236 prior to comparing 402 system-defined consolidated platform information 236 to client-defined consolidated platform information 238 to define differential consolidated platform information 352 for computing platform 60. Such homogenization 406 may result in system-defined consolidated platform information 236 and client-defined consolidated platform information 238 being comparable to each other (e.g., to accommodate for differing data nomenclatures/headers).

Further and when processing 404 system-defined consolidated platform information 236, threat mitigation process 10 may normalize 408 system-defined consolidated platform information 236 prior to comparing 402 system-defined consolidated platform information 236 to client-defined consolidated platform information 238 to define differential consolidated platform information 352 for computing platform 60 (e.g., to accommodate for data differing scales/ranges).

---
Concept 3)
---

Figure 8:
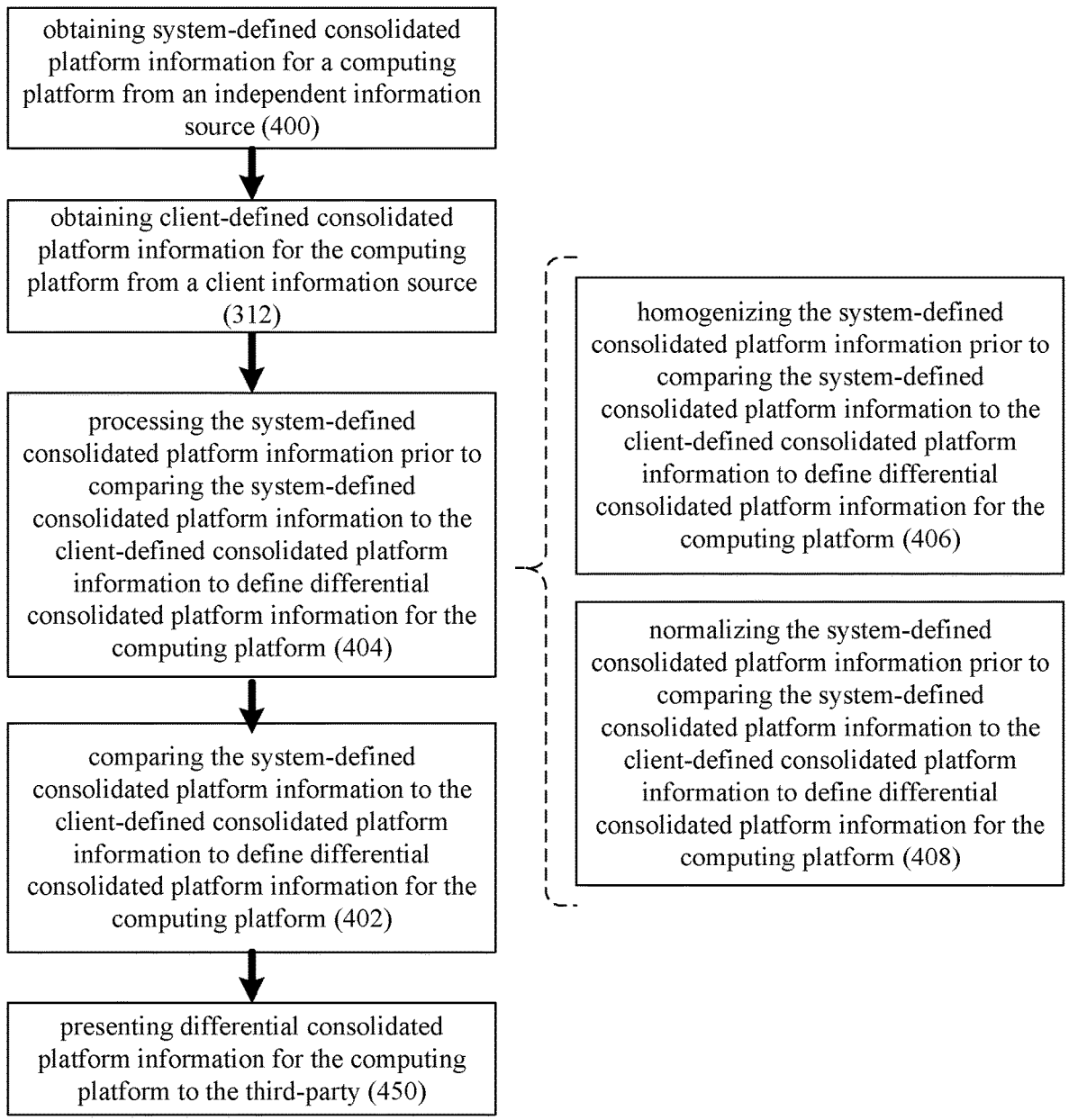

Referring also to FIG. 8, threat mitigation process 10 may be configured to compare what security relevant subsystems are actually included within computing platform 60 versus what security relevant subsystems were believed to be included within computing platform 60.

As discussed above, threat mitigation process 10 may obtain 400 system-defined consolidated platform information 236 for computing platform 60 from an independent information source, examples of which may include but are not limited to: one or more log files defined for computing platform 60 (e.g., such as those maintained by SIEM system 230); and two or more security-relevant subsystems (e.g., directly from the operating system security-relevant subsystem and the antivirus security-relevant subsystem) deployed within computing platform 60

Further and as discussed above, threat mitigation process 10 may obtain 312 client-defined consolidated platform information 238 for computing platform 60 from a client information source, examples of which may include but are not limited to one or more client-completed questionnaires (e.g., questionnaires 240) and/or one or more client-deployed platform monitors (e.g., client-deployed platform monitor 242, which may be configured to effectuate SIEM functionality).

Threat mitigation process 10 may present 450 differential consolidated platform information 352 for computing platform 60 to a third-party, examples of which may include but are not limited to the user/owner/operator of computing platform 60.

Additionally and as discussed above, threat mitigation process 10 may compare 402 system-defined consolidated platform information 236 to client-defined consolidated platform information 238 to define differential consolidated platform information 352 for computing platform 60, wherein differential consolidated platform information 352 may include comparison table 354 that e.g., compares computing platform 60 to other computing platforms, wherein (and as discussed above) threat mitigation process 10 may process 404 (e.g., via homogenizing 406 and/or normalizing 408) system-defined consolidated platform information 236 prior to comparing 402 system-defined consolidated platform information 236 to client-defined consolidated platform information 238 to define differential consolidated platform information 352 for computing platform 60.

Computing Platform Analysis & Recommendation

As will be discussed below in greater detail, threat mitigation process 10 may be configured to e.g., analyze & display the vulnerabilities of computing platform 60.

---
Concept 4)
---

Figure 9:
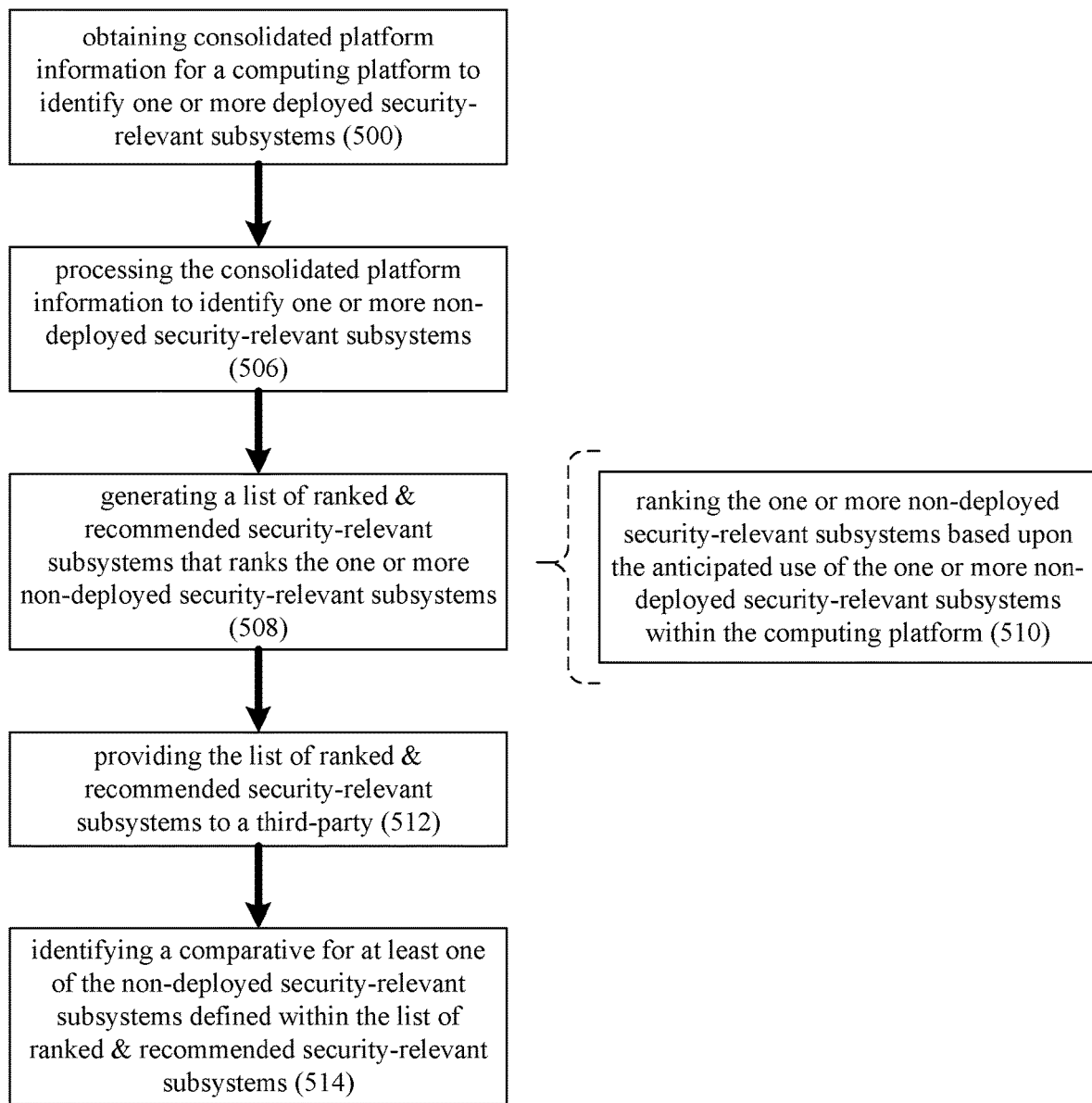

Referring also to FIG. 9, threat mitigation process 10 may be configured to make recommendations concerning security relevant subsystems that are missing from computing platform 60. As discussed above, threat mitigation process 10 may obtain 500 consolidated platform information for computing platform 60 to identify one or more deployed security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform). This consolidated platform information may be obtained from an independent information source (e.g., such as SIEM system 230 that may provide system-defined consolidated platform information 236) and/or may be obtained from a client information source (e.g., such as questionnaires 240 that may provide client-defined consolidated platform information 238).

Figure 10:
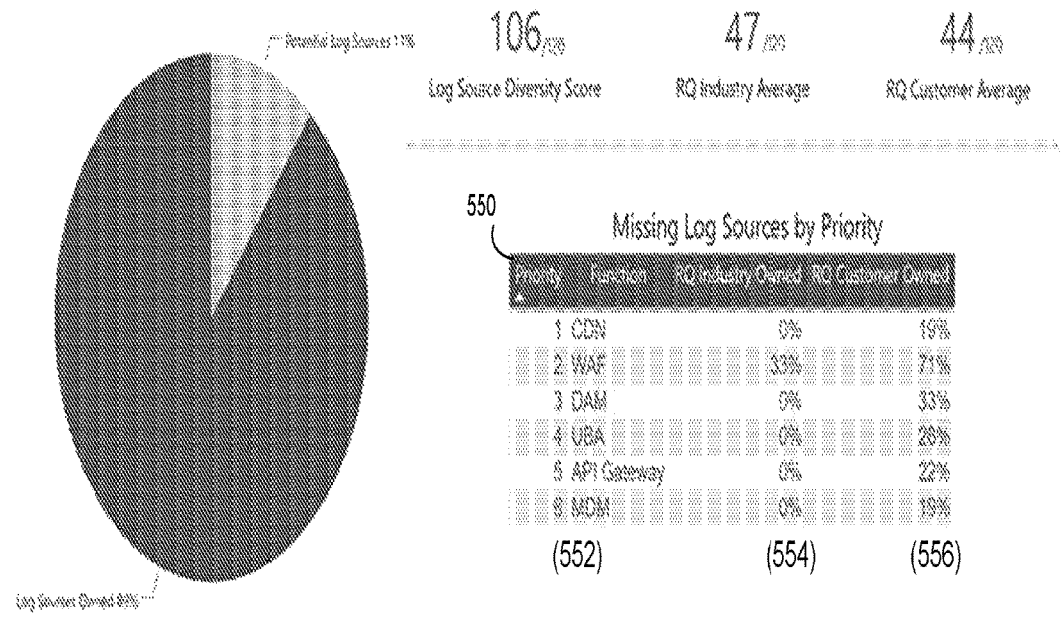
FIG. 10 is a diagrammatic view of a screen rendered by the threat mitigation process of FIG. 1 according to an embodiment of the present disclosure.
Figure 10:
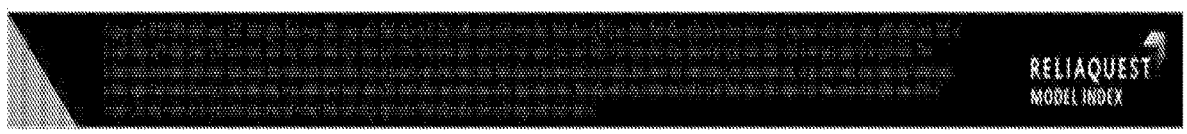

Referring also to FIG. 10, threat mitigation process 10 may process 506 the consolidated platform information (e.g., system-defined consolidated platform information 236 and/or client-defined consolidated platform information 238) to identify one or more non-deployed security-relevant subsystems (within computing platform 60) and may then generate 508 a list of ranked & recommended security-relevant subsystems (e.g., non-deployed security-relevant subsystem list 550) that ranks the one or more non-deployed security-relevant subsystems.

For this particular illustrative example, non-deployed security-relevant subsystem list 550 is shown to include column 552 that identifies six non-deployed security-relevant subsystems, namely: a CDN subsystem, a WAF subsystem, a DAM subsystem; a UBA subsystem; a API subsystem, and an MDM subsystem.

When generating 508 a list of ranked & recommended security-relevant subsystems (e.g., non-deployed security-relevant subsystem list 550) that ranks the one or more non-deployed security-relevant subsystems, threat mitigation process 10 may rank 510 the one or more non-deployed security-relevant subsystems (e.g., a CDN subsystem, a WAF subsystem, a DAM subsystem; a UBA subsystem; a API subsystem, and an MDM subsystem) based upon the anticipated use of the one or more non-deployed security-relevant subsystems within computing platform 60. This ranking 510 of the non-deployed security-relevant subsystems (e.g., a CDN subsystem, a WAF subsystem, a DAM subsystem; a UBA subsystem; a API subsystem, and an MDM subsystem) may be agnostic in nature and may be based on the functionality/effectiveness of the non-deployed security-relevant subsystems and the anticipated manner in which their implementation may impact the functionality/security of computing platform 60.

Threat mitigation process 10 may provide 512 the list of ranked & recommended security-relevant subsystems (e.g., non-deployed security-relevant subsystem list 550) to a third-party, examples of which may include but are not limited to a user/owner/operator of computing platform 60.

Additionally, threat mitigation process 10 may identify 514 a comparative for at least one of the non-deployed security-relevant subsystems (e.g., a CDN subsystem, a WAF subsystem, a DAM subsystem; a UBA subsystem; a API subsystem, and an MDM subsystem) defined within the list of ranked & recommended security-relevant subsystems (e.g., non-deployed security-relevant subsystem list 550). This comparative may include vendor customers in a specific industry comparative and/or vendor customers in any industry comparative.

For example and in addition to column 552, non-deployed security-relevant subsystem list 550 may include columns 554, 556 for defining the comparatives for the six non-deployed security-relevant subsystems, namely: a CDN subsystem, a WAF subsystem, a DAM subsystem; a UBA subsystem; a API subsystem, and an MDM subsystem. Specifically, column 554 is shown to define comparatives concerning vendor customers that own the non-deployed security-relevant subsystems in a specific industry (i.e., the same industry as the user/owner/operator of computing platform 60). Additionally, column 556 is shown to define comparatives concerning vendor customers that own the non-deployed security-relevant subsystems in any industry (i.e., not necessarily the same industry as the user/owner/operator of computing platform 60). For example and concerning the comparatives of the WAF subsystem: 33% of the vendor customers in the same industry as the user/owner/operator of computing platform 60 deploy a WAF subsystem; while 71% of the vendor customers in any industry deploy a WAF subsystem.

Naturally, the format, appearance and content of non-deployed security-relevant subsystem list 550 may be varied greatly depending upon the design criteria and anticipated performance/use of threat mitigation process 10. Accordingly, the appearance, format, completeness and content of non-deployed security-relevant subsystem list 550 is for illustrative purposes only and is not intended to be a limitation of this disclosure, as other configurations are possible and are considered to be within the scope of this disclosure. For example, content may be added to non-deployed security-relevant subsystem list 550, removed from non-deployed security-relevant subsystem list 550, and/or reformatted within non-deployed security-relevant subsystem list 550.

Concept 5)

Figure 11:
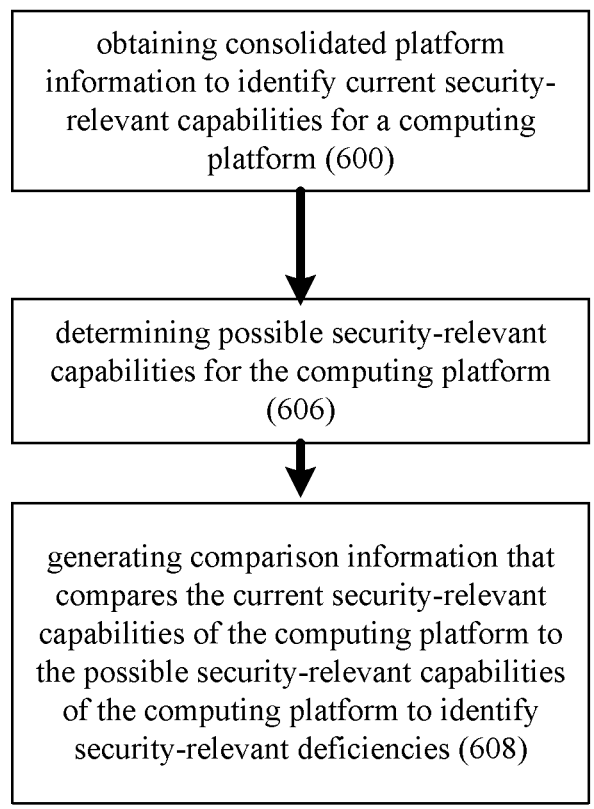
FIG. 11 is a flowchart of another implementation of the threat mitigation process of FIG. 1 according to an embodiment of the present disclosure.

Referring also to FIG. 11, threat mitigation process 10 may be configured to compare the current capabilities to the possible capabilities of computing platform 60. As discussed above, threat mitigation process 10 may obtain 600 consolidated platform information to identify current security-relevant capabilities for computing platform 60. This consolidated platform information may be obtained from an independent information source (e.g., such as SIEM system 230 that may provide system-defined consolidated platform information 236) and/or may be obtained from a client information source (e.g., such as questionnaires 240 that may provide client-defined consolidated platform information 238. Threat mitigation process 10 may then determine 606 possible security-relevant capabilities for computing platform 60 (i.e., the difference between the current security-relevant capabilities of computing platform 60 and the possible security-relevant capabilities of computing platform 60. For example, the possible security-relevant capabilities may concern the possible security-relevant capabilities of computing platform 60 using the currently-deployed security-relevant subsystems. Additionally/alternatively, the possible security-relevant capabilities may concern the possible security-relevant capabilities of computing platform 60 using one or more supplemental security-relevant subsystems.

Figure 12:
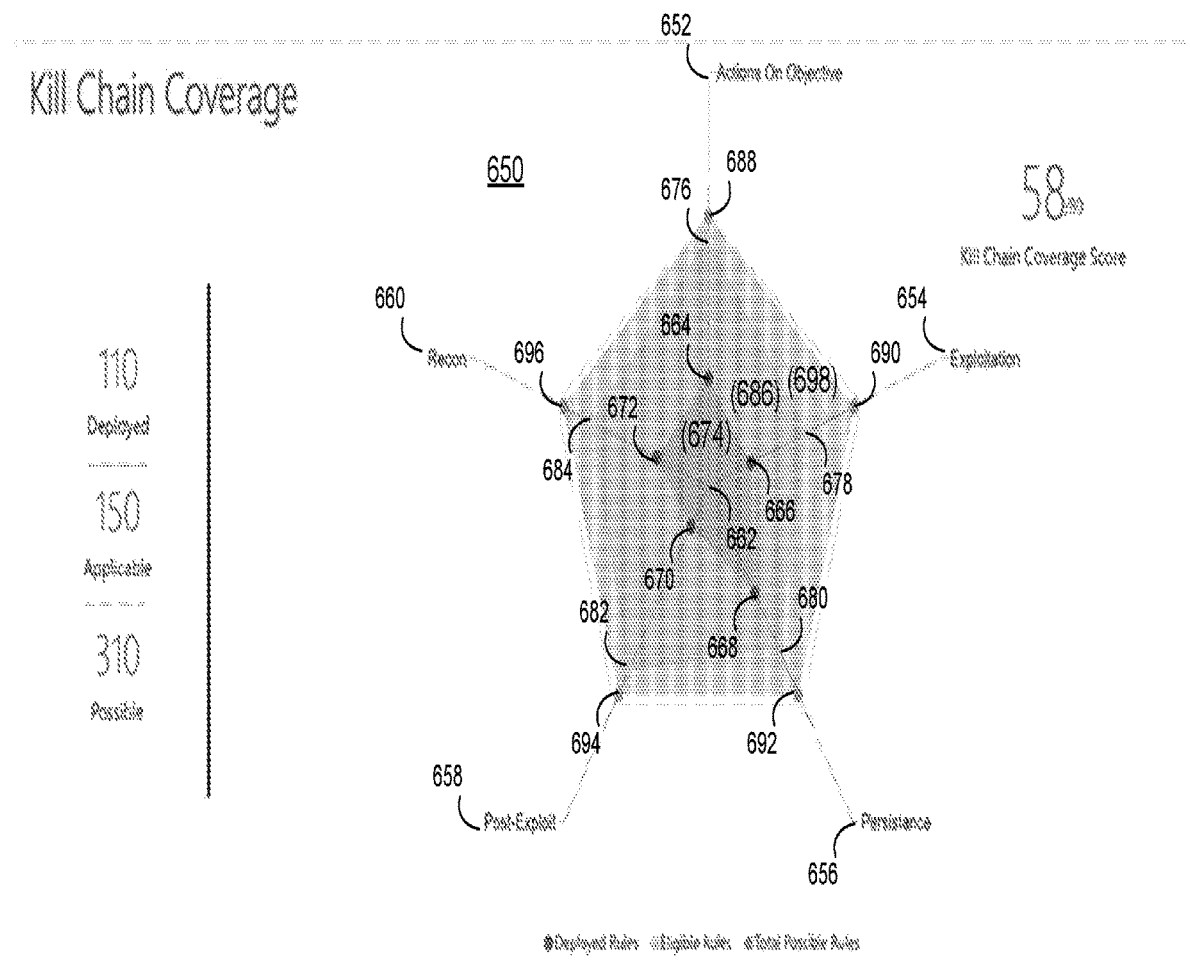
FIG. 12 is a diagrammatic view of a screen rendered by the threat mitigation process of FIG. 1 according to an embodiment of the present disclosure.

Referring also to FIG. 12 and as will be explained below, threat mitigation process 10 may generate 608 comparison information 650 that compares the current security-relevant capabilities of computing platform 60 to the possible security-relevant capabilities of computing platform 60 to identify security-relevant deficiencies. Comparison information 650 may include graphical comparison information, such as multi-axial graphical comparison information that simultaneously illustrates a plurality of security-relevant deficiencies.

For example, comparison information 650 may define (in this particular illustrative example) graphical comparison information that include five axes (e.g. axes 652, 654, 656, 658, 660) that correspond to five particular types of computer threats. Comparison information 650 includes origin 662, the point at which computing platform 60 has no protection with respect to any of the five types of computer threats that correspond to axes 652, 654, 656, 658, 660. Accordingly, as the capabilities of computing platform 60 are increased to counter a particular type of computer threat, the data point along the corresponding axis is proportionately displaced from origin 652.

As discussed above, threat mitigation process 10 may obtain 600 consolidated platform information to identify current security-relevant capabilities for computing platform 60. Concerning such current security-relevant capabilities for computing platform 60, these current security-relevant capabilities are defined by data points 664, 666, 668, 670, 672, the combination of which define bounded area 674. Bounded area 674 (in this example) defines the current security-relevant capabilities of computing platform 60.

Further and as discussed above, threat mitigation process 10 may determine 606 possible security-relevant capabilities for computing platform 60 (i.e., the difference between the current security-relevant capabilities of computing platform 60 and the possible security-relevant capabilities of computing platform 60.

As discussed above, the possible security-relevant capabilities may concern the possible security-relevant capabilities of computing platform 60 using the currently-deployed security-relevant subsystems. For example, assume that the currently-deployed security relevant subsystems are not currently being utilized to their full potential. Accordingly, certain currently-deployed security relevant subsystems may have certain features that are available but are not utilized and/or disabled. Further, certain currently-deployed security relevant subsystems may have expanded features available if additional licensing fees are paid. Therefore and concerning such possible security-relevant capabilities of computing platform 60 using the currently-deployed security-relevant subsystems, data points 676, 678, 680, 682, 684 may define bounded area 686 (which represents the full capabilities of the currently-deployed security-relevant subsystems within computing platform 60).

Further and as discussed above, the possible security-relevant capabilities may concern the possible security-relevant capabilities of computing platform 60 using one or more supplemental security-relevant subsystems. For example, assume that supplemental security-relevant subsystems are available for the deployment within computing platform 60. Therefore and concerning such possible security-relevant capabilities of computing platform 60 using such supplemental security-relevant subsystems, data points 688, 690, 692, 694, 696 may define bounded area 698 (which represents the total capabilities of computing platform 60 when utilizing the full capabilities of the currently-deployed security-relevant subsystems and any supplemental security-relevant subsystems).

Naturally, the format, appearance and content of comparison information 650 may be varied greatly depending upon the design criteria and anticipated performance/use of threat mitigation process 10. Accordingly, the appearance, format, completeness and content of comparison information 650 is for illustrative purposes only and is not intended to be a limitation of this disclosure, as other configurations are possible and are considered to be within the scope of this disclosure. For example, content may be added to comparison information 650, removed from comparison information 650, and/or reformatted within comparison information 650.

---

Concept 6)

---

Figure 13:
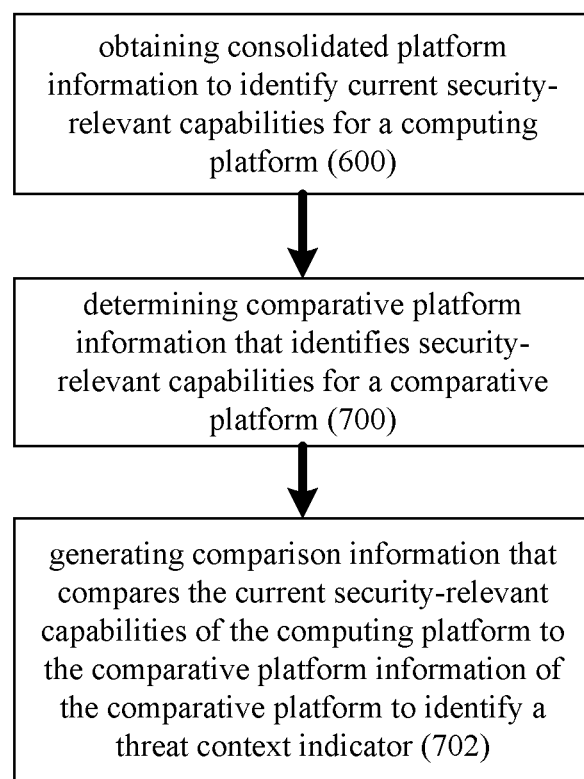
FIG. 13 is a flowchart of another implementation of the threat mitigation process of FIG. 1 according to an embodiment of the present disclosure.

Referring also to FIG. 13, threat mitigation process 10 may be configured to generate a threat context score for computing platform 60. As discussed above, threat mitigation process 10 may obtain 600 consolidated platform information to identify current security-relevant capabilities for computing platform 60. This consolidated platform information may be obtained from an independent information source (e.g., such as STEM system 230 that may provide system-defined consolidated platform information 236) and/or may be obtained from a client information source (e.g., such as questionnaires 240 that may provide client-defined consolidated platform information 238. As will be discussed below in greater detail, threat mitigation process 10 may determine 700 comparative platform information that identifies security-relevant capabilities for a comparative platform, wherein this comparative platform information may concern vendor customers in a specific industry (i.e., the same industry as the user/owner/operator of computing platform 60) and/or vendor customers in any industry (i.e., not necessarily the same industry as the user/owner/operator of computing platform 60).

Figure 14:
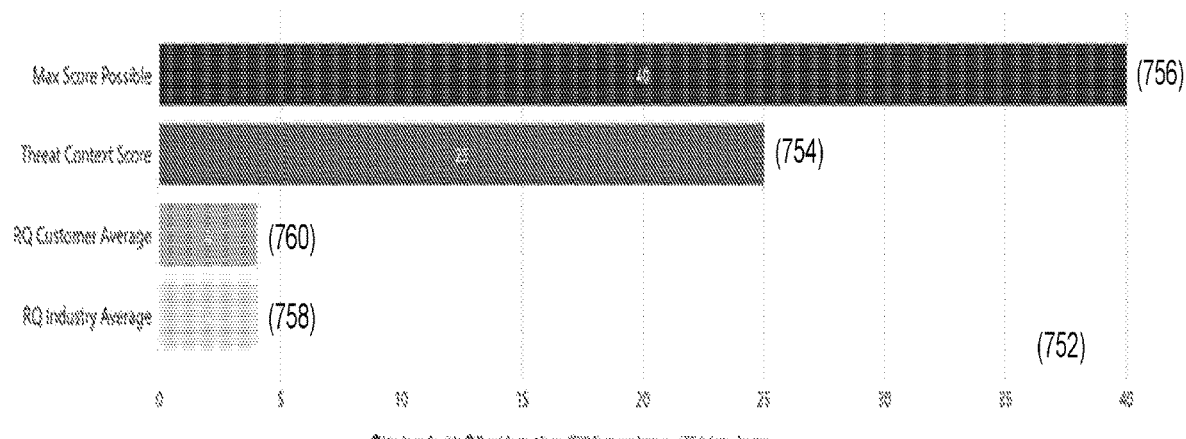
FIG. 14 is a diagrammatic view of a screen rendered by the threat mitigation process of FIG. 1 according to an embodiment of the present disclosure.

Referring also to FIG. 14 and as will be discussed below, threat mitigation process 10 may generate 702 comparison information 750 that compares the current security-relevant capabilities of computing platform 60 to the comparative platform information determined 700 for the comparative platform to identify a threat context indicator for computing platform 60, wherein comparison information 750 may include graphical comparison information 752.

Graphical comparison information 752 (which in this particular example is a bar chart) may identify one or more of: a current threat context score 754 for a client (e.g., the user/owner/operator of computing platform 60); a maximum possible threat context score 756 for the client (e.g., the user/owner/operator of computing platform 60); a threat context score 758 for one or more vendor customers in a specific industry (i.e., the same industry as the user/owner/operator of computing platform 60); and a threat context score 760 for one or more vendor customers in any industry (i.e., not necessarily the same industry as the user/owner/operator of computing platform 60).

Naturally, the format, appearance and content of comparison information 750 may be varied greatly depending upon the design criteria and anticipated performance/use of threat mitigation process 10. Accordingly, the appearance, format, completeness and content of comparison information 750 is for illustrative purposes only and is not intended to be a limitation of this disclosure, as other configurations are possible and are considered to be within the scope of this disclosure. For example, content may be added to comparison information 750, removed from comparison information 750, and/or reformatted within comparison information 750.

Computing Platform Monitoring & Mitigation

As will be discussed below in greater detail, threat mitigation process 10 may be configured to e.g., monitor the operation and performance of computing platform 60.

---

Concept 7)

---

Figure 15:
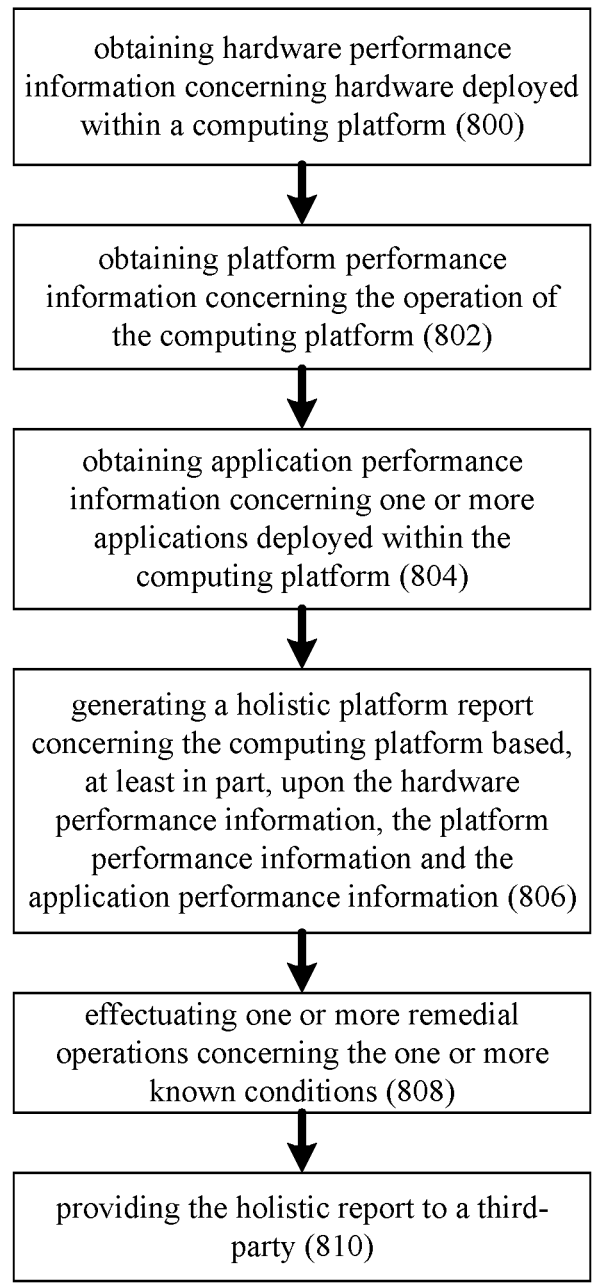
FIG. 15 is a flowchart of another implementation of the threat mitigation process of FIG. 1 according to an embodiment of the present disclosure.

Referring also to FIG. 15, threat mitigation process 10 may be configured to monitor the health of computing platform 60 and provide feedback to a third-party concerning the same. Threat mitigation process 10 may obtain 800 hardware performance information 244 concerning hardware (e.g., server computers, desktop computers, laptop computers, switches, firewalls, routers, gateways, WAPs, and NASs), deployed within computing platform 60. Hardware performance information 244 may concern the operation and/or functionality of one or more hardware systems (e.g., server computers, desktop computers, laptop computers, switches, firewalls, routers, gateways, WAPs, and NASs) deployed within computing platform 60.

Threat mitigation process 10 may obtain 802 platform performance information 246 concerning the operation of computing platform 60. Platform performance information 246 may concern the operation and/or functionality of computing platform 60.

When obtaining 802 platform performance information concerning the operation of computing platform 60, threat mitigation process 10 may (as discussed above): obtain 400 system-defined consolidated platform information 236 for computing platform 60 from an independent information source (e.g., SIEM system 230); obtain 312 client-defined consolidated platform information 238 for computing platform 60 from a client information (e.g., questionnaires 240); and present 450 differential consolidated platform information 352 for computing platform 60 to a third-party, examples of which may include but are not limited to the user/owner/operator of computing platform 60.

When obtaining 802 platform performance information concerning the operation of computing platform 60, threat mitigation process 10 may (as discussed above): obtain 500 consolidated platform information for computing platform 60 to identify one or more deployed security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform); process 506 the consolidated platform information (e.g., system-defined consolidated platform information 236 and/or client-defined consolidated platform information 238) to identify one or more non-deployed security-relevant subsystems (within computing platform 60); generate 508 a list of ranked & recommended security-relevant subsystems (e.g., non-deployed security-relevant subsystem list 550) that ranks the one or more non-deployed security-relevant subsystems; and provide 514 the list of ranked & recommended security-relevant subsystems (e.g., non-deployed security-relevant subsystem list 550) to a third-party, examples of which may include but are not limited to a user/owner/operator of computing platform 60.

When obtaining 802 platform performance information concerning the operation of computing platform 60, threat mitigation process 10 may (as discussed above): obtain 600 consolidated platform information to identify current security-relevant capabilities for the computing platform; determine 606 possible security-relevant capabilities for computing platform 60; and generate 608 comparison information 650 that compares the current security-relevant capabilities of computing platform 60 to the possible security-relevant capabilities of computing platform 60 to identify security-relevant deficiencies.

When obtaining 802 platform performance information concerning the operation of computing platform 60, threat mitigation process 10 may (as discussed above): obtain 600 consolidated platform information to identify current security-relevant capabilities for computing platform 60; determine 700 comparative platform information that identifies security-relevant capabilities for a comparative platform; and generate 702 comparison information 750 that compares the current security-relevant capabilities of computing platform 60 to the comparative platform information determined 700 for the comparative platform to identify a threat context indicator for computing platform 60.

Threat mitigation process 10 may obtain 804 application performance information 248 concerning one or more applications (e.g., operating systems, user applications, security application, and utility application) deployed within computing platform 60. Application performance information 248 may concern the operation and/or functionality of one or more software applications (e.g., operating systems, user applications, security application, and utility application) deployed within computing platform 60.

Figure 16:
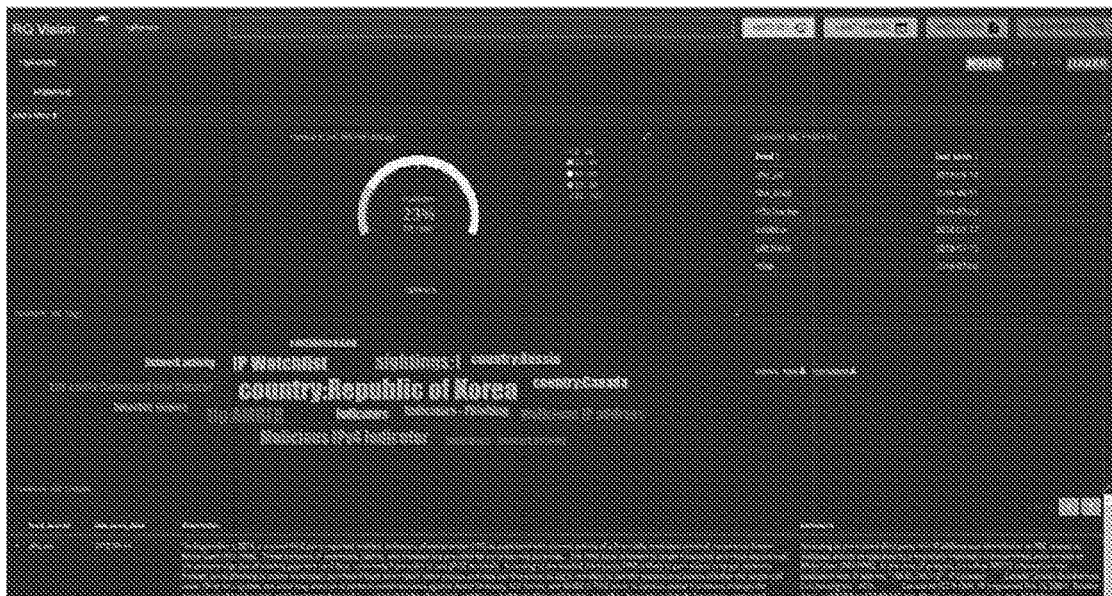
FIG. 16 is a diagrammatic view of screens rendered by the threat mitigation process of FIG. 1 according to an embodiment of the present disclosure.
Figure 16:
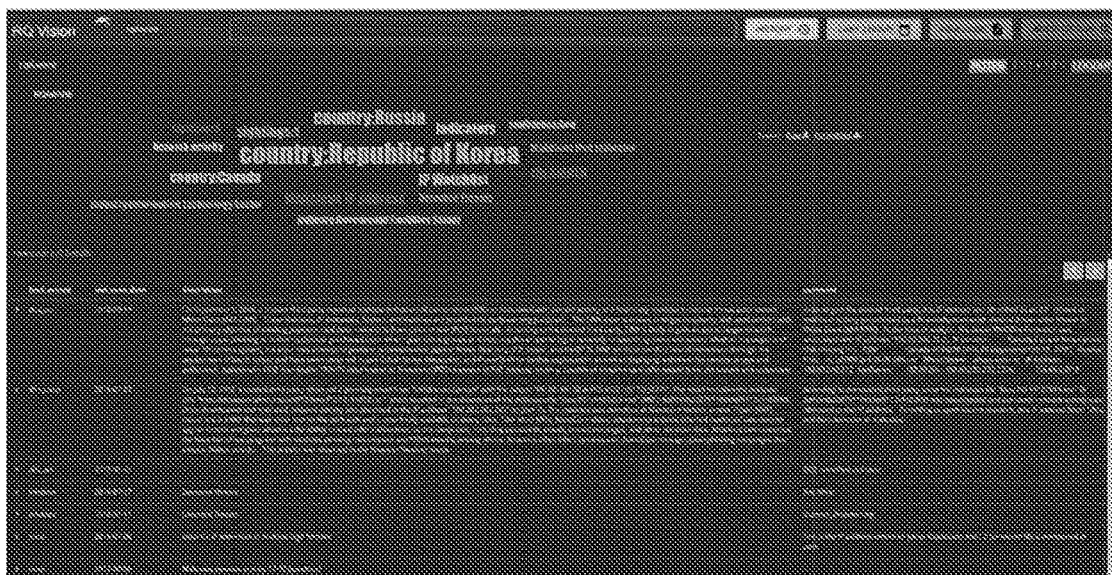

Referring also to FIG. 16, threat mitigation process 10 may generate 806 holistic platform report (e.g., holistic platform reports 850, 852) concerning computing platform 60 based, at least in part, upon hardware performance information 244, platform performance information 246 and application performance information 248. Threat mitigation process 10 may be configured to receive e.g., hardware performance information 244, platform performance information 246 and application performance information 248 at regular intervals (e.g., continuously, every minute, every ten minutes, etc.).

As illustrated, holistic platform reports 850, 852 may include various pieces of content such as e.g., thought clouds that identity topics/issues with respect to computing platform 60, system logs that memorialize identified issues within computing platform 60, data sources providing information to computing system 60, and so on. The holistic platform report (e.g., holistic platform reports 850, 852) may identify one or more known conditions concerning the computing platform; and threat mitigation process 10 may effectuate 808 one or more remedial operations concerning the one or more known conditions.

For example, assume that the holistic platform report (e.g., holistic platform reports 850, 852) identifies that computing platform 60 is under a DoS (i.e., Denial of Services) attack. In computing, a denial-of-service attack (DoS attack) is a cyber-attack in which the perpetrator seeks to make a machine or network resource unavailable to its intended users by temporarily or indefinitely disrupting services of a host connected to the Internet. Denial of service is typically accomplished by flooding the targeted machine or resource with superfluous requests in an attempt to overload systems and prevent some or all legitimate requests from being fulfilled.

In response to detecting such a DoS attack, threat mitigation process 10 may effectuate 808 one or more remedial operations. For example and with respect to such a DoS attack, threat mitigation process 10 may effectuate 808 e.g., a remedial operation that instructs WAF (i.e., Web Application Firewall) 212 to deny all incoming traffic from the identified attacker based upon e.g., protocols, ports or the originating IP addresses.

Threat mitigation process 10 may also provide 810 the holistic report (e.g., holistic platform reports 850, 852) to a third-party, examples of which may include but are not limited to a user/owner/operator of computing platform 60.

Naturally, the format, appearance and content of the holistic platform report (e.g., holistic platform reports 850, 852) may be varied greatly depending upon the design criteria and anticipated performance/use of threat mitigation process 10. Accordingly, the appearance, format, completeness and content of the holistic platform report (e.g., holistic platform reports 850, 852) is for illustrative purposes only and is not intended to be a limitation of this disclosure, as other configurations are possible and are considered to be within the scope of this disclosure. For example, content may be added to the holistic platform report (e.g., holistic platform reports 850, 852), removed from the holistic platform report (e.g., holistic platform reports 850, 852), and/or reformatted within the holistic platform report (e.g., holistic platform reports 850, 852).

Concept 8)

Figure 17:
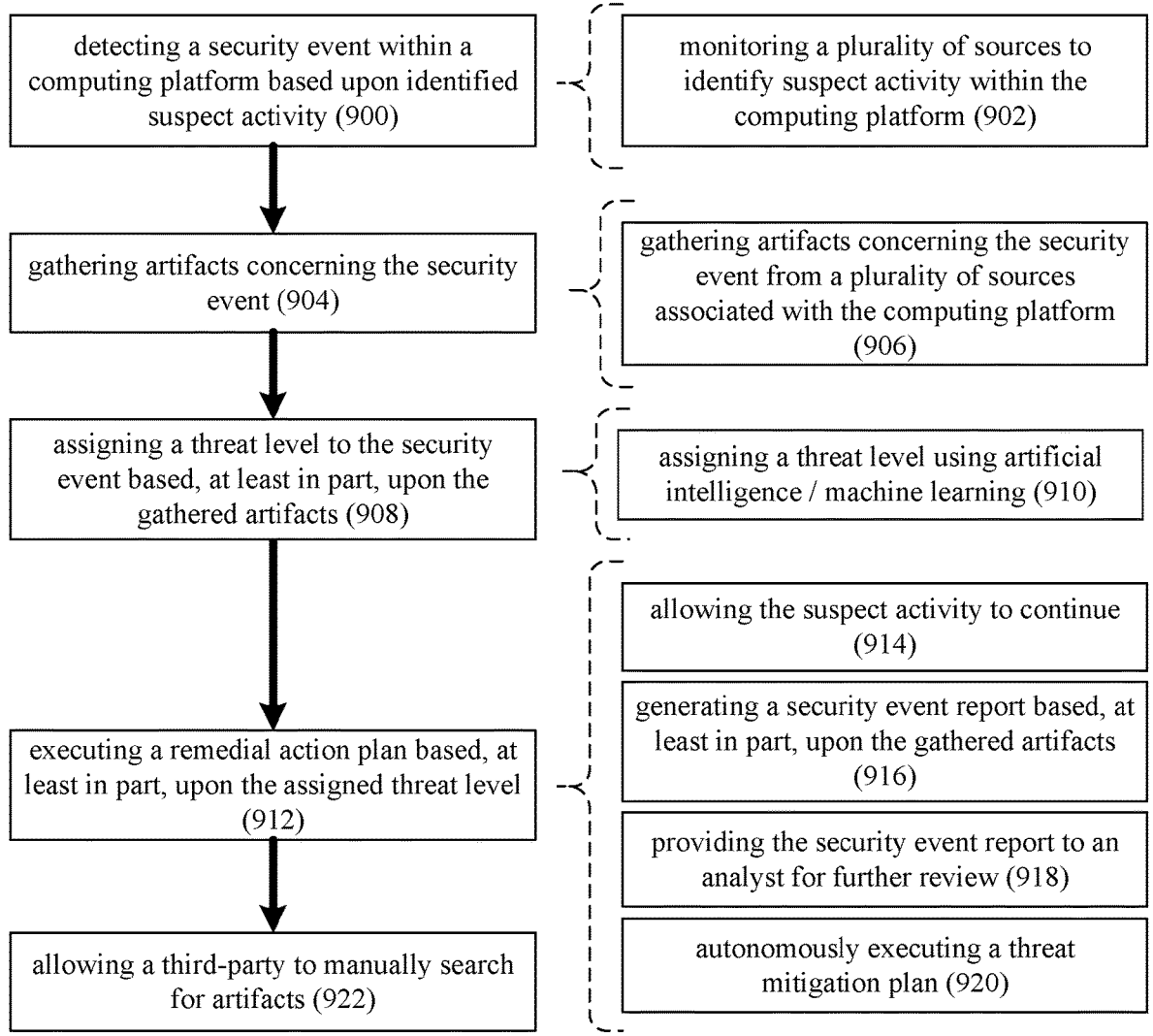
FIGS. 17-23 are flowcharts of other implementations of the threat mitigation process of FIG. 1 according to an embodiment of the present disclosure.

Referring also to FIG. 17, threat mitigation process 10 may be configured to monitor computing platform 60 for the occurrence of a security event and (in the event of such an occurrence) gather artifacts concerning the same. For example, threat mitigation process 10 may detect 900 a security event within computing platform 60 based upon identified suspect activity. Examples of such security events may include but are not limited to: DDoS events, DoS events, phishing events, spamming events, malware events, web attacks, and exploitation events.

When detecting 900 a security event (e.g., DDoS events, DoS events, phishing events, spamming events, malware events, web attacks, and exploitation events) within computing platform 60 based upon identified suspect activity, threat mitigation process 10 may monitor 902 a plurality of sources to identify suspect activity within computing platform 60.

For example, assume that threat mitigation process 10 detects 900 a security event within computing platform 60. Specifically, assume that threat mitigation process 10 is monitoring 902 a plurality of sources (e.g., the various log files maintained by STEM system 230). And by monitoring 902 such sources, assume that threat mitigation process 10 detects 900 the receipt of inbound content (via an API) from a device having an IP address located in Uzbekistan; the subsequent opening of a port within WAF (i.e., Web Application Firewall) 212; and the streaming of content from a computing device within computing platform 60 through that recently-opened port in WAF (i.e., Web Application Firewall) 212 and to a device having an IP address located in Moldova.

Upon detecting 900 such a security event within computing platform 60, threat mitigation process 10 may gather 904 artifacts (e.g., artifacts 250) concerning the above-described security event. When gathering 904 artifacts (e.g., artifacts 250) concerning the above-described security event, threat mitigation process 10 may gather 906 artifacts concerning the security event from a plurality of sources associated with the computing platform, wherein examples of such plurality of sources may include but are not limited to the various log files maintained by STEM system 230, and the various log files directly maintained by the security-relevant subsystems.

Once the appropriate artifacts (e.g., artifacts 250) are gathered 904, threat mitigation process 10 may assign 908 a threat level to the above-described security event based, at least in part, upon the artifacts (e.g., artifacts 250) gathered 904.

When assigning 908 a threat level to the above-described security event, threat mitigation process 10 may assign 910 a threat level using artificial intelligence/machine learning. As discussed above and with respect to artificial intelligence/machine learning being utilized to process data sets, an initial probabilistic model may be defined, wherein this initial probabilistic model may be subsequently (e.g., iteratively or continuously) modified and revised, thus allowing the probabilistic models and the artificial intelligence systems (e.g., probabilistic process 56) to "learn" so that future probabilistic models may be more precise and may explain more complex data sets. As further discussed above, probabilistic process 56 may define an initial probabilistic model for accomplishing a defined task (e.g., the analyzing of information 58), wherein the probabilistic model may be utilized to go from initial observations about information 58 (e.g., as represented by the initial branches of a probabilistic model) to conclusions about information 58 (e.g., as represented by the leaves of a probabilistic model). Accordingly and through the use of probabilistic process 56, massive data sets concerning security events may be processed so that a probabilistic model may be defined (and subsequently revised) to assign 910 a threat level to the above-described security event.

Once assigned 910 a threat level, threat mitigation process 10 may execute 912 a remedial action plan (e., remedial action plan 252) based, at least in part, upon the assigned threat level.

For example and when executing 912 a remedial action plan, threat mitigation process 10 may allow 914 the above-described suspect activity to continue when e.g., threat mitigation process 10 assigns 908 a "low" threat level to the above-described security event (e.g., assuming that it is determined that the user of the local computing device is streaming video of his daughter's graduation to his parents in Moldova).

Further and when executing 912 a remedial action plan, threat mitigation process 10 may generate 916 a security event report (e.g., security event report 254) based, at least in part, upon the artifacts (e.g., artifacts 250) gathered 904; and provide 918 the security event report (e.g., security event report 254) to an analyst (e.g., analyst 256) for further review when e.g., threat mitigation process 10 assigns 908 a "moderate" threat level to the above-described security event (e.g., assuming that it is determined that while the streaming of the content is concerning, the content is low value and the recipient is not a known bad actor).

Further and when executing 912 a remedial action plan, threat mitigation process 10 may autonomously execute 920 a threat mitigation plan (shutting down the stream and closing the port) when e.g., threat mitigation process 10 assigns 908 a "severe" threat level to the above-described security event (e.g., assuming that it is determined that the streaming of the content is very concerning, as the content is high value and the recipient is a known bad actor).

Additionally, threat mitigation process 10 may allow 922 a third-party (e.g., the user/owner/operator of computing platform 60) to manually search for artifacts within computing platform 60. For example, the third-party (e.g., the user/owner/operator of computing platform 60) may be able to search the various information resources include within computing platform 60, examples of which may include but are not limited to the various log files maintained by STEM system 230, and the various log files directly maintained by the security-relevant subsystems within computing platform 60.

Computing Platform Aggregation & Searching

As will be discussed below in greater detail, threat mitigation process 10 may be configured to e.g., aggregate data sets and allow for unified search of those data sets.

---

Concept 9)

---

Figure 18:
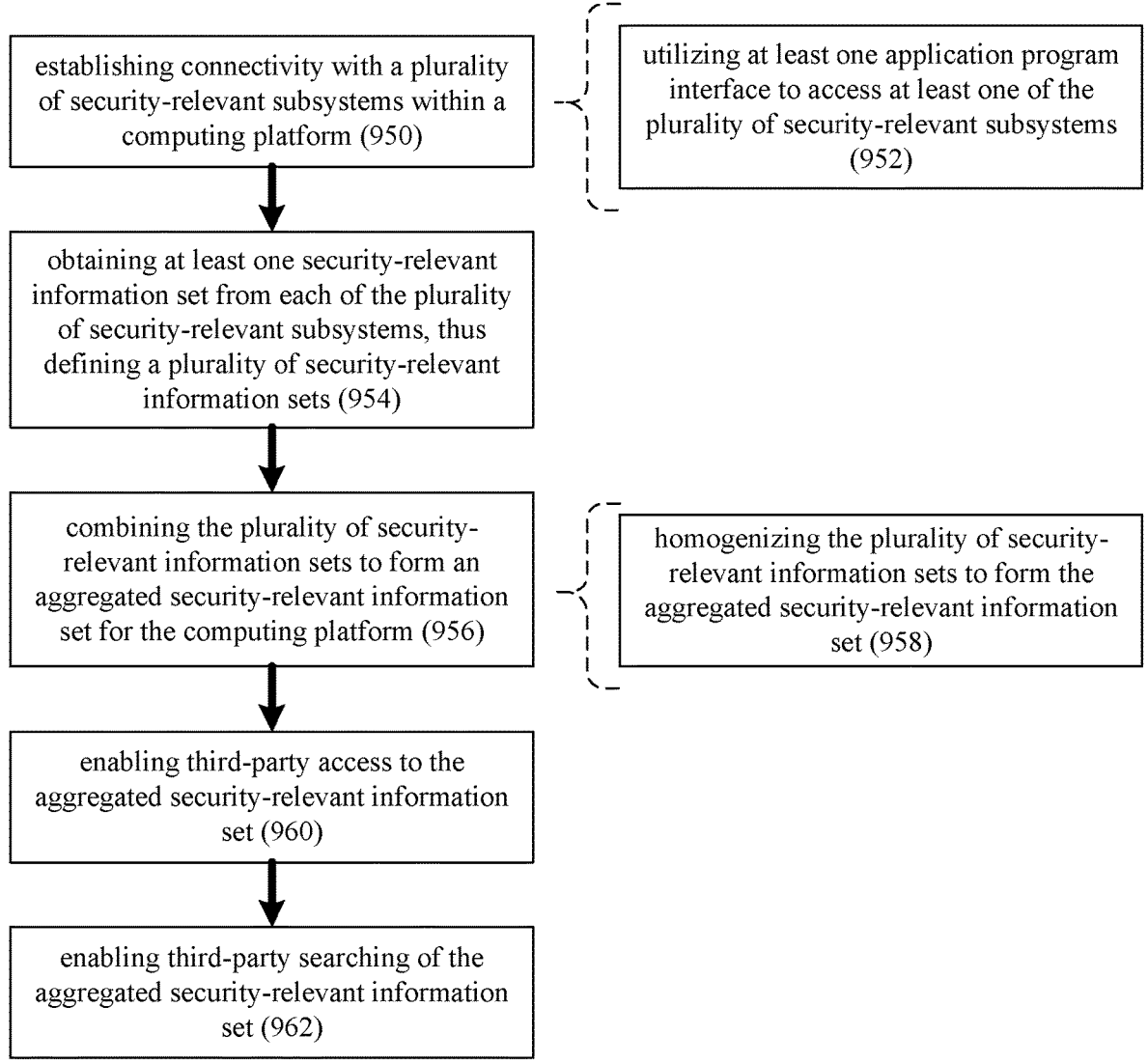

Referring also to FIG. 18, threat mitigation process 10 may be configured to consolidate multiple separate and discrete data sets to form a single, aggregated data set. For example, threat mitigation process 10 may establish 950 connectivity with a plurality of security-relevant subsystems (e.g., security-relevant subsystems 226) within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When establishing 950 connectivity with a plurality of security-relevant subsystems, threat mitigation process 10 may utilize 952 at least one application program interface (e.g., API Gateway 224) to access at least one of the plurality of security-relevant subsystems. For example, a $1^{st}$ API gateway may be utilized to access CDN (i.e., Content Delivery Network) system; a $2^{nd}$ API gateway may be utilized to access DAM (i.e., Database Activity Monitoring) system; a $3^{rd}$ API gateway may be utilized to access UBA (i.e., User Behavior Analytics) system; a $4^{th}$ API gateway may be utilized to access MDM (i.e., Mobile Device Management) system; a $5^{th}$ API gateway may be utilized to access IAM (i.e., Identity and Access Management) system; and a $6^{th}$ API gateway may be utilized to access DNS (i.e., Domain Name Server) system.

Threat mitigation process 10 may obtain 954 at least one security-relevant information set (e.g., a log file) from each of the plurality of security-relevant subsystems (e.g., CDN system; DAM system; UBA system; MDM system; IAM system; and DNS system), thus defining plurality of security-relevant information sets 258. As would be expected, plurality of security-relevant information sets 258 may utilize a plurality of different formats and/or a plurality of different nomenclatures. Accordingly, threat mitigation process 10 may combine 956 plurality of security-relevant information sets 258 to form an aggregated security-relevant information set 260 for computing platform 60.

When combining 956 plurality of security-relevant information sets 258 to form aggregated security-relevant information set 260, threat mitigation process 10 may homogenize 958 plurality of security-relevant information sets 258 to form aggregated security-relevant information set 260. For example, threat mitigation process 10 may process one or more of security-relevant information sets 258 so that they all have a common format, a common nomenclature, and/or a common structure.

Once threat mitigation process 10 combines 956 plurality of security-relevant information sets 258 to form an aggregated security-relevant information set 260 for computing platform 60, threat mitigation process 10 may enable 960 a third-party (e.g., the user/owner/operator of computing platform 60) to access aggregated security-relevant information set 260 and/or enable 962 a third-party (e.g., the user/owner/operator of computing platform 60) to search aggregated security-relevant information set 260.

Concept 10)

Figure 19:
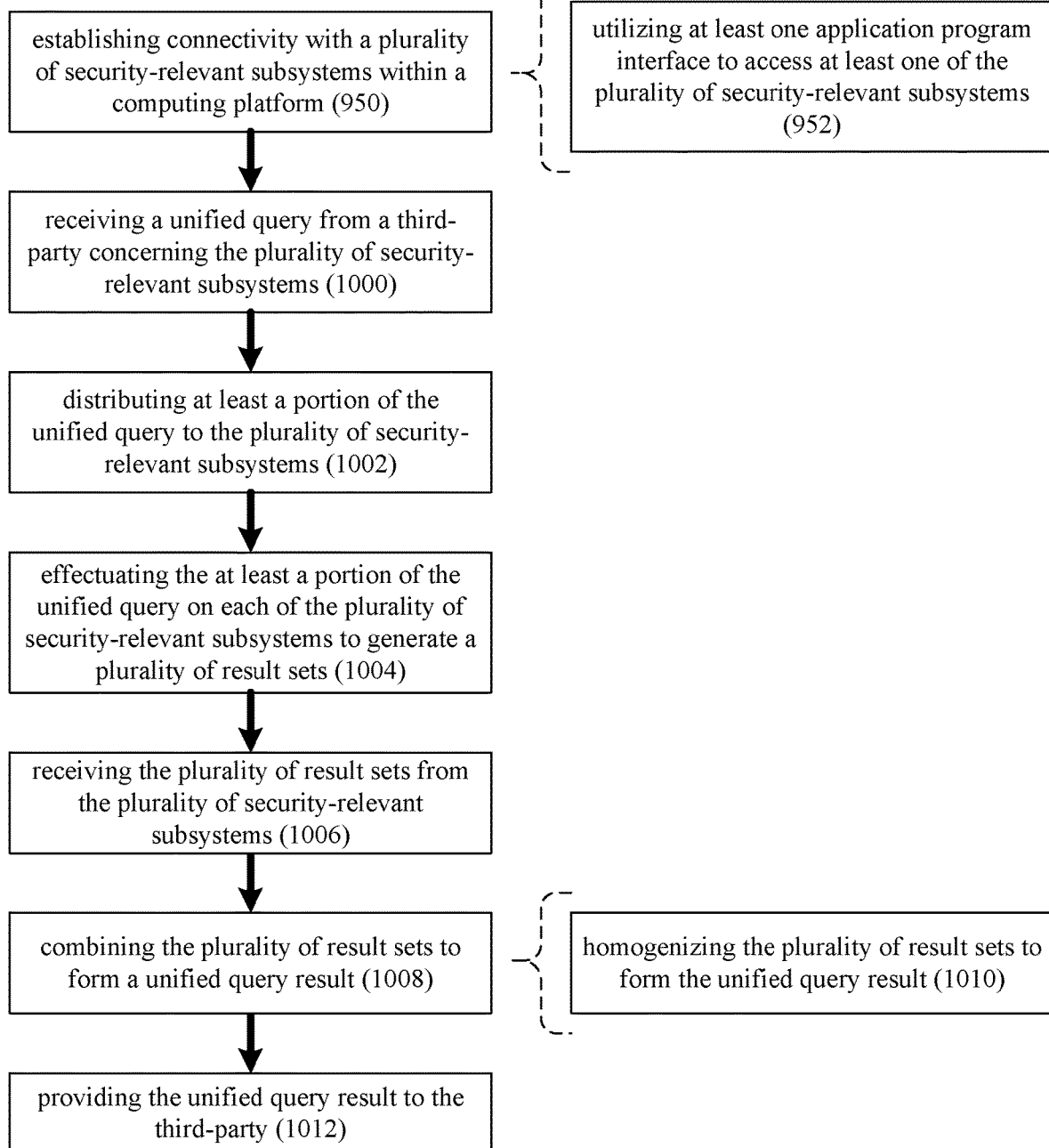

Referring also to FIG. 19, threat mitigation process 10 may be configured to enable the searching of multiple separate and discrete data sets using a single search operation. For example and as discussed above, threat mitigation process 10 may establish 950 connectivity with a plurality of security-relevant subsystems (e., security-relevant subsystems 226) within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When establishing 950 connectivity with a plurality of security-relevant subsystems, threat mitigation process 10 may utilize 952 at least one application program interface (e.g., API Gateway 224) to access at least one of the plurality of security-relevant subsystems. For example, a $1^{st}$ API gateway may be utilized to access CDN (i.e., Content Delivery Network) system; a $2^{nd}$ API gateway may be utilized to access DAM (i.e., Database Activity Monitoring) system; a $3^{rd}$ API gateway may be utilized to access UBA (i.e., User Behavior Analytics) system; a $4^{th}$ API gateway may be utilized to access MDM (i.e., Mobile Device Management) system; a $5^{th}$ API gateway may be utilized to access IAM (i.e., Identity and Access Management) system; and a $6^{th}$ API gateway may be utilized to access DNS (i.e., Domain Name Server) system.

Threat mitigation process 10 may receive 1000 unified query 262 from a third-party (e.g., the user/owner/operator of computing platform 60) concerning the plurality of security-relevant subsystems. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

Threat mitigation process 10 may distribute 1002 at least a portion of unified query 262 to the plurality of security-relevant subsystems, resulting in the distribution of plurality of queries 264 to the plurality of security-relevant subsystems. For example, assume that a third-party (e.g., the user/owner/operator of computing platform 60) wishes to execute a search concerning the activity of a specific employee. Accordingly, the third-party (e.g., the user/owner/operator of computing platform 60) may formulate the appropriate unified query (e.g., unified query 262) that defines the employee name, the computing device(s) of the employee, and the date range of interest. Unified query 262 may then be parsed to form plurality of queries 264, wherein a specific query (within plurality of queries 264) may be defined for each of the plurality of security-relevant subsystems and provided to the appropriate security-relevant subsystems. For example, a $1^{st}$ query may be included within plurality of queries 264 and provided to CDN (i.e., Content Delivery Network) system; a $2^{nd}$ query may be included within plurality of queries 264 and provided to DAM (i.e., Database Activity Monitoring) system; a $3^{rd}$ query may be included within plurality of queries 264 and provided to UBA (i.e., User Behavior Analytics) system; a $4^{th}$ query may be included within plurality of queries 264 and provided to MDM (i.e., Mobile Device Management) system; a $5^{th}$ query may be included within plurality of queries 264 and provided to IAM (i.e., Identity and Access Management) system; and a $6^{th}$ query may be included within plurality of queries 264 and provided to DNS (i.e., Domain Name Server) system.

Threat mitigation process 10 may effectuate 1004 at least a portion of unified query 262 on each of the plurality of security-relevant subsystems to generate plurality of result sets 266. For example, the $1^{st}$ query may be executed on CDN (i.e., Content Delivery Network) system to produce a 1st result set; the 2nd query may be executed on DAM (i.e., Database Activity Monitoring) system to produce a 2nd result set; the 3rd query may be executed on UBA (i.e., User Behavior Analytics) system to produce a 3rd result set; the 4th query may be executed on MDM (i.e., Mobile Device Management) system to produce a 4th result set; the 5th query may be executed on IAM (i.e., Identity and Access Management) system to produce a 5th result set; and the 6th query may executed on DNS (i.e., Domain Name Server) system to produce a 6th result set.

Threat mitigation process 10 may receive 1006 plurality of result sets 266 from the plurality of security-relevant subsystems. Threat mitigation process 10 may then combine 1008 plurality of result sets 266 to form unified query result 268. When combining 1008 plurality of result sets 266 to form unified query result 268, threat mitigation process 10 may homogenize 1010 plurality of result sets 266 to form unified query result 268. For example, threat mitigation process 10 may process one or more discrete result sets included within plurality of result sets 266 so that the discrete result sets within plurality of result sets 266 all have a common format, a common nomenclature, and/or a common structure. Threat mitigation process 10 may then provide 1012 unified query result 268 to the third-party (e.g., the user/owner/operator of computing platform 60).

Concept 11)

Figure 20:
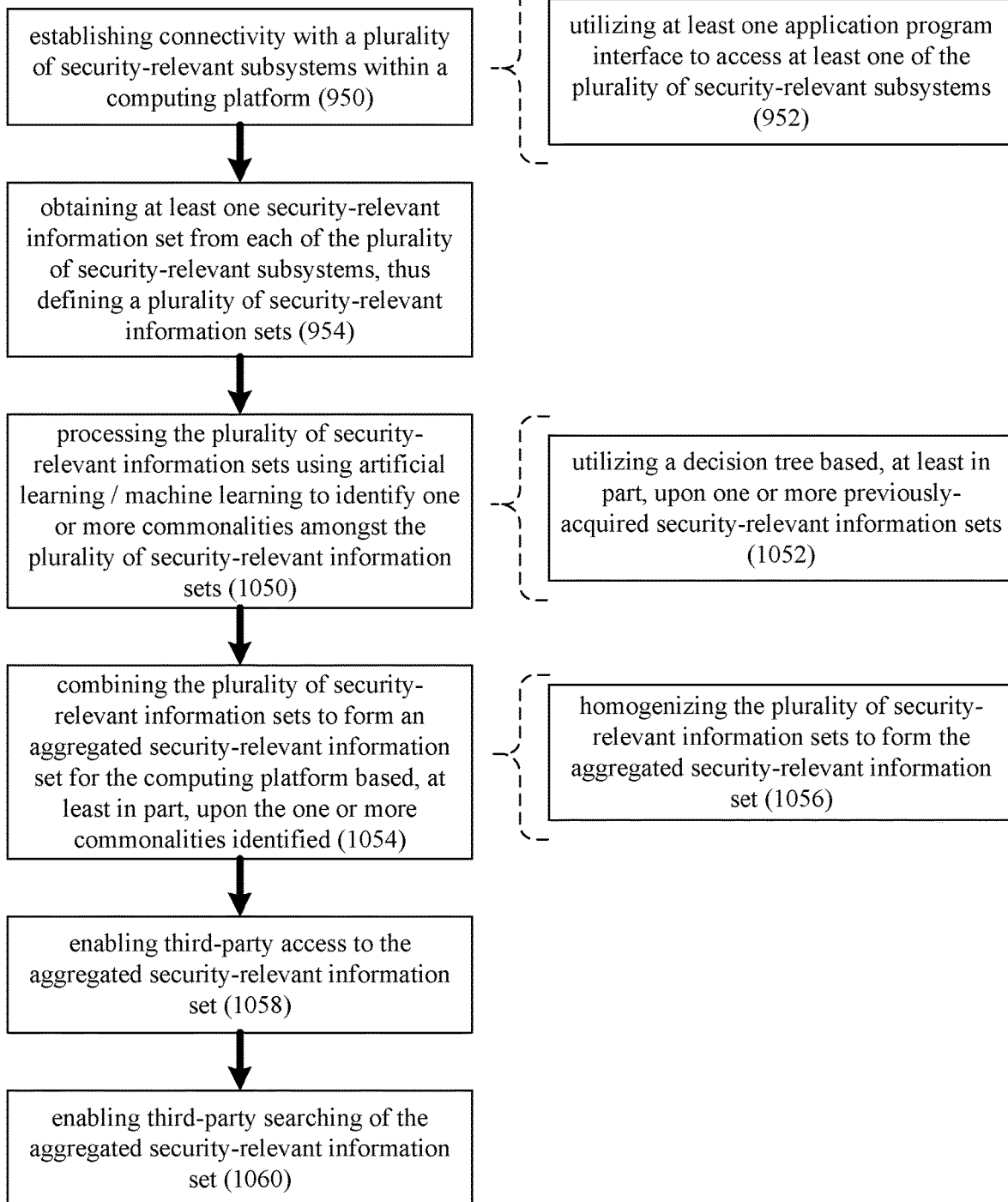

Referring also to FIG. 20, threat mitigation process 10 may be configured to utilize artificial intelligence/machine learning to automatically consolidate multiple separate and discrete data sets to form a single, aggregated data set. For example and as discussed above, threat mitigation process 10 may establish 950 connectivity with a plurality of security-relevant subsystems (e.g., security-relevant subsystems 226) within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

As discussed above and when establishing 950 connectivity with a plurality of security-relevant subsystems, threat mitigation process 10 may utilize 952 at least one application program interface (e.g., API Gateway 224) to access at least one of the plurality of security-relevant subsystems. For example, a 1st API gateway may be utilized to access CDN (i.e., Content Delivery Network) system; a 2nd API gateway may be utilized to access DAM (i.e., Database Activity Monitoring) system; a 3rd API gateway may be utilized to access UBA (i.e., User Behavior Analytics) system; a 4th API gateway may be utilized to access MDM (i.e., Mobile Device Management) system; a 5th API gateway may be utilized to access IAM (i.e., Identity and Access Management) system; and a 6th API gateway may be utilized to access DNS (i.e., Domain Name Server) system.

As discussed above, threat mitigation process 10 may obtain 954 at least one security-relevant information set (e.g., a log file) from each of the plurality of security-relevant subsystems (e.g., CDN system; DAM system; UBA system; MDM system; IAM system; and DNS system), thus defining plurality of security-relevant information sets 258. As would be expected, plurality of security-relevant information sets 258 may utilize a plurality of different formats and/or a plurality of different nomenclatures.

Threat mitigation process 10 may process 1050 plurality of security-relevant information sets 258 using artificial learning/machine learning to identify one or more commonalities amongst plurality of security-relevant information sets 258. As discussed above and with respect to artificial intelligence/machine learning being utilized to process data sets, an initial probabilistic model may be defined, wherein this initial probabilistic model may be subsequently (e.g., iteratively or continuously) modified and revised, thus allowing the probabilistic models and the artificial intelligence systems (e.g., probabilistic process 56) to "learn" so that future probabilistic models may be more precise and may explain more complex data sets. As further discussed above, probabilistic process 56 may define an initial probabilistic model for accomplishing a defined task (e.g., the analyzing of information 58), wherein the probabilistic model may be utilized to go from initial observations about information 58 (e.g., as represented by the initial branches of a probabilistic model) to conclusions about information 58 (e.g., as represented by the leaves of a probabilistic model). Accordingly and through the use of probabilistic process 56, plurality of security-relevant information sets 258 may be processed so that a probabilistic model may be defined (and subsequently revised) to identify one or more commonalities (e.g., common headers, common nomenclatures, common data ranges, common data types, common formats, etc.) amongst plurality of security-relevant information sets 258. When processing 1050 plurality of security-relevant information sets 258 using artificial learning/machine learning to identify one or more commonalities amongst plurality of security-relevant information sets 258, threat mitigation process 10 may utilize 1052 a decision tree (e.g., probabilistic model 100) based, at least in part, upon one or more previously-acquired security-relevant information sets.

Threat mitigation process 10 may combine 1054 plurality of security-relevant information sets 258 to form aggregated security-relevant information set 260 for computing platform 60 based, at least in part, upon the one or more commonalities identified.

When combining 1054 plurality of security-relevant information sets 258 to form aggregated security-relevant information set 260 for computing platform 60 based, at least in part, upon the one or more commonalities identified, threat mitigation process 10 may homogenize 1056 plurality of security-relevant information sets 258 to form aggregated security-relevant information set 260. For example, threat mitigation process 10 may process one or more of security-relevant information sets 258 so that they all have a common format, a common nomenclature, and/or a common structure.

Once threat mitigation process 10 combines 1054 plurality of security-relevant information sets 258 to form an aggregated security-relevant information set 260 for computing platform 60, threat mitigation process 10 may enable 1058 a third-party (e.g., the user/owner/operator of computing platform 60) to access aggregated security-relevant information set 260 and/or enable 1060 a third-party (e.g., the user/owner/operator of computing platform 60) to search aggregated security-relevant information set 260.

Threat Event Information Updating

As will be discussed below in greater detail, threat mitigation process 10 may be configured to be updated concerning threat event information.

---

Concept 12)

Figure 21:
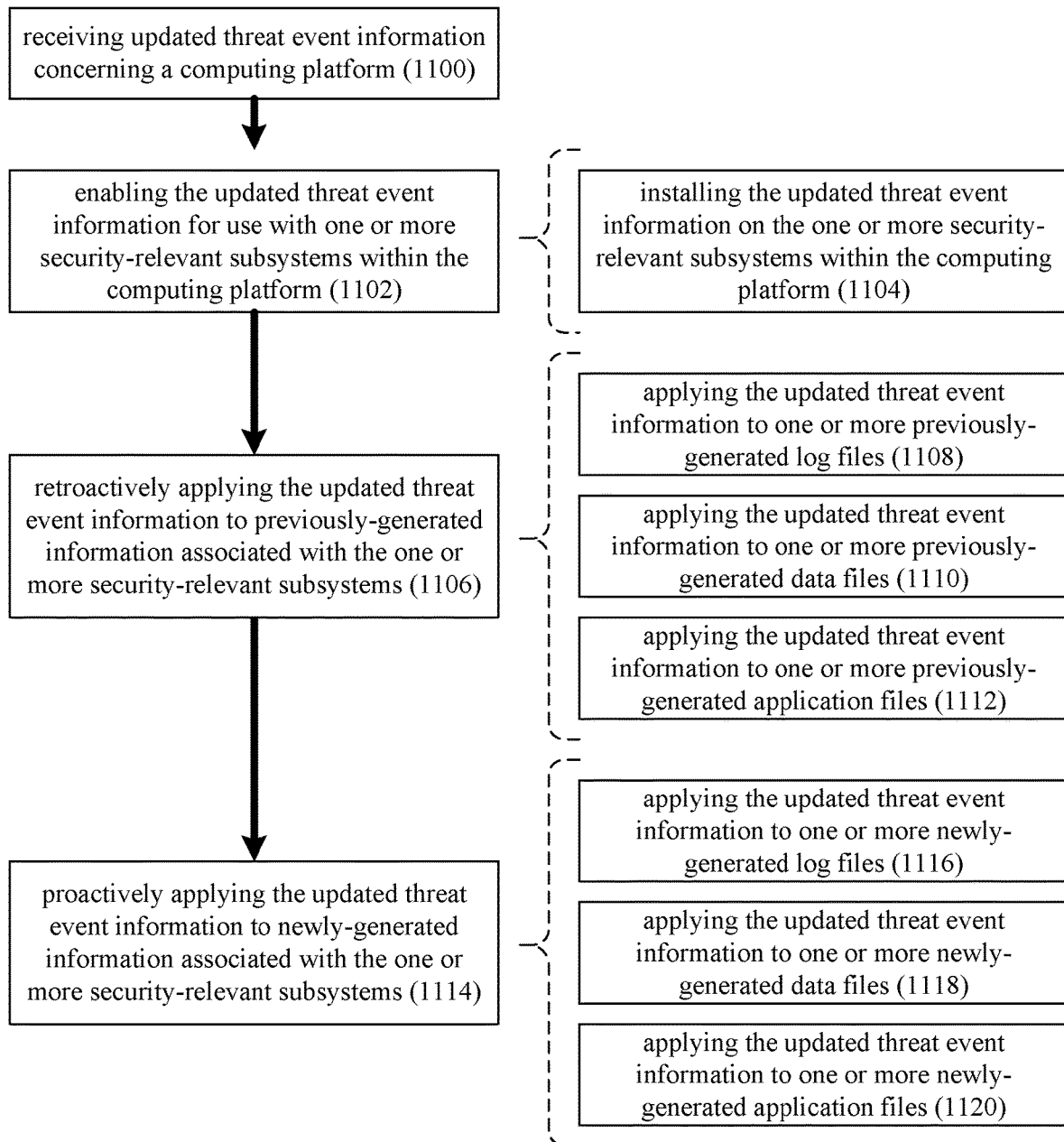

Referring also to FIG. 21, threat mitigation process 10 may be configured to receive updated threat event information for security-relevant subsystems 226. For example, threat mitigation process 10 may receive 1100 updated threat event information 270 concerning computing platform 60, wherein updated threat event information 270 may define one or more of: updated threat listings; updated threat definitions; updated threat methodologies; updated threat sources; and updated threat strategies. Threat mitigation process 10 may enable 1102 updated threat event information 270 for use with one or more security-relevant subsystems 226 within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When enabling 1102 updated threat event information 270 for use with one or more security-relevant subsystems 226 within computing platform 60, threat mitigation process 10 may install 1104 updated threat event information 270 on one or more security-relevant subsystems 226 within computing platform 60.

Threat mitigation process 10 may retroactively apply 1106 updated threat event information 270 to previously-generated information associated with one or more security-relevant subsystems 226.

When retroactively apply 1106 updated threat event information 270 to previously-generated information associated with one or more security-relevant subsystems 226, threat mitigation process 10 may: apply 1108 updated threat event information 270 to one or more previously-generated log files (not shown) associated with one or more security-relevant subsystems 226; apply 1110 updated threat event information 270 to one or more previously-generated data files (not shown) associated with one or more security-relevant subsystems 226; and apply 1112 updated threat event information 270 to one or more previously-generated application files (not shown) associated with one or more security-relevant subsystems 226.

Additionally, /alternatively, threat mitigation process 10 may proactively apply 1114 updated threat event information 270 to newly-generated information associated with one or more security-relevant subsystems 226.

When proactively applying 1114 updated threat event information 270 to newly-generated information associated with one or more security-relevant subsystems 226, threat mitigation process 10 may: apply 1116 updated threat event information 270 to one or more newly-generated log files (not shown) associated with one or more security-relevant subsystems 226; apply 1118 updated threat event information 270 to one or more newly-generated data files (not shown) associated with one or more security-relevant subsystems 226; and apply 1120 updated threat event information 270 to one or more newly-generated application files (not shown) associated with one or more security-relevant subsystems 226.

---

Concept 13)

Figure 22:
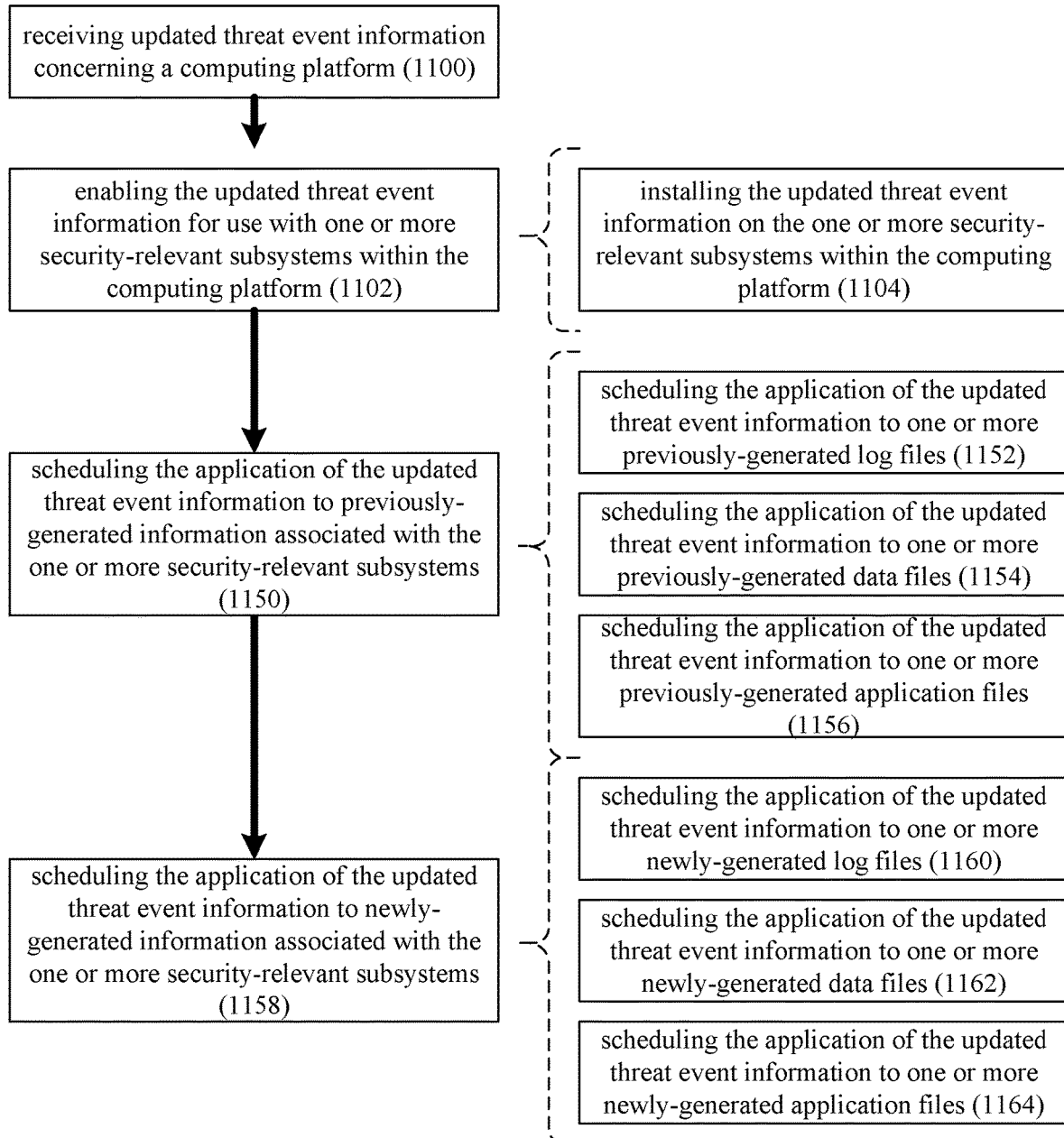

Referring also to FIG. 22, threat mitigation process 10 may be configured to receive updated threat event information 270 for security-relevant subsystems 226. For example and as discussed above, threat mitigation process 10 may receive 1100 updated threat event information 270 concerning computing platform 60, wherein updated threat event information 270 may define one or more of: updated threat listings; updated threat definitions; updated threat methodologies; updated threat sources; and updated threat strategies. Further and as discussed above, threat mitigation process 10 may enable 1102 updated threat event information 270 for use with one or more security-relevant subsystems 226 within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

As discussed above and when enabling 1102 updated threat event information 270 for use with one or more security-relevant subsystems 226 within computing platform 60, threat mitigation process 10 may install 1104 updated threat event information 270 on one or more security-relevant subsystems 226 within computing platform 60.

Sometimes, it may not be convenient and/or efficient to immediately apply updated threat event information 270 to security-relevant subsystems 226. Accordingly, threat mitigation process 10 may schedule 1150 the application of updated threat event information 270 to previously-generated information associated with one or more security-relevant subsystems 226.

When scheduling 1150 the application of updated threat event information 270 to previously-generated information associated with one or more security-relevant subsystems 226, threat mitigation process 10 may: schedule 1152 the application of updated threat event information 270 to one or more previously-generated log files (not shown) associated with one or more security-relevant subsystems 226; schedule 1154 the application of updated threat event information 270 to one or more previously-generated data files (not shown) associated with one or more security-relevant subsystems 226; and schedule 1156 the application of updated threat event information 270 to one or more previously-generated application files (not shown) associated with one or more security-relevant subsystems 226.

Additionally, /alternatively, threat mitigation process 10 may schedule 1158 the application of the updated threat event information to newly-generated information associated with the one or more security-relevant subsystems.

When scheduling 1158 the application of updated threat event information 270 to newly-generated information associated with one or more security-relevant subsystems 226, threat mitigation process 10 may: schedule 1160 the application of updated threat event information 270 to one or more newly-generated log files (not shown) associated with one or more security-relevant subsystems 226; schedule 1162 the application of updated threat event information 270 to one or more newly-generated data files (not shown) associated with one or more security-relevant subsystems 226; and schedule 1164 the application of updated threat event information 270 to one or more newly-generated application files (not shown) associated with one or more security-relevant subsystems 226.

---
Concept 14)
---

Figure 23:
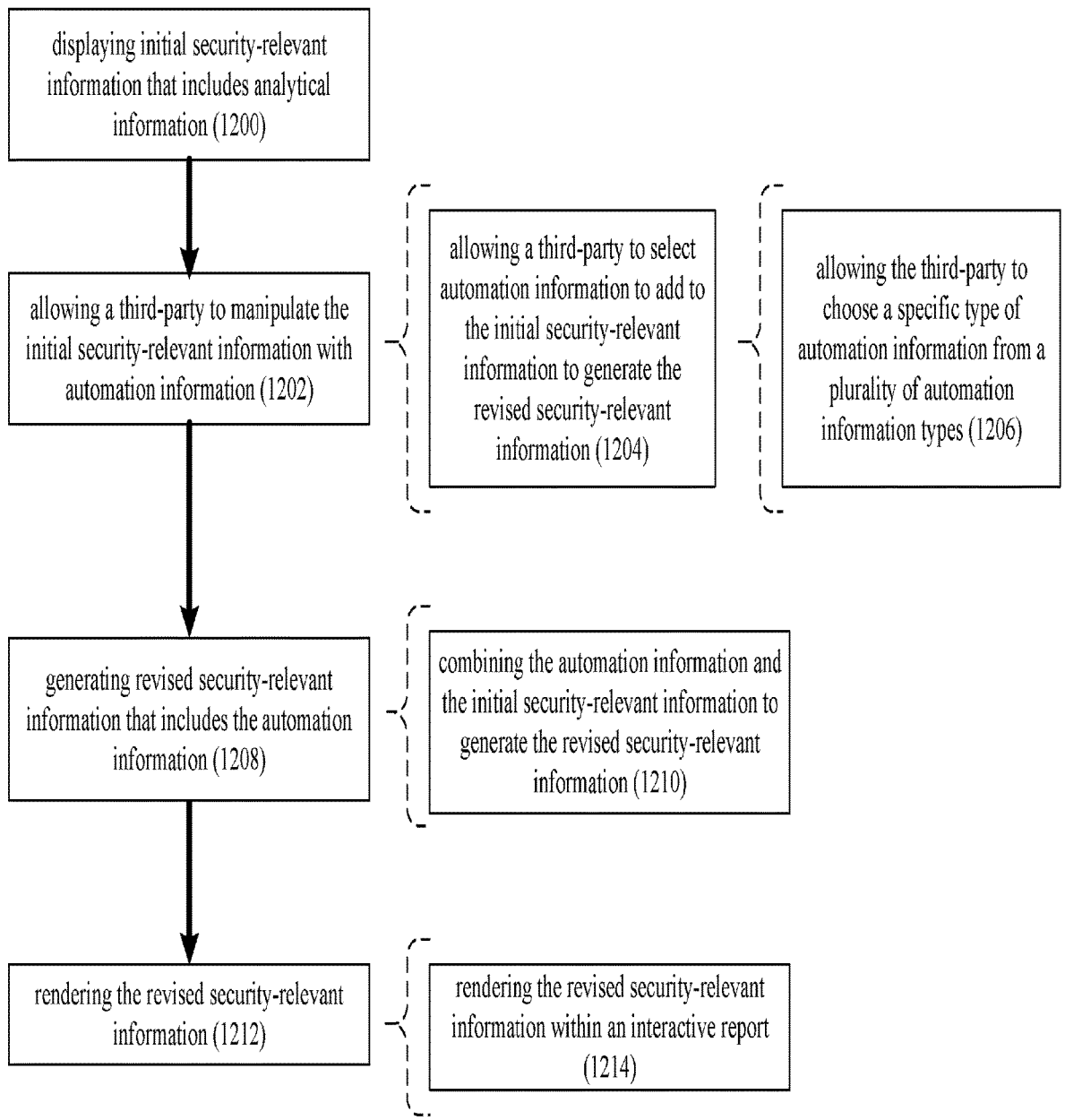
Figure 24:
FIG. 24 is a diagrammatic view of a screen rendered by the threat mitigation process of FIG. 1 according to an embodiment of the present disclosure.

Referring also to FIGS. 23-24, threat mitigation process 10 may be configured to initially display analytical data, which may then be manipulated/updated to include automation data. For example, threat mitigation process 10 may display 1200 initial security-relevant information 1250 that includes analytical information (e.g., thought cloud 1252). Examples of such analytical information may include but is not limited to one or more of: investigative information; and hunting information.

Investigative Information (a portion of analytical information): Unified searching and/or automated searching, such as e.g., a security event occurring and searches being performed to gather artifacts concerning that security event.

Hunt Information (a portion of analytical information): Targeted searching/investigations, such as the monitoring and cataloging of the videos that an employee has watched or downloaded over the past 30 days.

Threat mitigation process 10 may allow 1202 a third-party (e.g., the user/owner/operator of computing platform 60) to manipulate initial security-relevant information 1250 with automation information.

Automate Information (a portion of automation): The execution of a single (and possibly simple) action one time, such as the blocking an IP address from accessing computing platform 60 whenever such an attempt is made.

Orchestrate Information (a portion of automation): The execution of a more complex batch (or series) of tasks, such as sensing an unauthorized download via an API and a) shutting down the API, adding the requesting IP address to a blacklist, and closing any ports opened for the requestor.

When allowing 1202 a third-party (e.g., the user/owner/ operator of computing network 60) to manipulate initial security-relevant information 1250 with automation information, threat mitigation process 10 may allow 1204 a third-party (e.g., the user/owner/operator of computing network 60) to select the automation information to add to initial security-relevant information 1250 to generate revised security-relevant information 1250'. For example and when allowing 1204 a third-party (e.g., the user/owner/ operator of computing network 60) to select the automation information to add to initial security-relevant information 1250 to generate revised security-relevant information 1250', threat mitigation process 10 may allow 1206 the third-party (e.g., the user/owner/operator of computing network 60) to choose a specific type of automation information from a plurality of automation information types.

For example, the third-party (e.g., the user/owner/operator of computing network 60) may choose to add/initiate the automation information to generate revised security-relevant information 1250'. Accordingly, threat mitigation process 10 may render selectable options (e.g., selectable buttons 1254, 1256) that the third-party (e.g., the user/owner/operator of computing network 60) may select to manipulate initial security-relevant information 1250 with automation information to generate revised security-relevant information 1250'. For this particular example, the third-party (e.g., the user/owner/operator of computing network 60) may choose two different options to manipulate initial security-relevant information 1250, namely: "block ip" or "search", both of which will result in threat mitigation process 10 generating 1208 revised security-relevant information 1250' (that includes the above-described automation information).

When generating 1208 revised security-relevant information 1250' (that includes the above-described automation information), threat mitigation process 10 may combine 1210 the automation information (that results from selecting "block IP" or "search") and initial security-relevant information 1250 to generate and render 1212 revised security-relevant information 1250'.

When rendering 1212 revised security-relevant information 1250', threat mitigation process 10 may render 1214 revised security-relevant information 1250' within interactive report 1258.

Training Routine Generation and Execution

As will be discussed below in greater detail, threat mitigation process 10 may be configured to allow for the manual or automatic generation of training routines, as well as the execution of the same.

---
Concept 15)
---

Figure 25:
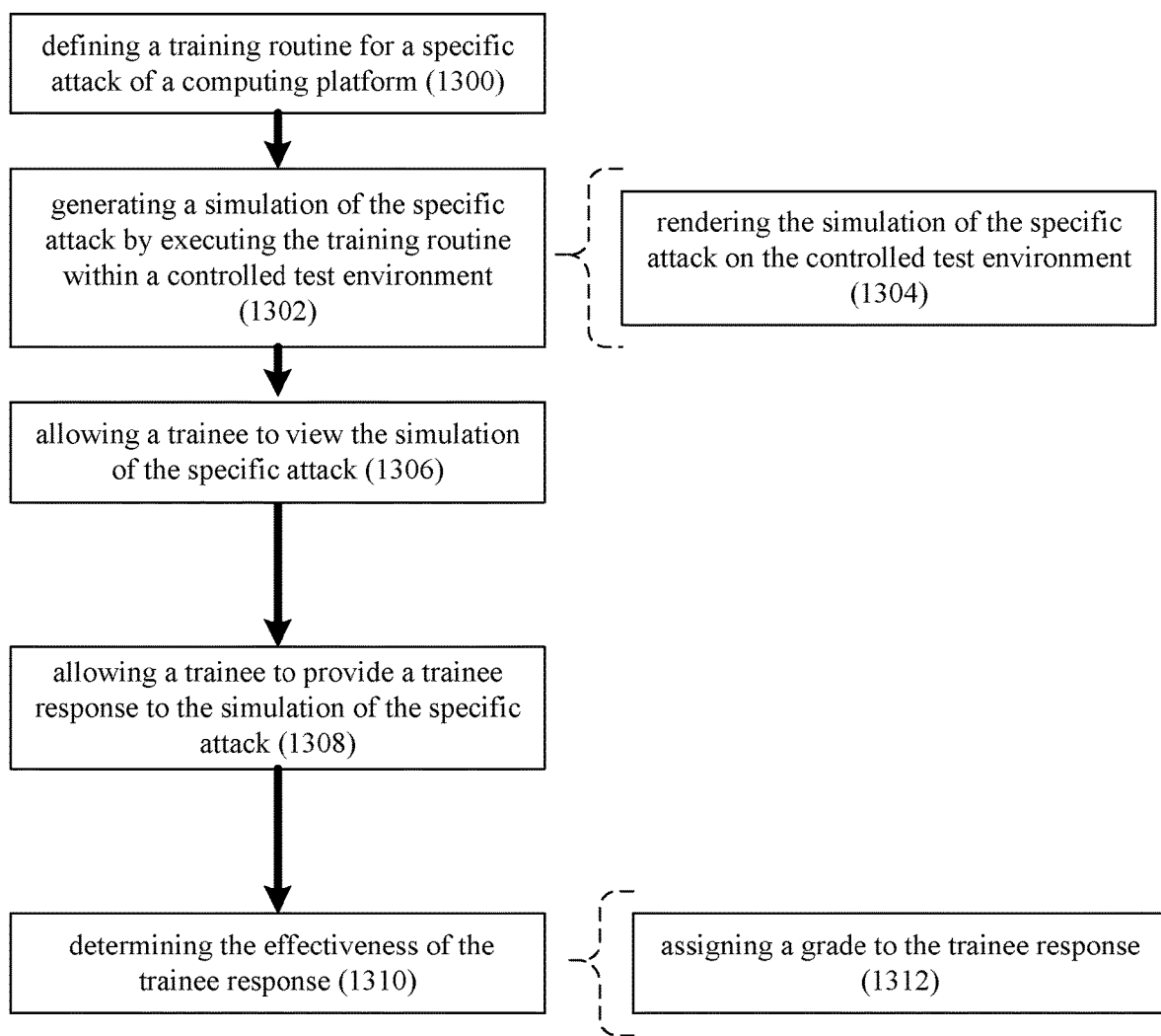
FIGS. 25-30 are flowcharts of other implementations of the threat mitigation process of FIG. 1 according to an embodiment of the present disclosure.

Referring also to FIG. 25, threat mitigation process 10 may be configured to allow for the manual generation of testing routine 272. For example, threat mitigation process 10 may define 1300 training routine 272 for a specific attack (e.g., a Denial of Services attack) of computing platform 60. Specifically, threat mitigation process 10 may generate 1302 a simulation of the specific attack (e.g., a Denial of Services attack) by executing training routine 272 within a controlled test environment, an example of which may include but is not limited to virtual machine 274 executed on a computing device (e.g., computing device 12).

When generating 1302 a simulation of the specific attack (e.g., a Denial of Services attack) by executing training routine 272 within the controlled test environment (e.g., virtual machine 274), threat mitigation process 10 may render 1304 the simulation of the specific attack (e.g., a Denial of Services attack) on the controlled test environment (e.g., virtual machine 274).

Threat mitigation process 10 may allow 1306 a trainee (e.g., trainee 276) to view the simulation of the specific attack (e.g., a Denial of Services attack) and may allow 1308 the trainee (e.g., trainee 276) to provide a trainee response (e.g., trainee response 278) to the simulation of the specific attack (e.g., a Denial of Services attack). For example, threat mitigation process 10 may execute training routine 272, which trainee 276 may "watch" and provide trainee response 278.

Threat mitigation process 10 may then determine 1310 the effectiveness of trainee response 278, wherein determining 1310 the effectiveness of the trainee response may include threat mitigation process 10 assigning 1312 a grade (e.g., a letter grade or a number grade) to trainee response 278.

Concept 16)

Figure 26:
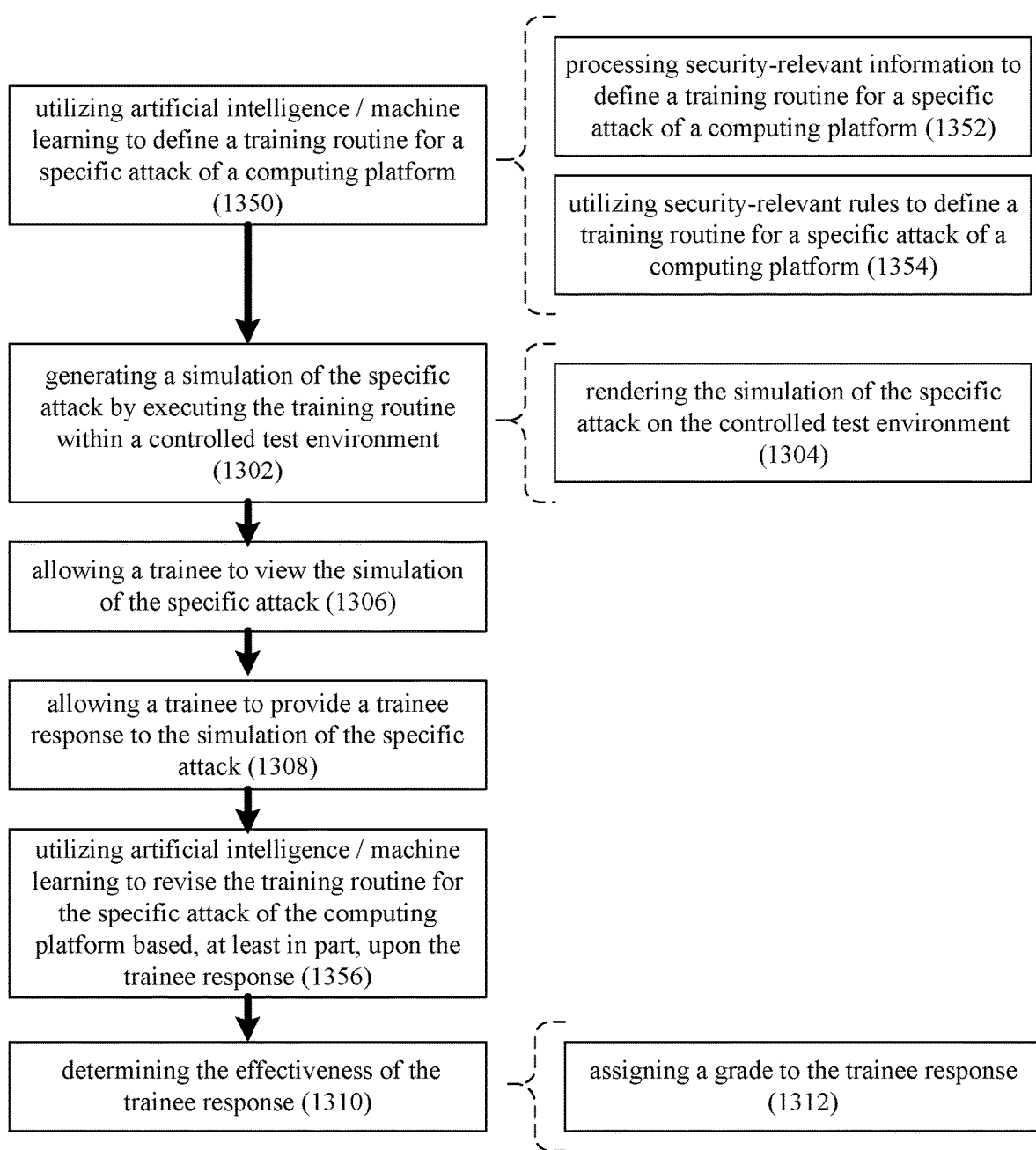

Referring also to FIG. 26, threat mitigation process 10 may be configured to allow for the automatic generation of testing routine 272. For example, threat mitigation process 10 may utilize 1350 artificial intelligence/machine learning to define training routine 272 for a specific attack (e.g., a Denial of Services attack) of computing platform 60.

As discussed above and with respect to artificial intelligence/machine learning being utilized to process data sets, an initial probabilistic model may be defined, wherein this initial probabilistic model may be subsequently (e.g., iteratively or continuously) modified and revised, thus allowing the probabilistic models and the artificial intelligence systems (e.g., probabilistic process 56) to "learn" so that future probabilistic models may be more precise and may explain more complex data sets. As further discussed above, probabilistic process 56 may define an initial probabilistic model for accomplishing a defined task (e.g., the analyzing of information 58), wherein the probabilistic model may be utilized to go from initial observations about information 58 (e.g., as represented by the initial branches of a probabilistic model) to conclusions about information 58 (e.g., as represented by the leaves of a probabilistic model). Accordingly and through the use of probabilistic process 56, information may be processed so that a probabilistic model may be defined (and subsequently revised) to define training routine 272 for a specific attack (e.g., a Denial of Services attack) of computing platform 60.

When using 1350 artificial intelligence/machine learning to define training routine 272 for a specific attack (e.g., a Denial of Services attack) of computing platform 60, threat mitigation process 10 may process 1352 security-relevant information to define training routine 272 for specific attack (e.g., a Denial of Services attack) of computing platform 60. Further and when using 1350 artificial intelligence/machine learning to define training routine 272 for a specific attack (e.g., a Denial of Services attack) of computing platform 60, threat mitigation process 10 may utilize 1354 security-relevant rules to define training routine 272 for a specific attack (e.g., a Denial of Services attack) of computing platform 60. Accordingly, security-relevant information that e.g., defines the symptoms of e.g., a Denial of Services attack and security-relevant rules that define the behavior of e.g., a Denial of Services attack may be utilized by threat mitigation process 10 when defining training routine 272.

As discussed above, threat mitigation process 10 may generate 1302 a simulation of the specific attack (e.g., a Denial of Services attack) by executing training routine 272 within a controlled test environment, an example of which may include but is not limited to virtual machine 274 executed on a computing device (e.g., computing device 12).

Further and as discussed above, when generating 1302 a simulation of the specific attack (e.g., a Denial of Services attack) by executing training routine 272 within the controlled test environment (e.g., virtual machine 274), threat mitigation process 10 may render 1304 the simulation of the specific attack (e.g., a Denial of Services attack) on the controlled test environment (e.g., virtual machine 274).

Threat mitigation process 10 may allow 1306 a trainee (e.g., trainee 276) to view the simulation of the specific attack (e.g., a Denial of Services attack) and may allow 1308 the trainee (e.g., trainee 276) to provide a trainee response (e.g., trainee response 278) to the simulation of the specific attack (e.g., a Denial of Services attack). For example, threat mitigation process 10 may execute training routine 272, which trainee 276 may "watch" and provide trainee response 278.

Threat mitigation process 10 may utilize 1356 artificial intelligence/machine learning to revise training routine 272 for the specific attack (e.g., a Denial of Services attack) of computing platform 60 based, at least in part, upon trainee response 278.

As discussed above, threat mitigation process 10 may then determine 1310 the effectiveness of trainee response 278, wherein determining 1310 the effectiveness of the trainee response may include threat mitigation process 10 assigning 1312 a grade (e.g., a letter grade or a number grade) to trainee response 278.

Concept 17)

Figure 27:
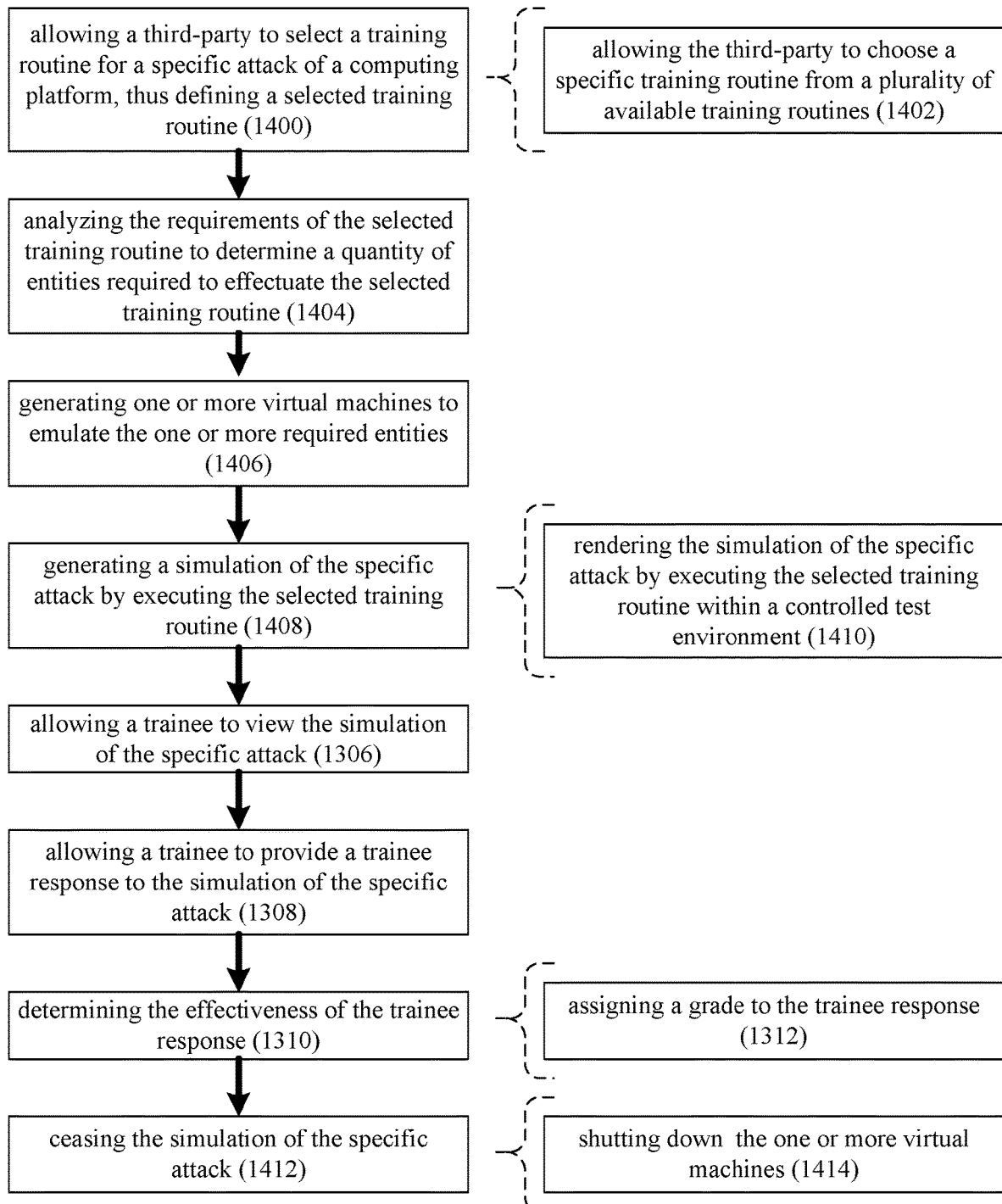

Referring also to FIG. 27, threat mitigation process 10 may be configured to allow a trainee to choose their training routine. For example mitigation process 10 may allow 1400 a third-party (e.g., the user/owner/operator of computing network 60) to select a training routine for a specific attack (e.g., a Denial of Services attack) of computing platform 60, thus defining a selected training routine. When allowing 1400 a third-party (e.g., the user/owner/operator of computing network 60) to select a training routine for a specific attack (e.g., a Denial of Services attack) of computing platform 60, threat mitigation process 10 may allow 1402 the third-party (e.g., the user/owner/operator of computing network 60) to choose a specific training routine from a plurality of available training routines. For example, the third-party (e.g., the user/owner/operator of computing network 60) may be able to select a specific type of attack (e.g., DDoS events, DoS events, phishing events, spamming events, malware events, web attacks, and exploitation events) and/or select a specific training routine (that may or may not disclose the specific type of attack).

Once selected, threat mitigation process 10 may analyze 1404 the requirements of the selected training routine (e.g., training routine 272) to determine a quantity of entities required to effectuate the selected training routine (e.g., training routine 272), thus defining one or more required entities. For example, assume that training routine 272 has three required entities (e.g., an attacked device and two attacking devices). According, threat mitigation process 10 may generate 1406 one or more virtual machines (e.g., such as virtual machine 274) to emulate the one or more required entities. In this particular example, threat mitigation process 10 may generate 1406 three virtual machines, a first VM for the attacked device, a second VM for the first attacking device and a third VM for the second attacking device. As is known in the art, a virtual machine (VM) is an virtual emulation of a physical computing system. Virtual machines may be based on computer architectures and may provide the functionality of a physical computer, wherein their implementations may involve specialized hardware, software, or a combination thereof.

Threat mitigation process 10 may generate 1408 a simulation of the specific attack (e.g., a Denial of Services attack) by executing the selected training routine (e.g., training routine 272). When generating 1408 the simulation of the specific attack (e.g., a Denial of Services attack) by executing the selected training routine (e.g., training routine 272), threat mitigation process 10 may render 1410 the simulation of the specific attack (e.g., a Denial of Services attack) by executing the selected training routine (e.g., training routine 272) within a controlled test environment (e.g., such as virtual machine 274).

As discussed above, threat mitigation process 10 may allow 1306 a trainee (e.g., trainee 276) to view the simulation of the specific attack (e.g., a Denial of Services attack) and may allow 1308 the trainee (e.g., trainee 276) to provide a trainee response (e.g., trainee response 278) to the simulation of the specific attack (e.g., a Denial of Services attack). For example, threat mitigation process 10 may execute training routine 272, which trainee 276 may "watch" and provide trainee response 278.

Further and as discussed above, threat mitigation process 10 may then determine 1310 the effectiveness of trainee response 278, wherein determining 1310 the effectiveness of the trainee response may include threat mitigation process 10 assigning 1312 a grade (e.g., a letter grade or a number grade) to trainee response 278.

When training is complete, threat mitigation process 10 may cease 1412 the simulation of the specific attack (e.g., a Denial of Services attack), wherein ceasing 1412 the simulation of the specific attack (e.g., a Denial of Services attack) may include threat mitigation process 10 shutting down 1414 the one or more virtual machines (e.g., the first VM for the attacked device, the second VM for the first attacking device and the third VM for the second attacking device).

Information Routing

As will be discussed below in greater detail, threat mitigation process 10 may be configured to route information based upon whether the information is more threat-pertinent or less threat-pertinent.

---

Concept 18)

---

Figure 28:
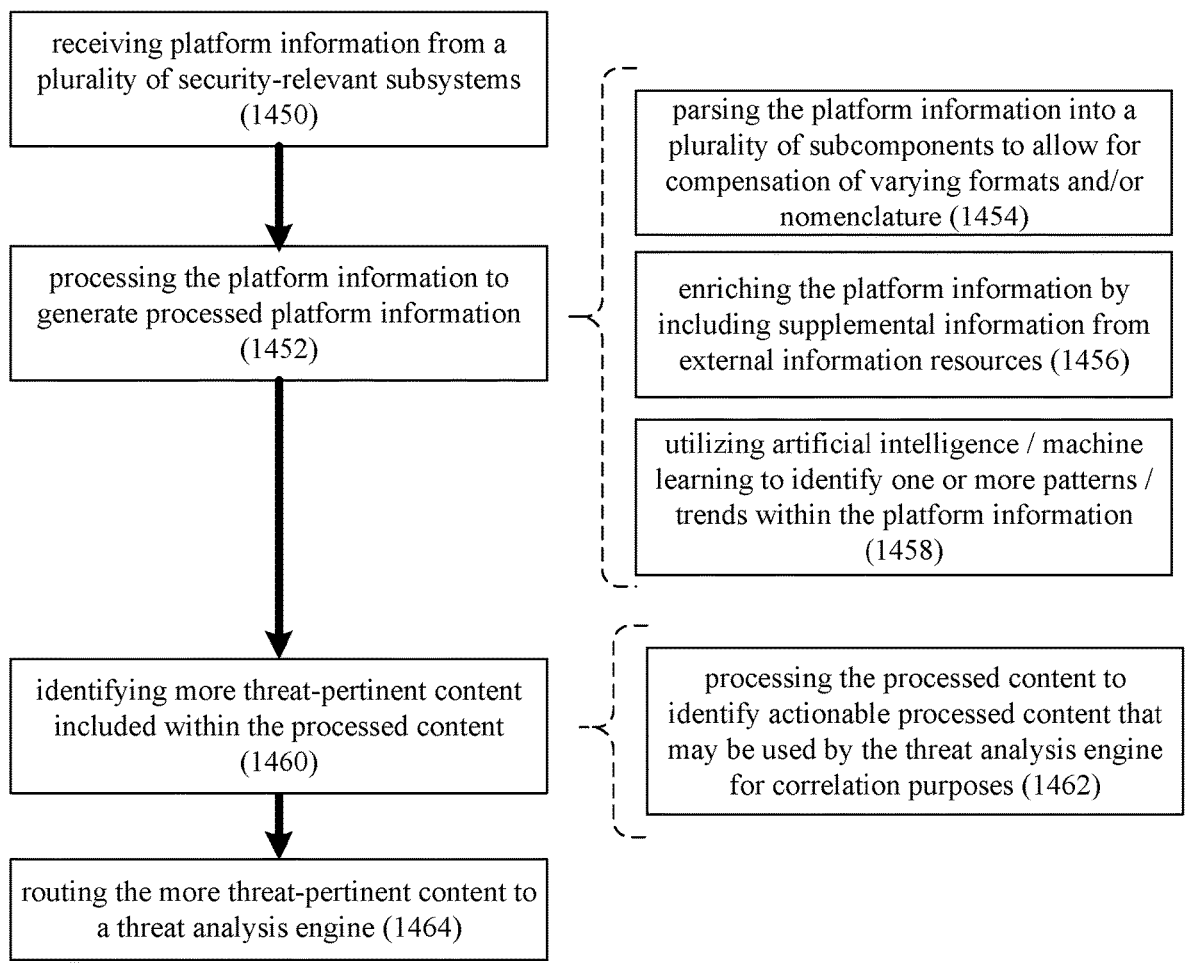

Referring also to FIG. 28, threat mitigation process 10 may be configured to route more threat-pertinent content in a specific manner. For example, threat mitigation process 10 may receive 1450 platform information (e.g., log files) from a plurality of security-relevant subsystems (e.g., security-relevant subsystems 226). As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

Threat mitigation process 10 may process 1452 this platform information (e.g., log files) to generate processed platform information. And when processing 1452 this platform information (e.g., log files) to generate processed platform information, threat mitigation process 10 may: parse 1454 the platform information (e.g., log files) into a plurality of subcomponents (e.g., columns, rows, etc.) to allow for compensation of varying formats and/or nomenclature; enrich 1456 the platform information (e.g., log files) by including supplemental information from external information resources; and/or utilize 1458 artificial intelligence/ machine learning (in the manner described above) to identify one or more patterns/trends within the platform information (e.g., log files).

Threat mitigation process 10 may identify 1460 more threat-pertinent content 280 included within the processed content, wherein identifying 1460 more threat-pertinent content 280 included within the processed content may include processing 1462 the processed content to identify actionable processed content that may be used by a threat analysis engine (e.g., SIEM system 230) for correlation purposes. Threat mitigation process 10 may route 1464 more threat-pertinent content 280 to this threat analysis engine (e.g., SIEM system 230).

---

Concept 19)

---

Figure 29:
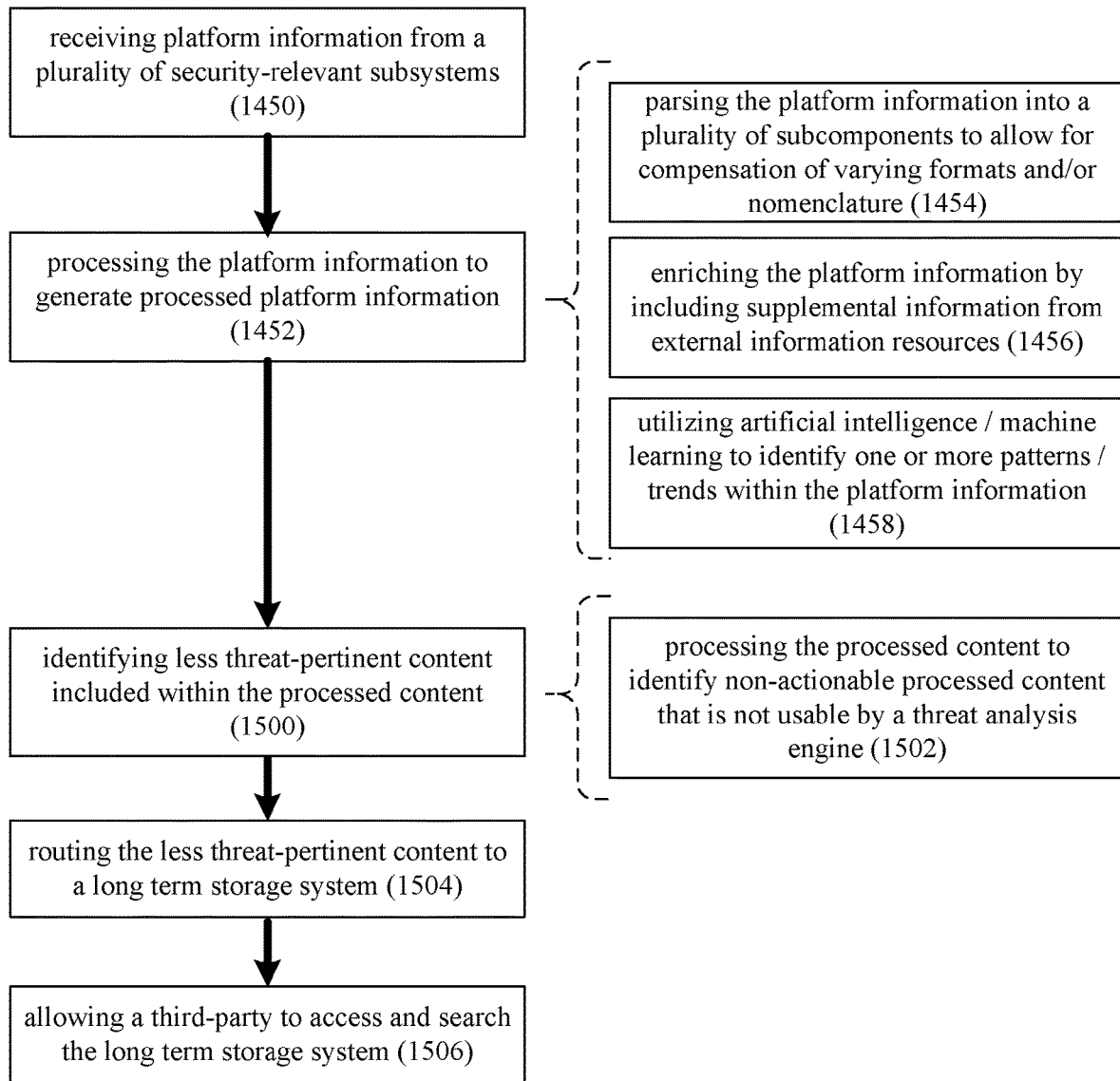

Referring also to FIG. 29, threat mitigation process 10 may be configured to route less threat-pertinent content in a specific manner. For example and as discussed above, threat mitigation process 10 may receive 1450 platform information (e.g., log files) from a plurality of security-relevant subsystems (e.g., security-relevant subsystems 226). As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform Further and as discussed above, threat mitigation process 10 may process 1452 this platform information (e.g., log files) to generate processed platform information. And when processing 1452 this platform information (e.g., log files) to generate processed platform information, threat mitigation process 10 may: parse 1454 the platform information (e.g., log files) into a plurality of subcomponents (e.g., columns, rows, etc.) to allow for compensation of varying formats and/or nomenclature; enrich 1456 the platform information (e.g., log files) by including supplemental information from external information resources; and/or utilize 1458 artificial intelligence/machine learning (in the manner described above) to identify one or more patterns/trends within the platform information (e.g., log files).

Threat mitigation process 10 may identify 1500 less threat-pertinent content 282 included within the processed content, wherein identifying 1500 less threat-pertinent content 282 included within the processed content may include processing 1502 the processed content to identify nonactionable processed content that is not usable by a threat analysis engine (e.g., SIEM system 230) for correlation purposes. Threat mitigation process 10 may route 1504 less threat-pertinent content 282 to a long term storage system (e.g., long term storage system 284). Further, threat mitigation process 10 may be configured to allow 1506 a thirdparty (e.g., the user/owner/operator of computing network 60) to access and search long term storage system 284.

Automated Analysis

As will be discussed below in greater detail, threat mitigation process 10 may be configured to automatically analyze a detected security event.

Concept 20)

Figure 30:
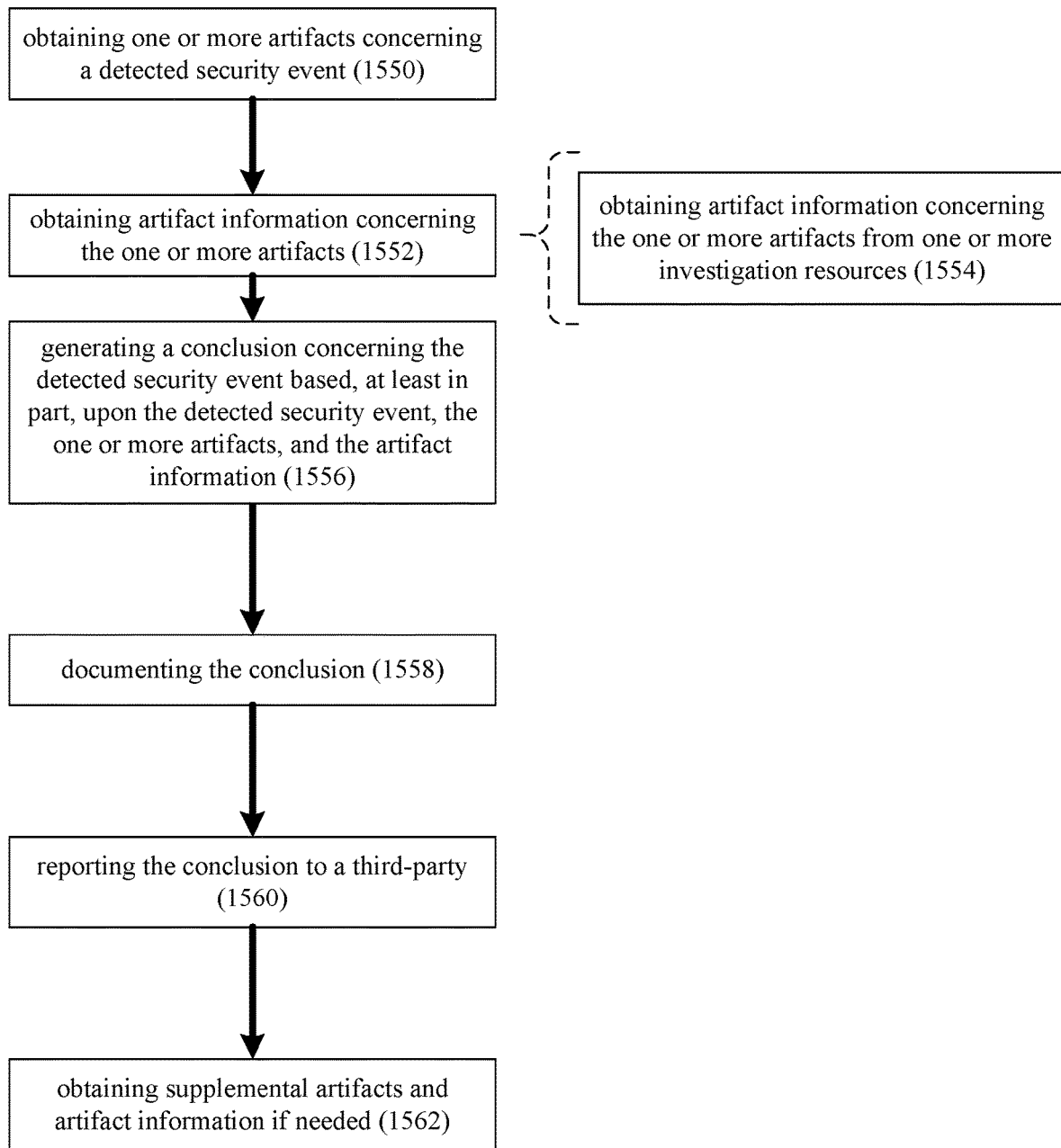

Referring also to FIG. 30, threat mitigation process 10 may be configured to automatically classify and investigate a detected security event. As discussed above and in response to a security event being detected, threat mitigation process 10 may obtain 1550 one or more artifacts (e.g., artifacts 250) concerning the detected security event. Examples of such a detected security event may include but are not limited to one or more of: access auditing; anomalies; authentication; denial of services; exploitation; malware; phishing; spamming; reconnaissance; and web attack. These artifacts (e.g., artifacts 250) may be obtained 1550 from a plurality of sources associated with the computing platform, wherein examples of such plurality of sources may include but are not limited to the various log files maintained by SIEM system 230, and the various log files directly maintained by the security-relevant subsystems Threat mitigation process 10 may obtain 1552 artifact information (e.g., artifact information 286) concerning the one or more artifacts (e.g., artifacts 250), wherein artifact information 286 may be obtained from information resources include within (or external to) computing platform 60.

For example and when obtaining 1552 artifact information 286 concerning the one or more artifacts (e.g., artifacts 250), threat mitigation process 10 may obtain 1554 artifact information 286 concerning the one or more artifacts (e.g., artifacts 250) from one or more investigation resources (such as third-party resources that may e.g., provide information on known bad actors).

Once the investigation is complete, threat mitigation process 10 may generate 1556 a conclusion (e.g., conclusion 288) concerning the detected security event (e.g., a Denial of Services attack) based, at least in part, upon the detected security event (e.g., a Denial of Services attack), the one or more artifacts (e.g., artifacts 250), and artifact information 286. Threat mitigation process 10 may document 1558 the conclusion (e.g., conclusion 288), report 1560 the conclusion (e.g., conclusion 288) to a third-party (e.g., the user/owner/operator of computing network 60). Further, threat mitigation process 10 may obtain 1562 supplemental artifacts and artifact information (if needed to further the investigation).

While the system is described above as being computer-implemented, this is for illustrative purposes only and is not intended to be a limitation of this disclosure, as other configurations are possible and are considered to be within the scope of this disclosure. For example, some or all of the above-described system may be implemented by a human being.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    defining a training routine for a specific attack of a computing platform, including allowing a third party to select a specific training routine from a plurality of available training routines;
    determining a quantity of required entities to effectuate the training routine, including analyzing the requirements of the training routine to determine the quantity of required entities required to effectuate the training routine including a number of attacked devices and a number of attacking devices;
    generating one or more virtual machines to emulate the one or more required entities; and
    generating a simulation of the specific attack by executing the training routine within a controlled test environment.

2. The computer-implemented method of claim 1 wherein generating a simulation of the specific attack by executing the training routine within a controlled test environment includes:
    rendering the simulation of the specific attack on the controlled test environment.

3. The computer-implemented method of claim 1 further comprising:
    allowing a trainee to view the simulation of the specific attack.

4. The computer-implemented method of claim 3 further comprising:
    allowing a trainee to provide a trainee response to the simulation of the specific attack.

5. The computer-implemented method of claim 4 further comprising:
    determining the effectiveness of the trainee response.

6. The computer-implemented method of claim 5 wherein determining the effectiveness of the trainee response includes:
    assigning a grade to the trainee response.

7. The computer-implemented method of claim 1 wherein the controlled test environment is a virtual machine executed on a computing device.

8. A computer program product residing on a non-transitory computer readable medium having a plurality of instructions stored thereon which, when executed by a processor, cause the processor to perform operations comprising:
    defining a training routine for a specific attack of a computing platform, including allowing a third party to select a specific training routine from a plurality of available training routines;
    determining a quantity of required entities to effectuate the training routine, including analyzing the requirements of the training routine to determine the quantity of required entities required to effectuate the training routine including a number of attacked devices and a number of attacking devices;
    generating one or more virtual machines to emulate the one or more required entities; and
    generating a simulation of the specific attack by executing the training routine within a controlled test environment.

9. The computer program product of claim 8 wherein generating a simulation of the specific attack by executing the training routine within a controlled test environment includes:
    rendering the simulation of the specific attack on the controlled test environment.

10. The computer program product of claim 8 further comprising:
   allowing a trainee to view the simulation of the specific attack.

11. The computer program product of claim 10 further comprising:
   allowing a trainee to provide a trainee response to the simulation of the specific attack.

12. The computer program product of claim 11 further comprising:
   determining the effectiveness of the trainee response.

13. The computer program product of claim 12 wherein determining the effectiveness of the trainee response includes:
   assigning a grade to the trainee response.

14. The computer program product of claim 8 wherein the controlled test environment is a virtual machine executed on a computing device.

15. A computing system including a processor and memory configured to perform operations comprising:
   defining a training routine for a specific attack of a computing platform, including allowing a third party to select a specific training routine from a plurality of available training routines;
   determining a quantity of required entities to effectuate the training routine, including analyzing the requirements of the training routine to determine the quantity of required entities required to effectuate the training routine including a number of attacked devices and a number of attacking devices;
   generating one or more virtual machines to emulate the one or more required entities; and
   generating a simulation of the specific attack by executing the training routine within a controlled test environment.

16. The computing system of claim 15 wherein generating a simulation of the specific attack by executing the training routine within a controlled test environment includes:
   rendering the simulation of the specific attack on the controlled test environment.

17. The computing system of claim 15 further comprising:
   allowing a trainee to view the simulation of the specific attack.

18. The computing system of claim 17 further comprising:
   allowing a trainee to provide a trainee response to the simulation of the specific attack.

19. The computing system of claim 18 further comprising:
   determining the effectiveness of the trainee response.

20. The computing system of claim 19 wherein determining the effectiveness of the trainee response includes:
   assigning a grade to the trainee response.

21. The computing system of claim 15 wherein the controlled test environment is a virtual machine executed on a computing device.

* * * * *